US012628135B2

(12) United States Patent
Liu et al.

(10) Patent No.:   US 12,628,135 B2
(45) Date of Patent:      May 12, 2026

(54) METHODS AND APPARATUS FOR SOUNDING AND CONTROL SIGNALING ENHANCEMENTS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 18/191,317

(22) Filed: Mar. 28, 2023

(65) Prior Publication Data

US 2023/0239843 A1      Jul. 27, 2023

Related U.S. Application Data

(63) Continuation of application No. PCT/US2021/056114, filed on Oct. 21, 2021.

(60) Provisional application No. 63/138,220, filed on Jan. 15, 2021, provisional application No. 63/104,374, filed on Oct. 22, 2020.

(51) Int. Cl.
*H04W 72/0446* (2023.01)
*H04L 5/00* (2006.01)
*H04W 72/23* (2023.01)

(52) U.S. Cl.
CPC ....... *H04W 72/0446* (2013.01); *H04L 5/0051* (2013.01); *H04W 72/23* (2023.01)

(58) Field of Classification Search
CPC .. H04W 72/0446; H04W 72/23; H04L 5/0051
USPC ......................................................... 370/329
See application file for complete search history.

(56) References Cited

U.S. PATENT DOCUMENTS

| | | | | |
|---|---|---|---|---|
| 2019/0174466 A1* | 6/2019 | Zhang | ................... | H04L 5/0057 |
| 2019/0349964 A1* | 11/2019 | Liou | ................... | H04W 72/046 |
| 2021/0184824 A1* | 6/2021 | Kwak | ................... | H04L 5/0094 |

(Continued)

OTHER PUBLICATIONS

Huawei, HiSilicon, "Summary of remaining details of SRS design", 3GPP TSG RAN WG1 Ad Hoc Meeting R1-1800090, Jan. 22-26, 2018, 12 pages, Vancouver, Canada.

(Continued)

*Primary Examiner* — Peter G Solinsky
(74) *Attorney, Agent, or Firm* — Slater Matsil, LLP

(57) ABSTRACT

In an embodiment, a user equipment (UE) receives, from an access node (AN), downlink control information (DCI) triggering a transmission of a sounding reference signal (SRS) of a SRS resource set. The DCI indicates a time-domain resource in available time-domain resources for transmitting the SRS resource set. The UE determines a position of the time-domain resource in the available time-domain resources based on the DCI, and transmits the SRS in accordance with the position of the time-domain resource. In another embodiment, a UE receives control information indicating a frequency resource in a carrier for transmission of one or more SRSs. The UE determines, based thereon, to segment the frequency resource into segments that each includes contiguous physical resource blocks (PRBs), and transmits a SRS in an orthogonal frequency division multiplexing (OFDM) symbol on a first segment and not on a second segment.

20 Claims, 24 Drawing Sheets

(56) References Cited

U.S. PATENT DOCUMENTS

| | | | |
|---|---|---|---|
| 2021/0212099 A1* | 7/2021 | Yi ......................... | H04W 72/23 |
| 2021/0367727 A1* | 11/2021 | Go ...................... | H04W 72/046 |
| 2022/0029861 A1* | 1/2022 | Shahmohammadian ................... | H04L 5/0048 |
| 2022/0132534 A1* | 4/2022 | Jang ...................... | H04L 5/0051 |

OTHER PUBLICATIONS

Huawei, HiSilicon, "Remaining details of SRS design", 3GPP TSG RAN WG1 Meeting #92bis R1-1803639, Apr. 16-20, 2018, 4 pages, Sanya, China.

* cited by examiner

300

| | | |
|---|---|---|
| 305 | UPLINK SRS | - UNPRECODED FOR PURPOSE OF UL CHANNEL ESTIMATION; SENT BY ACTIVE UEs TO ASSIST NETWORK IN PRESCHEDULING<br>- INSTEAD OF UL SRS, FEEDBACK FROM UE MAY BE USED FOR PRESCHEDULING |
| 307 | UPLINK CHANNEL ESTIMATION | - NETWORK ESTIMATES UL CHANNEL BASED ON UL SRS |
| 309 | PRESCHEDULING | - NETWORK PRESCHEDULES UEs, SENDS GROUP DCI FOR PRESCHEDULED UEs TO TRIGGER SRS AND CSI-RS (IF CSI-RS IS TO BE SENT)<br>- ACTUAL SCHEDULING AND DATA TRANSMISSION IS FOLLOWED IN LATER STEPS |
| 311 | DOWNLINK CSI-RS | - NETWORK TRANSMITS PRECODED OR UNPRECODED CSI-RS<br>- CSI-RS MAY OR MAY NOT BE TRANSMITTED |
| 313 | DOWNLINK CHANNEL ESTIMATION | - UE ESTIMATES DL CHANNEL BASED ON DL CSI-RS |
| 315 | TRIGGERED SRS | - PRESCHEDULED UEs TRANSMIT SRS<br>- SRS PRECODED OR UNPRECODED (NO INFORMATION)<br>- SRS BASED ON RECEIVED DCI ON ASSIGNED SUBBANDS, PORTS, COMB, AND CYCLIC SHIFTS |

1105 — IDENTIFIER

1120 — RESOURCE ALLOCATION

1122 — SRS TPC COMMAND

1124 — SRS INDICATION

FIRST PRESCHEDULED UE 1110

RESOURCE ALLOCATION

SRS TPC COMMAND

SRS INDICATION

SECOND PRESCHEDULED UE 1112

1130 — RESOURCE ALLOCATION

1132 — SRS TPC COMMAND

1134 — SRS INDICATION

1114 N-TH PRESCHEDULED UE

IDENTIFIER — 1205

RESOURCE ALLOCATION — 1210

SRS TPC COMMAND — 1215

SRS INDICATION — 1220

1300

START

1305 — TRANSMIT UNPRECODED PERIODIC UL SRS

1307 — RECEIVE DCI FOR PRESCHEDULING

1309 — ESTIMATE DL CHANNEL

1311 — TRANSMIT TRIGGER BASED UL SRS

1313 — RECEIVE DL DATA

END

1400

START

ESTIMATE UL CHANNEL — 1405

PRESCHEDULE UE — 1407

TRANSMIT DCI FOR PRESCHEDULING — 1409

TRANSMIT DL CSI-RS — 1411

RECEIVE TRIGGER BASED UL SRS — 1413

DETERMINE INTERFERENCE COVARIANCE MATRIX — 1415

DETERMINE DL PRECODER — 1417

TRANSMIT DL DATA — 1419

END

1500
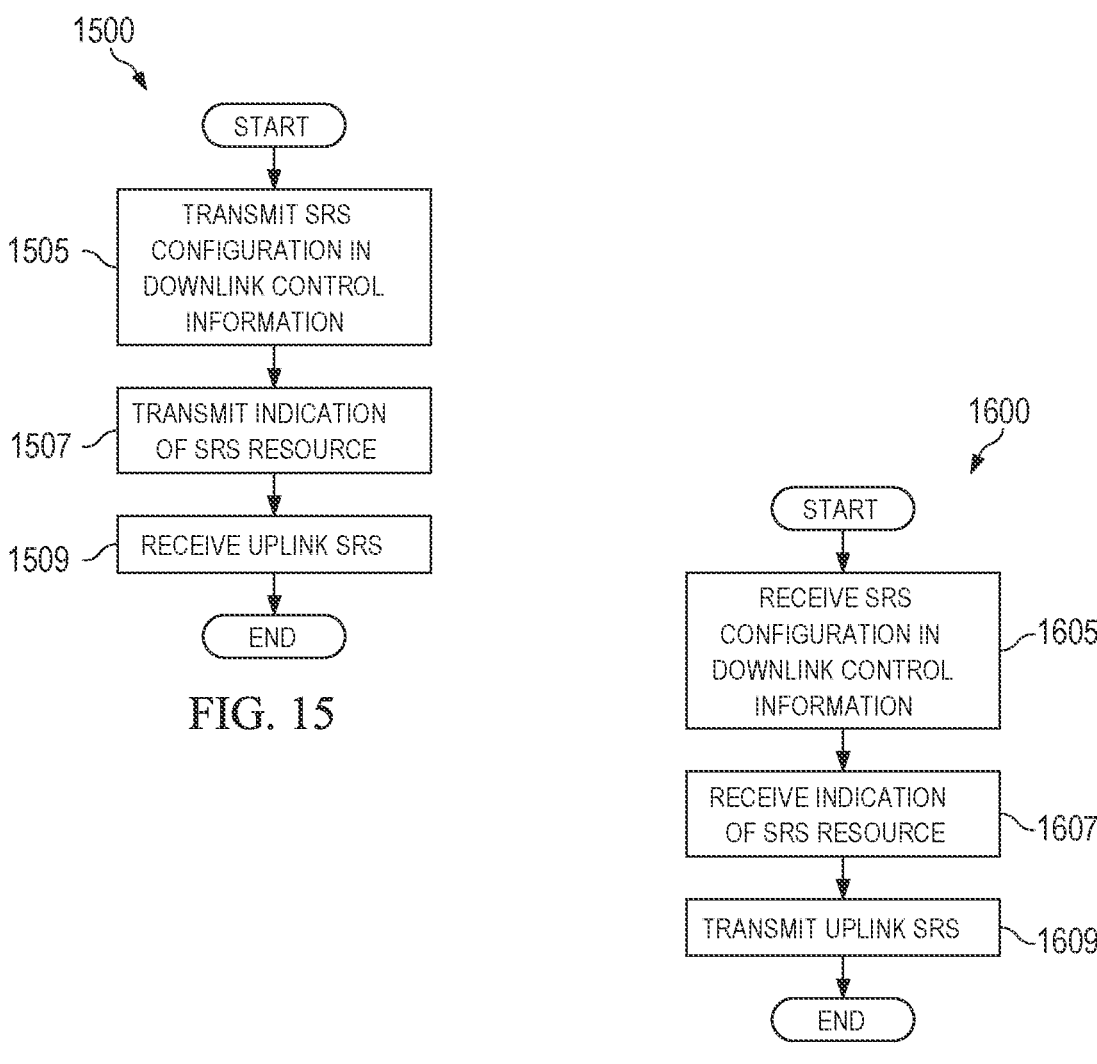
FIG. 15
FIG. 16
1700
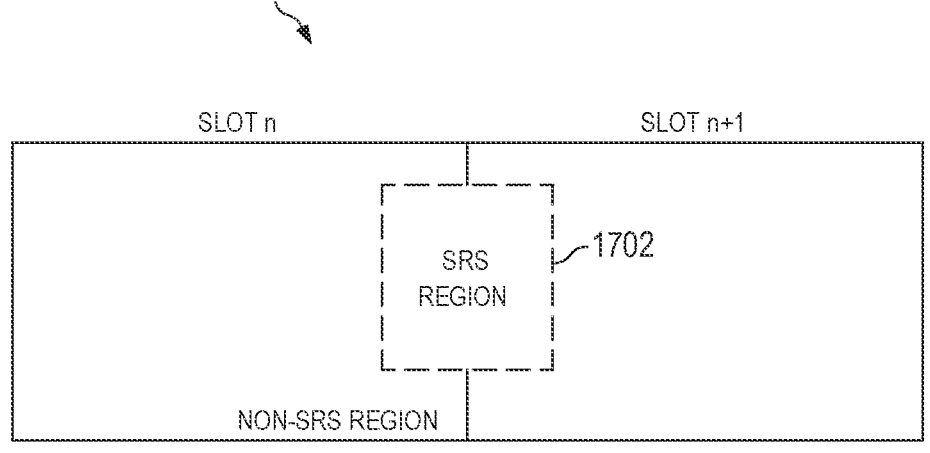
FIG. 17

1800 gNB DATA
PRE-SCHEDULING
DECISION (TTI m)

SRS PROBING
(TTI m+n)

DATA Tx WITH ADJUSTED
PRECODER BASED ON
PROBING (TTI m+n+k)

1802

1804

A-SRS TRIGGERING:
SAME PRBs, PORTS,
ETC., AS PRE-
SCHEDULING
OUTCOME

PRB0

PRB0

PRB0

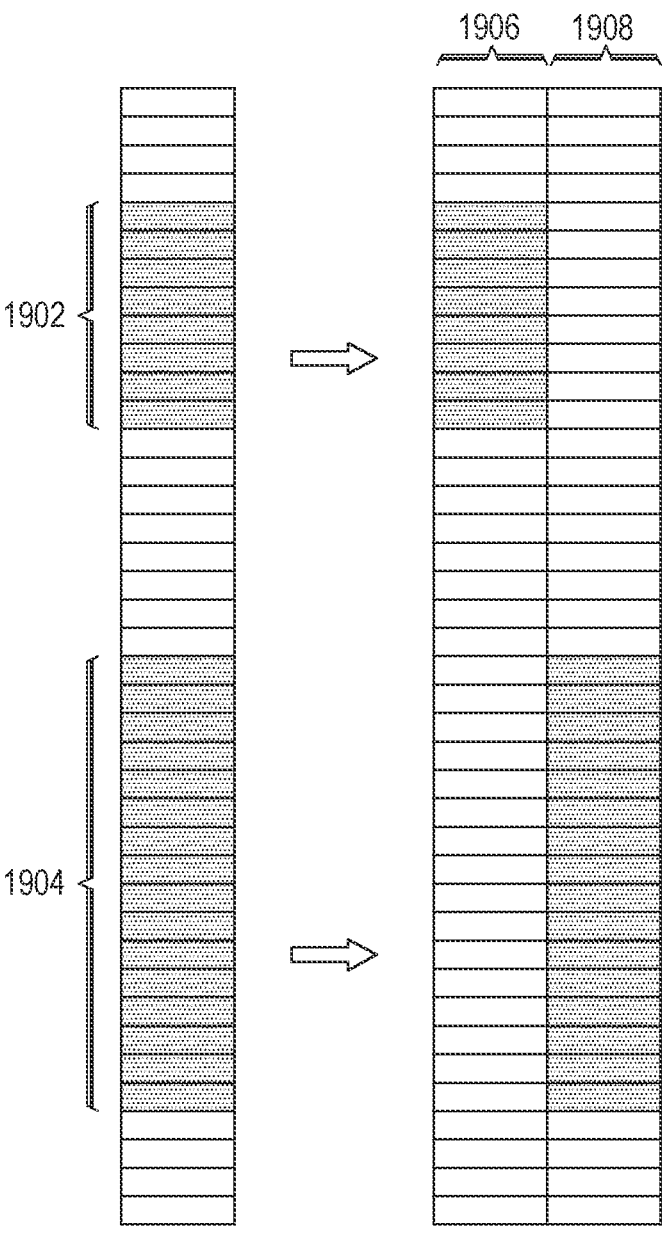
FIG. 19

2030

SERVING

2037 —

— 2039

BS1 SEES WEAK I

BS2 SEES STRONG I

2035 —

UL SRS WITH UE Tx BF ——►
STRONG S AND WEAK I AT BS

2050

2057 —

— 2059

BS1 CAN BF IN
THIS DIRECTION

BS2 AVOIDS THIS
DIRECTION

2055 —

STRONG INTERFERERS
BF AWAY TO THIS UE ——►
HIGH SINR AT UE

2200

2300
RBG1
2305
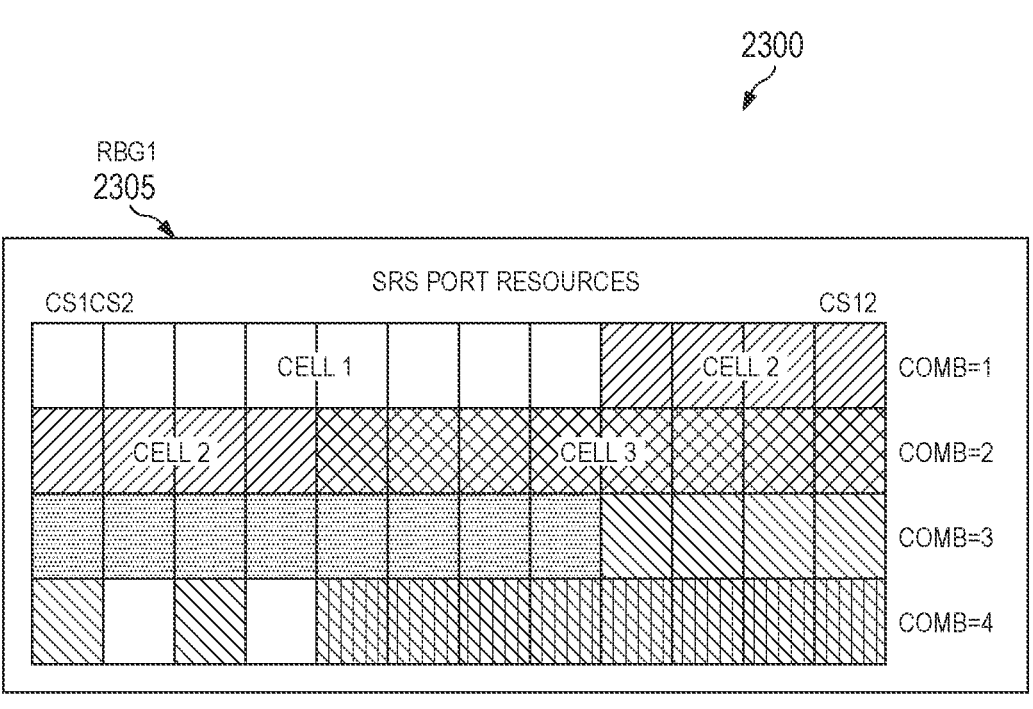
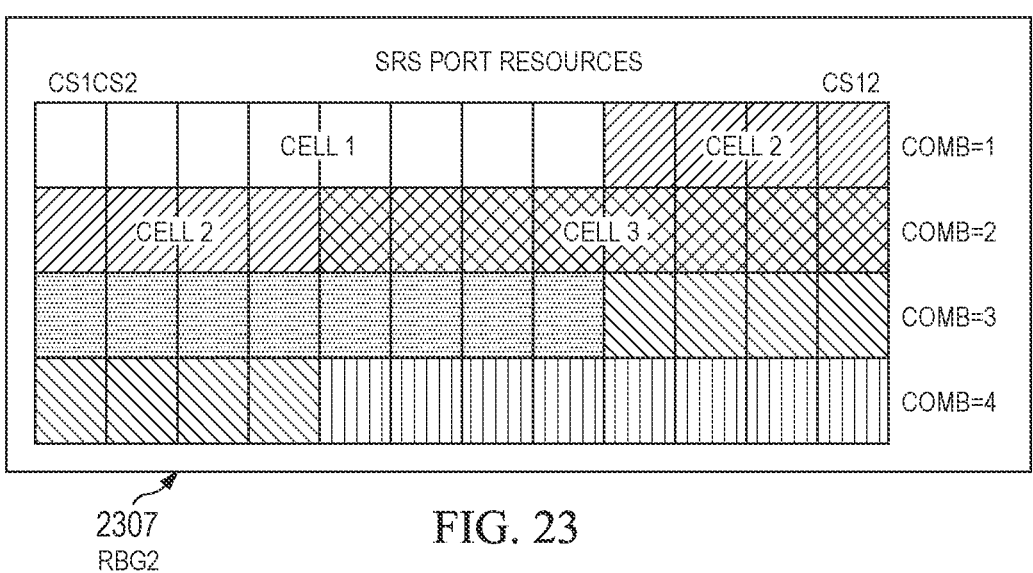
2307
RBG2
FIG. 23

2470
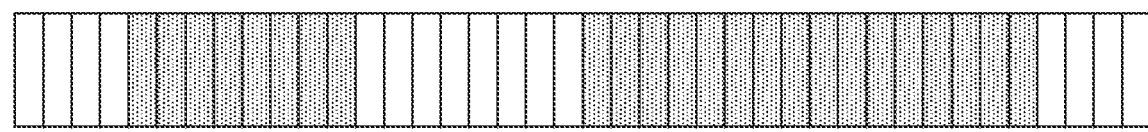
FIG. 24D
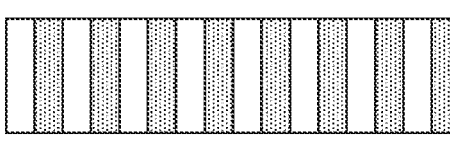
2450
FIG. 24C
2430
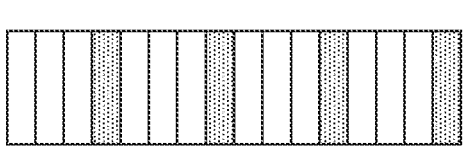
FIG. 24B
2410
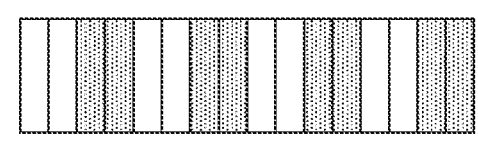
FIG. 24A

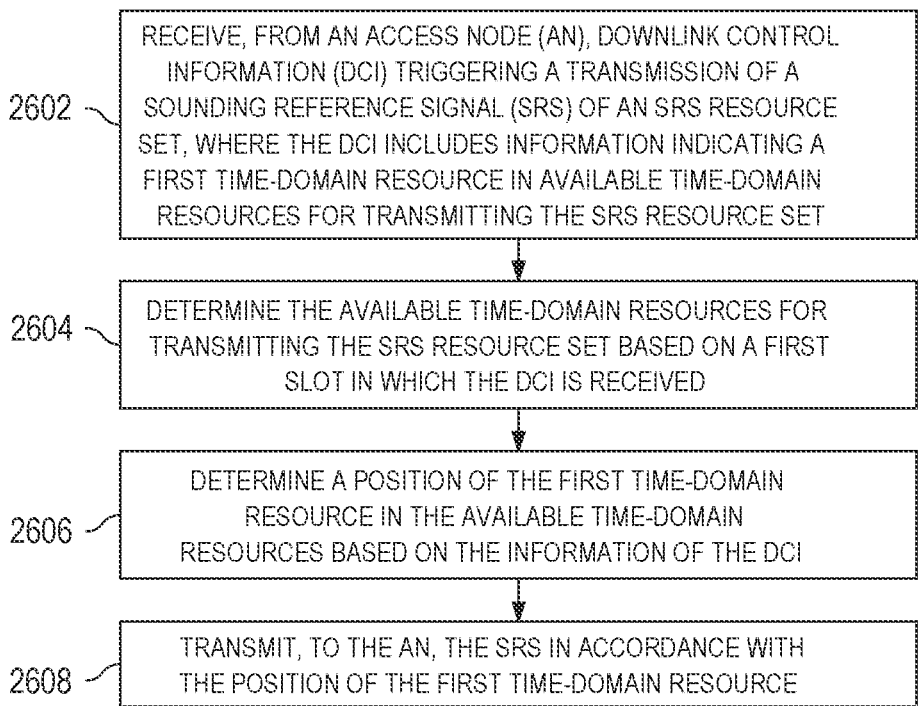

2602 — RECEIVE, FROM AN ACCESS NODE (AN), DOWNLINK CONTROL INFORMATION (DCI) TRIGGERING A TRANSMISSION OF A SOUNDING REFERENCE SIGNAL (SRS) OF AN SRS RESOURCE SET, WHERE THE DCI INCLUDES INFORMATION INDICATING A FIRST TIME-DOMAIN RESOURCE IN AVAILABLE TIME-DOMAIN RESOURCES FOR TRANSMITTING THE SRS RESOURCE SET

2604 — DETERMINE THE AVAILABLE TIME-DOMAIN RESOURCES FOR TRANSMITTING THE SRS RESOURCE SET BASED ON A FIRST SLOT IN WHICH THE DCI IS RECEIVED

2606 — DETERMINE A POSITION OF THE FIRST TIME-DOMAIN RESOURCE IN THE AVAILABLE TIME-DOMAIN RESOURCES BASED ON THE INFORMATION OF THE DCI

2608 — TRANSMIT, TO THE AN, THE SRS IN ACCORDANCE WITH THE POSITION OF THE FIRST TIME-DOMAIN RESOURCE

FIG. 26

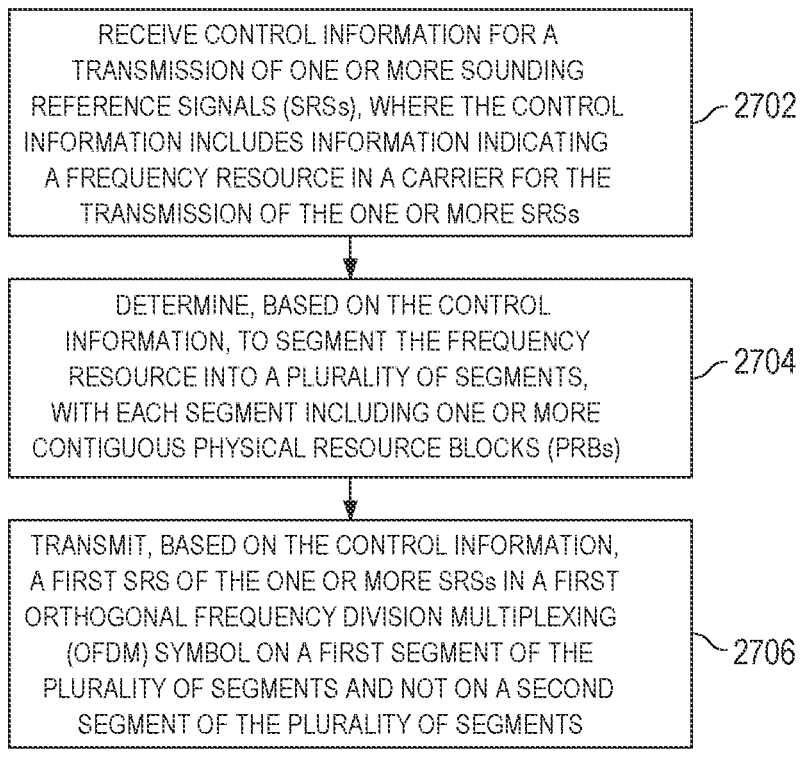

RECEIVE CONTROL INFORMATION FOR A TRANSMISSION OF ONE OR MORE SOUNDING REFERENCE SIGNALS (SRSs), WHERE THE CONTROL INFORMATION INCLUDES INFORMATION INDICATING A FREQUENCY RESOURCE IN A CARRIER FOR THE TRANSMISSION OF THE ONE OR MORE SRSs — 2702

DETERMINE, BASED ON THE CONTROL INFORMATION, TO SEGMENT THE FREQUENCY RESOURCE INTO A PLURALITY OF SEGMENTS, WITH EACH SEGMENT INCLUDING ONE OR MORE CONTIGUOUS PHYSICAL RESOURCE BLOCKS (PRBs) — 2704

TRANSMIT, BASED ON THE CONTROL INFORMATION, A FIRST SRS OF THE ONE OR MORE SRSs IN A FIRST ORTHOGONAL FREQUENCY DIVISION MULTIPLEXING (OFDM) SYMBOL ON A FIRST SEGMENT OF THE PLURALITY OF SEGMENTS AND NOT ON A SECOND SEGMENT OF THE PLURALITY OF SEGMENTS — 2706

FIG. 27

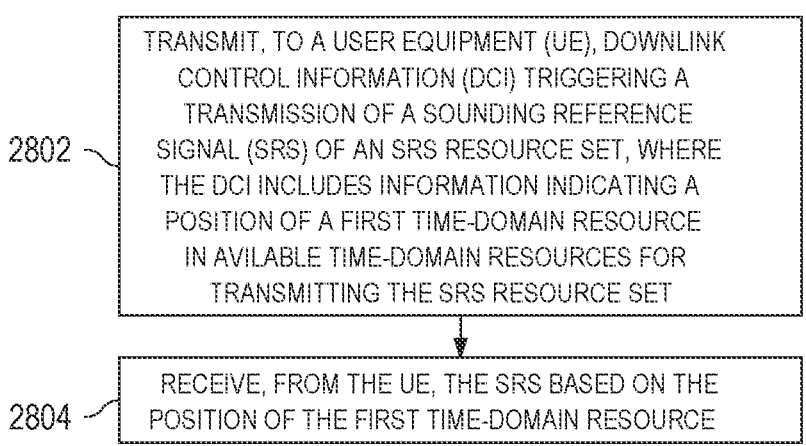

2802 — TRANSMIT, TO A USER EQUIPMENT (UE), DOWNLINK CONTROL INFORMATION (DCI) TRIGGERING A TRANSMISSION OF A SOUNDING REFERENCE SIGNAL (SRS) OF AN SRS RESOURCE SET, WHERE THE DCI INCLUDES INFORMATION INDICATING A POSITION OF A FIRST TIME-DOMAIN RESOURCE IN AVILABLE TIME-DOMAIN RESOURCES FOR TRANSMITTING THE SRS RESOURCE SET

2804 — RECEIVE, FROM THE UE, THE SRS BASED ON THE POSITION OF THE FIRST TIME-DOMAIN RESOURCE

FIG. 28

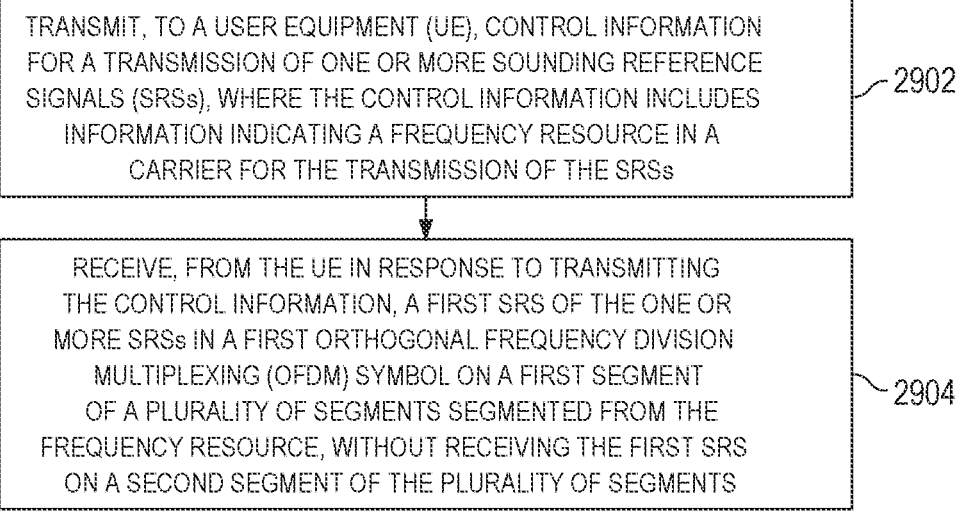

TRANSMIT, TO A USER EQUIPMENT (UE), CONTROL INFORMATION FOR A TRANSMISSION OF ONE OR MORE SOUNDING REFERENCE SIGNALS (SRSs), WHERE THE CONTROL INFORMATION INCLUDES INFORMATION INDICATING A FREQUENCY RESOURCE IN A CARRIER FOR THE TRANSMISSION OF THE SRSs — 2902

RECEIVE, FROM THE UE IN RESPONSE TO TRANSMITTING THE CONTROL INFORMATION, A FIRST SRS OF THE ONE OR MORE SRSs IN A FIRST ORTHOGONAL FREQUENCY DIVISION MULTIPLEXING (OFDM) SYMBOL ON A FIRST SEGMENT OF A PLURALITY OF SEGMENTS SEGMENTED FROM THE FREQUENCY RESOURCE, WITHOUT RECEIVING THE FIRST SRS ON A SECOND SEGMENT OF THE PLURALITY OF SEGMENTS — 2904

FIG. 29

METHODS AND APPARATUS FOR SOUNDING AND CONTROL SIGNALING ENHANCEMENTS

CROSS-REFERENCE TO RELATED APPLICATIONS

This application is a continuation of International Application No. PCT/US2021/056114, filed on Oct. 21, 2021 and entitled "Methods and Apparatus for Sounding and Control Signaling Enhancements," which claims the benefit of U.S. Provisional Application No. 63/104,374, filed on Oct. 22, 2020 and entitled "Methods and Apparatus for Sounding and Control Signaling Enhancements," and to U.S. Provisional Application No. 63/138,220, filed on Jan. 15, 2021 and entitled "Methods and Apparatus for Sounding and Control Signaling Enhancements". The aforementioned applications are hereby incorporated by reference herein as if reproduced in their entireties.

TECHNICAL FIELD

The present disclosure relates generally to wireless communications, and, in particular embodiments, to methods and apparatus for sounding and control signaling enhancements.

BACKGROUND

Sounding reference signals (SRSs) are reference signals transmitted by user equipments (UEs) in the uplink for the purpose of enabling uplink channel estimation over a wide bandwidth. As such, the network may be able to perform communication with the UEs based on the uplink channel estimation. Moreover, due to channel reciprocity between the uplink and the downlink present in a time division duplex (TDD) communication system, the network may utilize the SRSs to perform dynamic scheduling. That is, the network may exploit channel-dependent scheduling. In this case, the time-frequency resources are dynamically scheduled, taking into account the different traffic priorities and quality of services requirements. Typically, the UEs monitor several Physical Downlink Control Channels (PDCCHs) to acquire the scheduling decisions, which are signaled to the UEs by the network. Upon the detection of a valid PDCCH, the UE follows the scheduling decision and receives (or transmits) data.

The configuration of SRS related parameters of a SRS to be transmitted in the uplink (such as SRS transmission ports, SRS transmission bandwidth, SRS resources sets, transmission comb and cyclic shift, etc.) are semi-static in nature and may be provided through higher layer signaling, such as radio resource control signaling. A more dynamic technique to signal the configuration is needed to better associate the SRS parameters (such as the SRS transmission bandwidth and/or ports) with the Physical Data Shared Channel (PDSCH) parameters. Moreover, it is desirable that the association between downlink reference signals, such as Channel State Information Reference Signals (CSI-RS) or demodulation reference signals (DMRS), and an uplink SRS be conveyed to the UE to accurately reflect the interference situation and perform optimal beamforming. Thus, there is a need for an apparatus and methods for signaling control information that accurately indicates a more dynamic configuration (not semi-static) of the aforementioned parameters, such as, for example, a portion of the transmission bandwidth required to transmit a subset of a SRS resource set (thereby implicitly indicating a transmission comb and cyclic shift) using a subset of the transmission ports associated with a particular set of downlink reference signals. The signaling of the control information may be closely tied to an actual data transmission. The transmission of the SRS may be periodic (i.e., periodic SRS, P-SRS or P SRS) as configured by Layer 3 RRC configuration signaling, semi-persistence (i.e., semi-persistent SRS, SP-SRS or SP SRS) activated/deactivated via Layer 2 MAC CE, or aperiodic (i.e., aperiodic SRS, A-SRS or AP-SRS or A SRS or AP SRS) indicated by Layer 1 downlink control information (DCI) in PDCCH.

SUMMARY

Technical advantages are generally achieved, by embodiments of this disclosure which describe a method and apparatus for sounding and control signaling enhancements.

According to one aspect of the present disclosure, a method is provided that includes: receiving, by a user equipment (UE) from an access node (AN), downlink control information (DCI) triggering a transmission of a sounding reference signal (SRS) of a SRS resource set, the DCI comprising first information indicating a first time-domain resource in available time-domain resources for transmitting the SRS resource set; determining, by the UE, the available time-domain resources for transmitting the SRS resource set based on a first slot in which the DCI is received; determining, by the UE, a position of the first time-domain resource in the available time-domain resources based on the first information of the DCI; and transmitting, by the UE to the AN, the SRS in accordance with the position of the first time-domain resource.

Optionally, in any of the preceding aspects, determining the available time-domain resources comprises: determining, by the UE, a reference slot of the available time-domain resources according to a position of the first slot of the DCI and a higher layer parameter slotoffset; and determining, by the UE, positions of the available time-domain resources according to the reference slot.

Optionally, in any of the preceding aspects, the reference slot is the first slot in which the DCI is received when the higher layer parameter slotoffset is not configured.

Optionally, in any of the preceding aspects, the reference slot is at a position that is n slots after the first slot, n is configured by the higher layer parameter slotoffset, and n is greater than or equal to zero (0).

Optionally, in any of the preceding aspects, the available time-domain resources comprise time-domain resources that are in or after, in a time domain, the reference slot, and that are configured as uplink (UL) or flexible, wherein the time-domain resources are in unit of slot, mini-slot, or OFDM symbol.

Optionally, in any of the preceding aspects, the DCI comprises an index of the first time-domain resource in the available time-domain resources.

Optionally, in any of the preceding aspects, the method further includes: determining, by the UE, that the transmission of the SRS collides with another transmission/reception in the first time-domain resource; and transmitting, by the UE, the SRS in a next time-domain resource of the first time-domain resource in the available time-domain resources without transmitting in the first time-domain resource.

Optionally, in any of the preceding aspects, the method further includes: determining, by the UE, that the transmission of the SRS collides with another transmission/reception in the first time-domain resource; and transmitting, by the UE, the SRS in the first time-domain resource when the transmission of the SRS has a priority higher than a priority of another transmission/reception.

Optionally, in any of the preceding aspects, the method further includes: receiving, by the UE, the priority of the SRS.

Optionally, in any of the preceding aspects, the SRS has at least one transmission parameter shared with a data transmission associated with the SRS or a high-priority data transmission.

According to another aspect of the present disclosure, a method is provided that includes: receiving, by a user equipment (UE), control information for a transmission of one or more sounding reference signals (SRSs), the control information comprising information indicating a frequency resource in a carrier for the transmission of the one or more SRSs; determining, by the UE based on the control information, to segment the frequency resource into a plurality of segments, each segment comprising a plurality of contiguous physical resource blocks (PRBs); and transmitting, by the UE based on the control information, a first SRS of the one or more SRSs in a first orthogonal frequency division multiplexing (OFDM) symbol on a first segment of the plurality of segments and not on a second segment of the plurality of segments.

Optionally, in any of the preceding aspects, the transmitting comprises: transmitting, by the UE based on the control information, the SRSs on the plurality of segments in different OFDM symbols, respectively.

Optionally, in any of the preceding aspects, the transmitting comprises: transmitting, by the UE based on the control information, a second SRS in a second OFDM symbol on the second segment.

Optionally, in any of the preceding aspects, the first SRS on the first segment and the second SRS on the second segment are transmitted according to a frequency hopping pattern.

Optionally, in any of the preceding aspects, the control information comprises information indicating to transmit the SRSs according to the frequency hopping pattern.

Optionally, in any of the preceding aspects, the control information is downlink control information (DCI) or radio resource control (RRC) configuration information.

Optionally, in any of the preceding aspects, the control information comprises information indicating to segment the frequency resource into the plurality of segments for the transmission of the SRSs.

Optionally, in any of the preceding aspects, the control information comprises information indicating a quantity of the plurality of segments.

Optionally, in any of the preceding aspects, determining to segment the frequency resource into the plurality of segments comprises: determining, by the UE, to segment the frequency resource into the plurality of segments when the plurality of segments are non-contiguous to one another.

Optionally, in any of the preceding aspects, transmitting the first SRS comprises: repetitively transmitting, by the UE, the first SRS on the first segment of the plurality of segments in a plurality of OFDM symbols.

Optionally, in any of the preceding aspects, the control information comprises information indicating to transmit the first SRS in repetition.

Optionally, in any of the preceding aspects, the method further includes: receiving, by the UE, a physical downlink shared channel (PDSCH) on the frequency resource in the carrier.

Optionally, in any of the preceding aspects, the control information comprises information indicating an index of a first time-domain resource in available time-domain resources for transmitting a SRS resource set; and wherein the method further comprises: determining, by the UE, the available time-domain resources for transmitting the SRS resource set in accordance with a slot in which the control information is received; and determining, by the UE, a position of the first time-domain resource in the available time-domain resources based on the index of the first time-domain resource in the available time-domain resources, the first time-domain resource comprising the first OFDM symbol.

According to another aspect of the present disclosure, a method is provided that includes: transmitting, by an access node (AN) to a user equipment (UE), downlink control information (DCI) triggering a transmission of a sounding reference signal (SRS) of a SRS resource set, wherein the DCI comprises information indicating a position of a first time-domain resource in available time-domain resources for transmitting the SRS resource set, and the available time-domain resources for transmitting the SRS resource set are based on a first slot in which the DCI is transmitted; and receiving, by the AN from the UE, the SRS based on the position of the first time-domain resource.

Optionally, in any of the preceding aspects, the method further includes: determining the available time-domain resources for transmitting the SRS resource set based on the first slot in which the DCI is transmitted, and the determining comprises: determining, by the AN, a reference slot of the available time-domain resources according to a position of the first slot of the DCI and a higher layer parameter slotoffset; and determining, by the UE, positions of the available time-domain resources for transmitting the SRS resource set according to the reference slot.

Optionally, in any of the preceding aspects, the reference slot is the first slot in which the DCI is transmitted when the higher layer parameter slotoffset is not configured for the UE.

Optionally, in any of the preceding aspects, the reference slot is at a position that is n slots after the first slot, n is specified by the higher layer parameter slotoffset that is configured for the UE, and n is greater than or equal to 0.

Optionally, in any of the preceding aspects, the available time-domain resources comprise time-domain resources that are in or after, in a time domain, the reference slot, and that are configured as uplink (UL) or flexible, wherein the time-domain resources are in unit of slot, mini-slot, or OFDM symbol.

Optionally, in any of the preceding aspects, the DCI comprises an index of the first time-domain resource in the available time-domain resources.

Optionally, in any of the preceding aspects, receiving the SRS comprises: receiving, by the AN, the SRS in a next time-domain resource of the first time-domain resource in the available time-domain resources without receiving the SRS in the first time-domain resource when the transmission of the SRS collides with another transmission/reception in the first time-domain resource.

Optionally, in any of the preceding aspects, receiving the SRS comprises: receiving, by the AN, the SRS in the first time-domain resource.

Optionally, in any of the preceding aspects, the SRS has at least one transmission parameter shared with a data transmission associated with the SRS or a high-priority data transmission.

According to another aspect of the present disclosure, a method is provided that includes: transmitting, by an access node (AN) to a user equipment (UE), control information for a transmission of one or more sounding reference signals (SRSs), the control information comprising information indicating a frequency resource in a carrier for the transmission of the SRSs; and receiving, by the AN from the UE in response to transmitting the control information, a first SRS of the one or more SRSs in a first orthogonal frequency division multiplexing (OFDM) symbol on a first segment of a plurality of segments segmented from the frequency resource and without receiving the first SRS on a second segment of the plurality of segments, each segment comprising a plurality of contiguous physical resource blocks (PRBs).

Optionally, in any of the preceding aspects, the receiving comprises: receiving, by the AN from the UE, the SRSs on the plurality of segments in different OFDM symbols, respectively.

Optionally, in any of the preceding aspects, the receiving comprises: receiving, by the AN from the UE, a second SRS in a second OFDM symbol on the second segment.

Optionally, in any of the preceding aspects, the first SRS on the first segment and the second SRS on the second segment are received according to a frequency hopping pattern.

Optionally, in any of the preceding aspects, the control information comprises information indicating to transmit the SRSs according to the frequency hopping pattern.

Optionally, in any of the preceding aspects, the control information is downlink control information (DCI) or radio resource control (RRC) configuration information.

Optionally, in any of the preceding aspects, the control information comprises information indicating to segment the frequency resource into the plurality of segments for the transmission of the SRSs.

Optionally, in any of the preceding aspects, the control information comprises information indicating a quantity of the plurality of segments.

Optionally, in any of the preceding aspects, the plurality of segments are non-contiguous to one another.

Optionally, in any of the preceding aspects, receiving the first SRS comprises: repetitively receiving, by the AN from the UE, the first SRS on the first segment of the plurality of segments in a plurality of OFDM symbols.

Optionally, in any of the preceding aspects, the control information comprises information indicating to transmit the first SRS in repetition.

Optionally, in any of the preceding aspects, the method further includes: transmitting, by the AN to the UE, a physical downlink shared channel (PDSCH) on the frequency resource in the carrier.

According to another aspect of the present disclosure, an apparatus is provided that includes: a non-transitory memory storage comprising instructions; and one or more processors in communication with the memory storage, wherein the instructions, when executed by the one or more processors, cause the apparatus to perform a method in any of the preceding aspects.

According to another aspect of the present disclosure, a non-transitory computer-readable media is provided, the non-transitory computer-readable media storing computer instructions, that when executed by one or more processors of an apparatus, cause the apparatus to perform a method in any of the preceding aspects.

According to another aspect of the present disclosure, a system is provided that includes an access node (AN) and a user equipment (UE), wherein the AN is configured to perform: transmitting, to the UE, downlink control information (DCI) triggering a transmission of a sounding reference signal (SRS) of a SRS resource set, wherein the DCI comprises information indicating a position of a first time-domain resource in available time-domain resources for transmitting the SRS resource set, and the available time-domain resources for transmitting the SRS resource set are based on a first slot in which the DCI is transmitted; and receiving, from the UE, the SRS based on the position of the first time-domain resource; and wherein the UE is configured to perform: receiving the DCI from the AN, determining the available time-domain resources for transmitting the SRS resource set based on the first slot in which the DCI is received; determining the position of the first time-domain resource in the available time-domain resources based on the DCI; and transmitting, to the AN, the SRS in accordance with the position of the first time-domain resource.

According to another aspect of the present disclosure, a system is provided that includes an access node (AN) and a user equipment (UE), wherein the AN is configured to perform: transmitting, to the UE, control information for a transmission of one or more sounding reference signals (SRSs), the control information comprising information indicating a frequency resource in a carrier for the transmission of the one or more SRSs; and receiving, from the UE in response to transmitting the control information, a first SRS of the one or more SRSs in a first orthogonal frequency division multiplexing (OFDM) symbol on a first segment of a plurality of segments segmented from the frequency resource and not on a second segment of the plurality of segments, each segment comprising a plurality of contiguous physical resource blocks (PRBs); and wherein the UE is configured to perform: receiving the control information; determining, based on the control information, to segment the frequency resource into the plurality of segments; and transmitting, based on the control information, the first SRS of the one or more SRSs in the first OFDM symbol on the first segment of the plurality of segments and not on the second segment of the plurality of segments.

Advantages of the preceding aspects are that transmissions of SRSs can be flexibly triggered, SRS resources can be dynamically configured, transmissions of SRSs can be more closely related to data transmissions to be performed, and channel interference situations can be more accurately reflected. This can significantly reduce SRS transmission collisions, reduce SRS overhead, reduce the impact of interference to data communications, and improve the spectral efficiency (SE) of the network and terminal devices as well as user experience.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a flow diagram of operations occurring in interference probing process according to example embodiments presented herein;

FIG. 15 illustrates a flow diagram of example operations occurring in an access node configuring uplink SRSs according to example embodiments presented herein;

FIG. 16 illustrates a flow diagram of example operations occurring in a UE transmitting uplink SRSs according to example embodiments presented herein;

FIG. 17 illustrates an example of GC DCI for A-SRS transmissions according to example embodiments presented herein;

FIG. 19 is a diagram illustrating frequency resource split for SRS transmissions according to example embodiments presented herein;

FIG. 23 illustrates diagrams of RGBs with an example mapping of SRS resources and ports according to example embodiments presented herein;

FIGS. 24A, 24B, 24C and 24D are diagrams illustrating different PRB patterns for sounding according to example embodiments presented herein;

FIG. 26 is a flowchart of an embodiment method for wireless communications;

FIG. 27 is a flowchart of another embodiment method for wireless communications;

FIG. 28 is a flowchart of another embodiment method for wireless communications;

FIG. 29 is a flowchart of another embodiment method for wireless communications;

DETAILED DESCRIPTION OF ILLUSTRATIVE EMBODIMENTS

Figure 1:
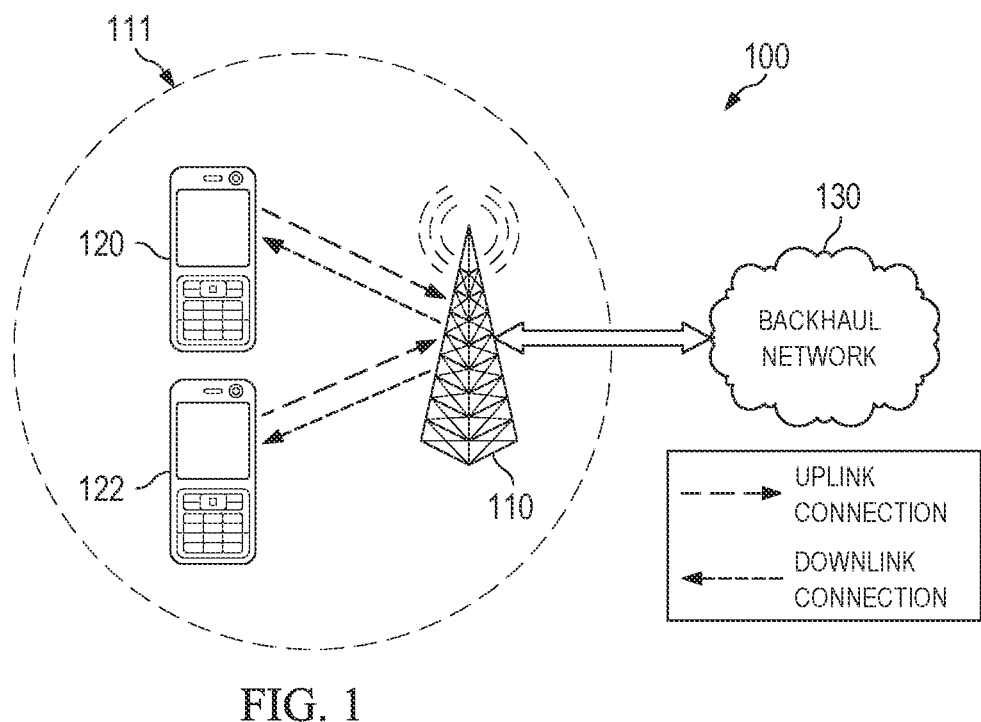
FIG. 1 illustrates a diagram of an example wireless communication system.

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Sounding reference signals (SRSs) are reference signals transmitted by user equipments (UEs) in uplink (UL) for, e.g., enabling uplink channel estimation, probing channel interference and so forth. Based on the SRSs, a network may be able to perform communication with the UEs with dynamic scheduling. SRSs play vital roles in wireless communications, such as in time division duplex (TDD) downlink (DL) full multi-input multi-output (MIMO) channel state information (CSI) acquisition, TDD/frequency division duplex (FDD) UL CSI acquisition, beam management, frequency-selective scheduling, UL timing advance (TA) maintenance, positioning, and so on.

The configuration for SRS transmissions is generally semi-static, which limits the usefulness of SRSs. Embodiments of the present disclosure provide mechanisms for dynamic triggering and configurations of SRS transmissions.

In some embodiments, a user equipment (UE) may receive downlink control information (DCI) triggering a transmission of an SRS of a SRS resource set. The DCI indicates a time-domain resource in available time-domain resources for transmitting the SRS resource set. The UE may determine a position of the time-domain resource in the available time-domain resources based on the DCI, e.g., the DCI includes an index of the time-domain resource in the available time-domain resources, and transmit the SRS in accordance with the position of the time-domain resource. In an embodiment, when transmission of the SRS in the time-domain resource collides with transmission or reception of another signal, a next time-domain resource in the available time-domain resources may be used to transmit the SRS.

In some embodiments, a UE may receive control information indicating a frequency resource in a carrier for transmission of one or more SRSs. The UE may determine, based on the control information, to segment the frequency resource into segments, where each segment includes contiguous physical resource blocks (PRBs), and transmit a SRS in an orthogonal frequency division multiplexing (OFDM) symbol on a first segment and not on a second segment. In an embodiment, an SRS maybe repetitively transmitted on one or more segments in different OFDM symbols. In another embodiment, SRSs may be transmitted on different segments according to a frequency hopping pattern. In 5G NR, uplink supports OFDM and single-carrier frequency division multiplexing (SC-FDM). A symbol in the present disclosure maybe an OFDM symbol or a SC-FDM symbol. The embodiments of the present disclosure use OFDM symbols merely as example. Those of ordinary skill in the art would recognize that the embodiments are also applicable to SC-FDM symbols.

The embodiments enable transmissions of SRSs to be flexibly triggered, and SRS resources to be dynamically configured. The embodiments also enable transmissions of SRSs to be more closely related to data transmissions to be performed, and allow channel interference situations to be more accurately reflected. This embodiments can significantly reduce the impact of interference to the communications, reduce SRS transmission collisions, reduce SRS overhead, and overall improve the spectral efficiency (SE) of the network and individual devices as well as user experience.

FIG. 1 illustrates an example wireless communication system 100. Communication system 100 includes an access node 110 with coverage area 11. Access node 110 serves a plurality of user equipments (UEs), including UE 120 and UE 122. Transmissions from access node 110 to a UE is referred to as a downlink (DL) transmission and occurs over a downlink channel (shown in FIG. 1 as a solid arrowed line), while transmissions from a UE to access node 110 is referred to as an uplink (UL) transmission and occurs over an uplink channel (shown in FIG. 1 as a dashed line). Services maybe provided to the plurality of UEs by service providers connected to access node 110 through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, users, subscribers, stations, communication devices, CPEs, relays, Integrated Access and Backhaul (JAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL) UL carrier which has an associated DL, and other carriers are called a supplementary UL (SUL) carriers which do not have an associated DL. A cell, or a carrier, may be configured with slot or subframe formats comprised of DL and UL symbols, and that cell or carrier is seen as operating in time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, 6G, High Speed Packet Access (HSPA), Wi-Fi 802.11a/b/g/n/ac, etc. While it is understood that communications systems may employ multiple access nodes capable of communicating with a number of UEs, only one access node, and two UEs are illustrated for simplicity.

In standard antenna element to element channel estimation, a channel between two devices is estimated by having a first device transmit a known signal on a known time or frequency resource (s) to a second device, the received signal at the second device is expressible as:

$$y=Hx+n \qquad (1)$$

where y is the received signal at the second device, x is the known signal (which may be a reference signal, a pilot, or a pilot signal), H is the channel model or response, and n is the noise (and interference for some communication channels). Because x is known by the second device, it is possible for the second device to determine or estimate H from y.

It is noted that the concept of antenna, antenna element, and antenna port may be generally interchangeable, but in some specific scenarios, they can mean different but related subjects. For example, one transmit (Tx) antenna port maybe formed (or virtualized) by multiple antenna elements or antennas, and the receiver sees only the one Tx antenna port but not each of the multiple antenna elements or antennas. The virtualization may be achieved via beamforming, for example.

Figure 2:
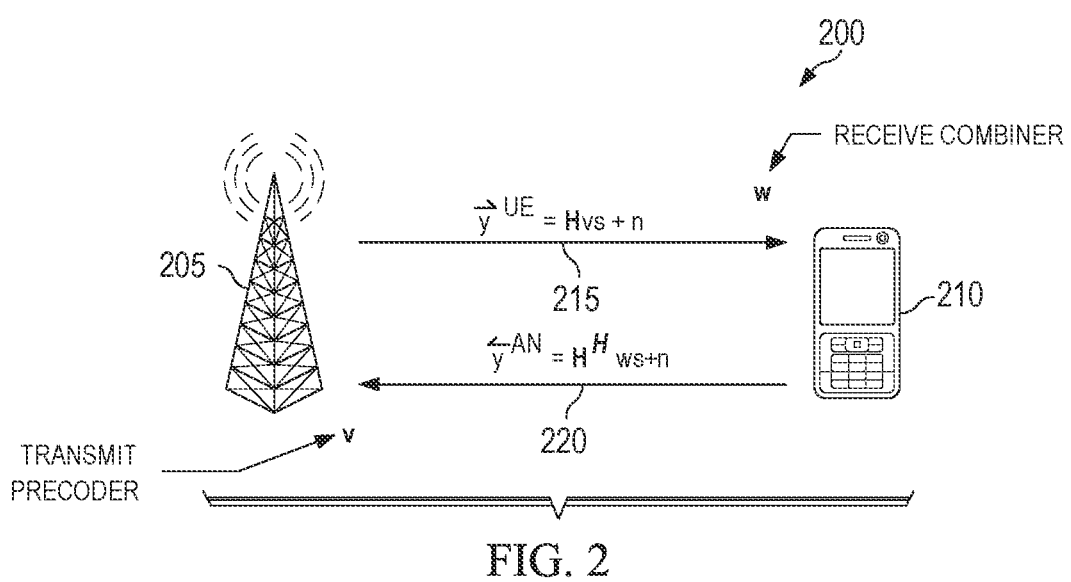
FIG. 2 illustrates a diagram of an example communications system, providing mathematical expressions of signals transmitted in the communications system.

FIG. 2 illustrates an example communications system 200, providing mathematical expressions of signals transmitted in the communications system. Communications system 200 includes an access node 205 communicating with UE 210. As shown in FIG. 2, access node 205 is using a transmit filter v and UE 210 is using a receive filter w. Both access node 205 and UE 210 use linear precoding or combining. Assuming H is $N_{rx} \times N_{tx}$ matrix of a MIMO system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, streams, symbols, pilots, messages, or known sequences transmitted. The receive filter w of multi-antenna systems is of dimension $N_{rx} \times Ns$ and represents the combining matrix. It is noted that the above description is for a transmission from access node 205 to UE 210, i.e., a downlink transmission. The transmission may also occur at the reverse direction (an uplink transmission), for which the channel matrix becomes $H^H$, which is the Hermitian of channel model H, and w may be seen as the transmit filter and v as the receiver filter. The w for transmission and the w for reception may or may not be the same, and likewise for v.

A downlink (or forward) channel 215 between access node 205 and UE 210 has channel model or response H, while an uplink (or backward, or reverse) channel 220 between UE 210 and access node 205 has channel model or response $H^H$, which is the Hermitian of channel model H. Although FIG. 2 depicts only one access node and one UE, it is not limited to this case. Multiple UEs may be served by the access node, on different time-frequency resources (such as FDM-TDM, as in typical cellular systems) or on the same time-frequency resources (such as MU-MIMO, wherein multiple UEs are paired together and each UE is individually precoded). Among the paired UEs, there is intra-cell interference. Also multiple access nodes may exist in the network, some of which may be cooperatively serving UE 210 in a joint transmission fashion (such as coherent joint transmission, non-coherent joint transmission, coordinated multipoint transmission, etc.), dynamic point switching fashion, and so on. Some other access nodes may not serve UE 210 and their transmissions to their UEs cause inter-cell interference to UE 210. The scenario of multiple access nodes and multiple UEs, with access node cooperation to serve a UE and with multi-user multi-input multi-output (MU-MIMO), is a scenario considered herein, and the example embodiments of bi-directional training applies to this scenario.

In Release-17, as specified in 3GPP™ Work Item Description (WID), "Further enhancements on MIMO for NR", 3GPP TSG RAN Meeting #86, Dec. 9-12, 2019, which is incorporated herein by reference, further enhanced MIMO (FeMIMO) SRS enhancement WID includes:

Enhancement on SRS, targeting both FR1 and FR2:

Identify and specify enhancements on aperiodic SRS triggering to facilitate more flexible triggering and/or DCI overhead/usage reduction.

Specify SRS switching for up to 8 antennas (e.g., xTyR, x={1, 2, 4} and y={6, 8}).

Evaluate and, if needed, specify the following mechanism(s) to enhance SRS capacity and/or coverage: SRS time bundling, increased SRS repetition, partial sounding across frequency.

Motivations for flexible triggering include:

Limited triggering info in DCI (1, 2, or 3 bits only).

Inflexible triggering delay.

Vital roles of SRS in DL full MIMO CSI acquisition, BM, UL frequency diversity and MIMO support, etc.

NEW: Vital roles of A-SRS in TDD cooperative MIMO via DL interference probing and mitigation UE to Tx SRS according to DL (pre-)scheduling results, so that gNB can estimate DL interference and then mitigate DL interference via precoder adjustment.

Some similarity with DL NZP CSI-RS based interference probing for better MCS. This is also after scheduling and before PDSCH, but with UL SRS for better precoding (hence bi-directional training, BiT or BIT).

Also closely related to SRS coverage/capacity enhancements.

According to an example embodiment, precoded, unprecoded, or both precoded and unprecoded uplink SRSs are transmitted by UEs to access nodes to assist in dynamic scheduling. These uplink SRSs include specific transmission parameters (such as specific transmission ports, transmission comb, cyclic shift, transmission bandwidth (related to SRS resources), etc.) that may be configured through higher layer signaling (such as through radio resource control (RRC) or media access control (MAC) control element (CE) signaling, for example). In some cases, the uplink SRS may be unprecoded to support uplink channel estimation and assist the network in prescheduling. Upon performing uplink channel estimation, the network preschedules UEs. Prescheduling of UEs may involve a selection of UEs from a plurality of UEs configured by an access node, where the selected UEs include UEs that are suitable for receiving (or transmitting) data. Hence, the selected UEs include a subset of the plurality of UEs configured by the access node. The selected UEs may be referred to as prescheduled UEs. The suitability of a UE may be determined based on factors such as channel quality, signal quality, error rate, data transfer history, quality of service restrictions, etc.

The prescheduling of UEs may precede an actual scheduling required for a data transmission (or reception) and the actual data transmission (or reception). In general, scheduling is not predictable. That is, the number of UEs and which subset of UEs selected for prescheduling are not known during higher layer configuration. Therefore, after prescheduling, the network may decide to re-configure the semi-static configured SRS parameters based on the subset of UEs chosen in prescheduling. As such, apparatus and methods supporting a more dynamic configuration of control signals are needed.

Interference probing and prescheduling may be performed by the network after UEs transmit the uplink SRS. As described previously, prescheduling is a process where the access node selects a subset of the UEs, which the access node has configured, for data transmission or reception. The selected UEs maybe configured to transmit precoded SRSs. These precoded SRSs may be referred to as triggered SRSs. The access node may use the precoded SRSs to determine a downlink precoder (referred to as transmit filter v above). The prescheduling may precede the actual scheduling for data transmission (or reception) and may be performed during a training phase (such as for example during bi-directional training (BiT or BIT)) to determine the downlink precoder (and combiners).

BIT, also known as forward-backward training, is a generally distributed training procedure with low computational complexity that is used to train and update transmit precoders and receive combiners without explicitly estimating the CSI. BIT may adapt transmit beamformers, which may also be commonly known as transmit precoders, transmission filters, spatial transmission filters, transmit filter, analog precoder, and the like and receiver combiners (which are also commonly known as receive filter, spatial receive filters, analog combiner, and the like) in TDD MIMO communications systems. In BIT, neither device (a transmitting device or a receiving device) participating in BIT may have a priori knowledge of CSI, especially detailed information about a channel such as channel matrix H or covariance matrix of the channel, wherein the channel may be one between a UE and its serving access node(s) or one between a UE and its interfering access node(s) (which generally requires information exchanges among access nodes, such as channel information about an interfering link or RS information so that the UE or access node can estimate the interfering link). An iterative form of BIT consists of forward training (e.g., in a downlink direction) and backward training (e.g., in an uplink direction) that are repeated until convergence is achieved. A one-shot BIT includes a single forward training step and a single backward training step. BIT is capable of adapting to unknown interference and can suppress interference without any channel estimation or CSI feedback, thereby making BIT less sensitive to the orthogonality of training sequences. A more detailed discussion of BIT is presented in a U.S. patent application Ser. No. 15/983,692, filed on May 18, 2018, and entitled "System and Method for Communications System Training," which is hereby incorporated herein by reference in its entirety.

Uplink probing involves the estimation of uplink channels between the access node and UEs served by the access node after reception of the uplink SRS, which reflects the interference situation at neighboring cells.

FIG. 3 illustrates a flow diagram of operations 300 occurring in an interference probing process. Operations 300 may be indicative of operations occurring in an interference probing process involving an access node and one or more UEs.

Operations 300 begin with the one or more UEs transmitting uplink SRSs (block 305). The uplink SRSs may be transmitted by active UEs that are configured by the access node, and may be used for uplink channel estimation of uplink channels between the configured UEs and the access node. In addition to being used for uplink channel estimation, the uplink SRSs may be used by the access node to select UEs for prescheduling. As discussed previously, prescheduled UEs are UEs selected by the access node, from its configured UEs, to transmit trigger based uplink SRSs, which are used by the access node to determine downlink precoders. In an embodiment, the uplink SRSs transmitted by the one or more UEs in block 305 may be unprecoded. In an embodiment, instead of the uplink SRSs, feedback transmitted by the one or more UEs is used by the access node to select UEs for prescheduling. The access node performs uplink channel estimation (block 307). The estimation of the uplink channels is performed using the uplink SRSs transmitted by the one or more UEs, for example. Alternatively, the estimation of the uplink channels is performed using the feedback transmitted by the one or more UEs.

The access node preschedules UEs (block 309). The access node may preschedule UEs based on the uplink SRSs or feedback received from the one or more UEs. As an example, the access node selects UEs associated with uplink SRSs (or feedback) received with highest signal quality measure. Examples of signal quality measures include SINR, SNR, RSRP, RSRQ, received signal power, and so on. The access node may select the UEs associated with uplink SRSs received with signal quality measures that exceed a specified threshold. The specified threshold may be specified in a technical standard, an operator of the communication system, or through collaboration between the access node and the UEs, for example. The access node may select a specified number of UEs associated with uplink reference signals received with signal quality measures that exceed a specified threshold. The specified number may be specified in a technical standard, an operator of the communication system, or through collaboration between the access node and the UEs, for example. As an example, the access node may preschedule UEs based on channel quality indicators (CQIs) of the uplink channels, or precoding matrix indicators (PMIs) associated with the UEs. The access node transmits downlink control information (DCI) intended for the prescheduled UEs to trigger SRS transmission with specific parameters and to assist UEs in the measurement (e.g., use) of the downlink ports. The downlink control information may provide to the prescheduled UEs the SRS parameters, as well as related downlink associations. In other words, the downlink control information configures the SRS parameters and the related downlink associations. The downlink control information may indicate to the prescheduled UEs which of the downlink CSI-RS are assigned to the prescheduled UEs for proper measurement and determination of downlink combiner and/or uplink precoder. In an embodiment, the DCI maybe a group based DCI addressing to a group of UEs (e.g., all of active UEs or a subset of active UEs). In another embodiment, the DCI maybe a unicast DCI (such as 5G NR DCIs) addressed to a UE. The DCI (in either case) includes modified or added fields that signal the SRS parameters. The access node may transmit CSI-RSs (block 311). The CSI-RSs (if the access node is to transmit the CSI-RSs) maybe transmitted in a precoded or unprecoded manner. The UEs may perform downlink channel estimation (block 313). In situations where the access node transmits the CSI-RSs, the UE performs downlink channel estimation in accordance with the received CSI-RSs. In an embodiment, only the UEs that received the downlink control signals (i.e., the prescheduled UEs) perform downlink channel estimation.

The prescheduled UEs transmit triggered uplink SRSs (block 315). The prescheduled UEs transmit the uplink SRSs as configured by the downlink control signals. In an embodiment, the uplink SRSs may be precoded or unprecoded (with no information contained therein). The uplink SRSs are transmitted in accordance with an SRS configuration. As an example, a prescheduled UE transmits its uplink SRS in configured SRS resources, over configured transmission ports, using configured subbands, combs, and cyclic shifts, and with configured transmission bandwidth, as configured by the downlink control signals.

The SRS configuration may include configurations of SRS parameters. The configuration of the SRS parameters, such as the SRS resource sets (SRS resources within a set), SRS transmission bandwidth, SRS transmission ports, SRS transmission comb and cyclic shift, etc., may be performed using higher layer configuration. An SRS resource set may include one or more SRS resources, and a SRS resource set is triggered as a whole. A SRS resource may specify parameters for one or more SRS transmissions, e.g., number of ports, REs to be used for transmitting a SRS, a sequence to be used for a SRS, whether a SRS is aperiodic or periodic or semi-persistent, an associated DL signal of a SRS, and so on. TS 38.214, v16.5.0, 2021-04, is incorporated by reference, specifies SRS parameters configured by higher layer parameter SRS-Resource or SRS-PosResource, and also SRS-ResourceSet. TS 38.331, v16.4.1, 2021-04, which is incorporated by reference, specifies SRS-Resource and SRS-ResourceSet information elements. Arrangements of SRS resources or ports may be defined by the network and the network may configure the UEs with different arrangements. In addition, the network may configure the UEs with a different mappings (e.g., relationships, associations) between downlink ports, layers, reference signals (such as DMRS, CSI-RS), and uplink port or layers (SRS).

A key to support BiT and various SRS enhancements is to increase the flexibility of aperiodic SRS (A-SRS, A SRS, AP-SRS or AP SRS) triggering, for at least the following motivations, in addition to the BiT related motivations. That is, the flexible A-SRS triggering may be designed and used beyond BiT applications. For example, the design to support BiT can also be used for the special case of zero-forcing (ZF) without any inter-cell cooperation such as semi-static coordination. A-SRS can be used to probe DL channel/interference for the paired UEs within a cell. That is, a UE transmits A-SRS on the PRBs indicated by the network which are to be used for PDSCH, and the network adjust PDSCH precoding based on these partial bandwidth A-SRS, instead of based on persistent/semi-persistent SRS (P/SP SRS, or P/SP-SRS) sent by UE regularly to cover the entire wideband and with longer periodicity in typical ZF schemes. Traditional ZF is based on P/SP SRS in general. The SRS has to cover the wideband (with or without hopping), and all active UEs have to sound. Therefore, the periodicity of P/SP SRS cannot be small for all UEs, otherwise the SRS would lead to significant overhead. In fact, when ignoring the inter-cell interference (or the covariance matrix for inter-cell interference), the above scheme reduces to single-cell massive MIMO, i.e., ZF, except that the sounding used for ZF is based on A-SRS whose frequency-domain resources, ports, and beamforming are tied to the PDSCH. Only UEs to be scheduled with PDSCH in the next few transmission time intervals (TIIs) will transmit A-SRS. The A-SRS PRBs, ports, and beamforming are the same as the prospective PDSCH. The A-SRS is used by the network to adjust ZF precoders for the PDSCH. Therefore, the aging of A-SRS will not exceed few TIIs, which ensures high accuracy of the precoding/beamforming leading to high spectral efficiency (SE). With these A-SRS, the P/SP SRS periodicity can be increased, reducing the overall SRS overhead. The A-SRS based ZF with DL interference probing without any inter-cell coordination hence can perform better than P/SP-SRS based ZF in terms of beamforming accuracy, interference suppression, and reduced overhead. The key standard component needed to support this enhancement is still flexible A-SRS triggering, similar to BiT.

Limited triggering information in existing DCIs (1, 2, or 3 bits only):

SRS transmissions are associated with many parameters, such as comb, cyclic shift, transmission bandwidth in terms of the number of PRBs, on UL or SUL of a serving cell, antenna port(s), etc. In existing standards, A-SRS can be triggered via an SRS request field in a DCI, and the field may include 1, 2, or 3 bits. These bits can indicate 1) certain indicated SRS resource set(s) of the current serving cell, or 2) SRS resource set(s) on certain indicated serving cells, or 3) one of the UL and SUL. However, many other SRS transmission parameters cannot be indicated in DCI and can only be specified in RRC configuration signaling. For example, because of the DCI bitwidth limitation, the network may have to configure a few SRS resource sets together or configure a few serving cells together, i.e., these sets have to be triggered together, which is highly undesirable. In general, the limited triggering information leads to lack of flexibility in many applications as outline below, and hence it is motivated to improve the A-SRS triggering flexibility.

Figure 4:
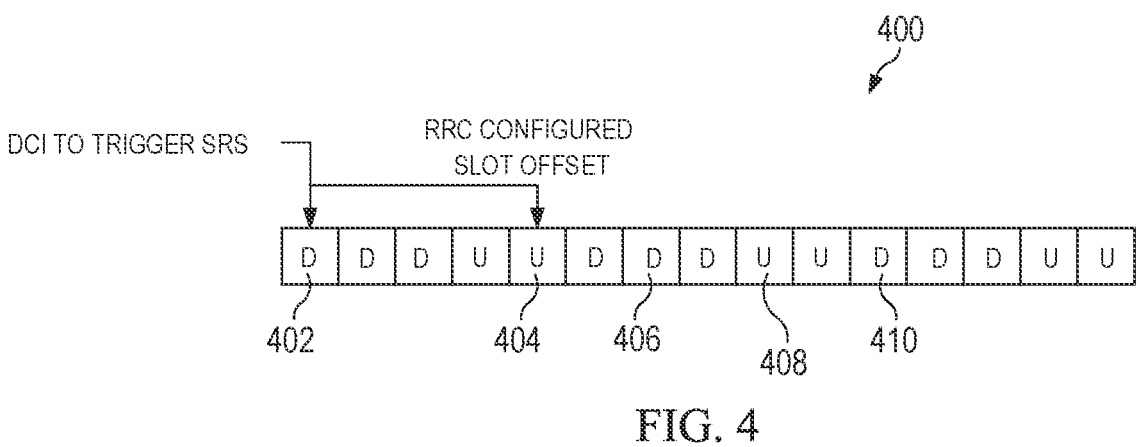
FIG. 4 is a diagram of slots, highlighting an existing SRS triggering and transmission scheme.

Lack Flexibility in Triggering Offset (Delay):

In existing standards, A-SRS triggering offset is configured via a RRC field slotOffset of 1~32 slots, and if this field is not configured, then 0 slot offset is applied. FIG. 4 is a diagram of slots 400, highlighting an existing SRS triggering and transmission scheme. In this example, an A-SRS triggering offset configured for a UE via RRC signaling is 4. A gNB may send a DCI in slot 402 to trigger transmission of a SRS by the UE. Based on the A-SRS triggering offset, the UE is configured to send the SRS in slot 404, which is 4 slots after the slot 402.

This can be limiting in several cases. For example, when using the group-common (GC) DCI format 2_3 to trigger SRS for a group of UEs on one or more of their serving cells, all the SRS transmissions are to occur after their pre-configured offsets with respect to the same DCI triggering slot. For example, all the SRS transmissions will be performed 4 slots after the DCI trigging slot. This may impose significant restriction on network's decision on which slot to send the GC DCI. For another example, SRS triggering by a DL DCI is likely to collide with acknowledgement/non-acknowledgement (A/N) associated with the DL DCI, and SRS triggering by a UL DCI is likely to collide with a PUSCH associated with the UL DCI, especially in TDD when UL slots occur less often. In general, the main purpose of A-SRS triggering is to provide flexibility in SRS timing, but the pre-determined timeline in the triggering offset along with the mostly fixed slot structure cannot serve that purpose well. Enhancements are needed. For another example, if transmission of the SRS in slot 404 collides with transmission or reception of another signal, the UE may not be able to transmit the SRS even if the UE is triggered to transmit the SRS. Further, the existing scheme limits the use of other available slots for SRS transmissions. For example, because the UE can only transmit the SRS in a slot configured based on the fixed A-SRS triggering offset, even there is another slot, e.g., slot 408 (an uplink slot), that is available for SRS transmissions, the UE is not able to use slot 408 to transmit the SRS. In addition, the existing scheme limits selection of available slots for SRS triggering. For example, slot 406 (a downlink slot) is available for downlink transmissions, however, slot 406 cannot be used for triggering SRS transmissions because, based on fixed A-SRS triggering offset, 4 slots after slot 406 (which is slot 410) is not an uplink slot and cannot be used to transmit the SRS.

Various Vital Roles of A-SRS:

A-SRS plays vital roles in TDD DL full MIMO CSI acquisition, TDD/FDD UL CSI acquisition, FR2 beam management, frequency-selective scheduling, UL timing advance (TA) maintenance, positioning, etc. It is also crucial for FDD DL performance. However, the lack of flexibility described above in SRS triggering limits the usefulness of SRS. For instance, if SRS is dropped due to collisions caused by inflexibility in triggering offset described above, then CSI acquisition and frequency-selective scheduling maybe impacted. Note that CSI acquisition and frequency-selective scheduling can be highly dynamic and therefore P/SP-SRS are not suitable. In LTE Rel-14 SRS carrier-based switching, autonomous A-SRS retransmission is introduced so that a dropped A-SRS triggered by a DL DCI (i.e., colliding with A/N) would be autonomously retransmitted in the next configured SRS transmission occasion, but this feature is not yet supported in 5G NR. To make P/SP-SRS and A-SRS well complement each other, P/SP-SRS can be configured with long periodicities (to avoid excessive overhead and complexity) and the network relies on A-SRS for fast response to traffic load and CSI (especially dynamic interference). Therefore, flexible A-SRS triggering can be beneficial in many cases due to various vital roles played by A-SRS and should be supported.

Tightly Related to SRS Capacity/Coverage Enhancements:

SRS coverage/capacity enhancements may include, but not limited to: 1) SRS capacity enhancement via SRS on partial bandwidth, for which the bandwidth may be dynamically indicated via DCI; 2) SRS capacity enhancement via SRS on unused PRBs/symbols in PUSCH/PDSCH region, for which the SRS time-frequency resources may be dynamically indicated via DCI on the fly based on unused resources of a TTI; 3) SRS capacity enhancement via SRS multiplexed (on the same symbol) with other signals, e.g., A/N, to accommodate flexible SRS multiplexing to maximize SRS capacity; 4) SRS coverage enhancements via narrow-band transmission based on frequency selectivity (rather than pre-configured PRBs), and so on. Some of the enhancements are also applicable to P/SP-SRS, however, especially for capacity enhancement, the SRS needs to have sufficient flexibility, e.g., when the network identifies a chance for A-SRS to opportunistically fill a gap in time-frequency resources (e.g., an unoccupied symbol in a slot, a few unoccupied PRBs, etc.), it may trigger a UE to perform the A-SRS. Therefore, flexible triggering of A-SRS can be also useful to SRS capacity/coverage enhancements.

In order to effectively convey information about dynamic interference conditions to the network, a gNB can indicate UEs how the SRS should be transmitted, including the time/frequency resource allocation and port selection for the SRS corresponding to a prospective PDSCH. This means that the network needs to dynamically adjust more SRS transmission parameters (e.g., PRB allocations, port selection) than that in conventional SRS transmission. Embodiments are provided for SRS transmissions with parameters tied to DL transmission, including PRB allocation, time domain (or time-domain) resource allocation, and port allocation.

An embodiment is for indication of A-SRS PRB/port allocation. The SRS PRB/port allocation may be the same as the prospective PDSCH and may be dynamically indicated.

An embodiment is for A-SRS beamforming indication. The SRS beamforming can be based on DL channel measurement resource (CMR), and to better reflect potential DL interference, it is more desirable to be based on DL CMR and IMR, one or both of which may be dynamically indicated. An embodiment is for A-SRS triggering offset. To utilize A-SRS to estimate interference for interference mitigation via precoding adjustment, the gNBs do not need to detect each UE's SRS sequences. Received SRS power accumulated on each gNB receiving antenna port should be sufficient. Thus, the A-SRS can be transmitted on overlapping resources to reduce overhead. However, the A-SRS triggers may be sent to different UEs at different times. To enable A-SRS overlap, A-SRS triggering offsets may be dynamically indicated to different UEs. The triggering offset may be similar to the k0 and start and length indicator (SLIV) (i.e., time domain resource assignment (TDRA)) design for PDSCH. To further reduce overhead, k0 and start and length indicator (SLIV) may not refer to the absolute slot/symbol offsets but slot/symbol offsets based on configured SRS slots/symbols. The TDRA overhead may be further reduced not to indicate the slot, for example, but just the symbol. The TDRA for SRS may be omitted in DCI and based on RRC/MAC.

In the following, the time-domain resources that can be used by an A-SRS are clarified. Based on the time-domain resources that can be used by the A-SRS, the trigger offset design and indication are then discussed.

The time-domain resources that can be used by an A-SRS with flexible triggering may be defined to avoid potential ambiguity. For example, an embodiment proposal may delay an A-SRS transmission to a next "available" slot, but if the network and a UE interpret the "available" slot differently, errors can occur. Possible A-SRS time-domain resources may include time-domain resources on which SRS transmissions are not precluded, such as all the slots and orthogonal frequency division multiplexing (OFDM) symbols not configured as DL by a RRC configuration. In other words, possible A-SRS time-domain resources may be a set of potential A-SRS transmission opportunities in the time domain. For instance, all the slots and OFDM symbols that are for UL or flexible according to TDD-UL-DL-Config-Common or TDD-UL-DL-ConfigDedicated maybe considered as possible A-SRS time-domain resources. For another instance, all the slots and OFDM symbols, regardless of whether they are configured as DL, UL, or flexible, may be considered as possible A-SRS time-domain resources. The former approach has the advantages of, e.g., reduced overhead for triggering offset indication (since the indication may need to refer to a subset of the slots/symbols as opposed to all slots/symbols), but it has a major disadvantage, which is that the determination of whether a slot/symbol is DL, UL, or flexible may be complicated and may also change over time, which may lead to confusion. On the other hand, the latter approach may require more bits to cover the same time duration, or same bits but covering shorter time duration, but it significantly simplifies the design. In case that a slot/symbol's transmission direction is overwritten by a DCI, no ambiguity would arise from the latter approach. The latter approach provides the same A-SRS time-domain resources for FDD and TDD, which is advantageous for cases that both FDD and TDD are aggregated. The latter approach can also enable some unused DL slots/symbols to be potentially used for A-SRS with proper UL/DL switching gaps, which further improves the triggering flexibility of A-SRS. Therefore, in an embodiment, all slots/symbols may be specified as possible A-SRS time-domain resources. For either approach, if the numerology changes between the received DCI and the A-SRS transmission, the A-SRS is dropped.

As used herein, the possible A-SRS time-domain resources may also be referred to as available time-domain resources for transmitting SRSs of an A-SRS, or time-domain resources available for SRS transmissions of an A-SRS, or available time-domain resources for an A-SRS. As used herein, a SRS of an A-SRS refers to a SRS of an aperiodic SRS resource set. A-SRS generally refers to, in the art, an aperiodic SRS resource set. Other terminologies may be used, e.g., valid time-domain resources for transmitting SRSs, or admissible time-domain resources for transmitting SRSs, without departing the spirit and principle of the present disclosure. It is also noted that "transmit SRS" and "transmit SRS resource" may also be used when referring to SRS.

When explicitly or implicitly indicating the time-domain resources allocated to a flexible A-SRS, the resource allocation granularity may also be defined. For example, the resource indication in the DCI may be slot-based, in which case the OFDM symbols to be used by the A-SRS are based on RRC configuration, i.e., the DCI can flexibly indicate in which slot the A-SRS is to be transmitted (such as 2 slots later than the current DCI slot) but does not provide symbol information (provided in RRC, for instance, to reduce DCI overhead). For another example, the DCI indication may be mini-slot (non-slot) based, e.g., on the 5th mini-slot of the 2nd slot after the current DCI slot, or on the 10th mini-slot after the current DCI mini-slot. This may be especially useful for ultra-reliable low-latency communication (URLLC) which already operates with mini slots. For yet another example, the DCI indication may be OFDM symbol based, e.g., on the 10th symbol of the 2nd slot after the current DCI slot, or on the 20th symbol after the current DCI symbol. Generally, finer granularity requires higher indication overhead, but offers more flexibility.

In some embodiments, the reference time (starting point) of a SRS triggering offset may be clarified. The reference time is a point used to start counting the SRS triggering offset. One way is to define the starting point based on the current DCI slot/mini-slot/symbol (in which the DCI is transmitted to trigger an SRS transmission). Note that generally the reference time granularity should be consistent with the A-SRS time-domain resource allocation granularity. Other ways may also be considered, such as relative to the current DCI slot plus the slot offset if already configured by RRC, or relative to the next flexible/UL slot/symbol. If the granularity is slot, then the current DCI slot is considered as the reference time (slot 0) for A-SRS triggering offset. In this case, the reference time may also be referred to as a reference slot. If the granularity is mini-slot, then the mini-slot immediately after the current DCI mini-slot is considered as the reference time (mini-slot 0) for A-SRS triggering offset. If the granularity is symbol, then the symbol immediately after the last symbol of the current DCI is considered as the reference time (symbol 0) for A-SRS triggering offset. If the A-SRS is for CSI acquisition for a specific UL/DL data transmission, the A-SRS time may be relative to (before) the association data transmission (for URLLC, etc.). In general, the design can be readily extended to cases where the triggering offset is relative to a reference timing, and the reference timing may be specified in a standard, a RRC configuration, a MAC signaling, or a DCI field (e.g., indicating a slot/symbol).

Therefore, the following designs, and any combinations of them are also possible for an A-SRS:

flexible A-SRS time-domain resources

Option A1: On all slots/OFDM symbols not configured for DL in TDD-UL-DL-ConfigCommon or TDD-UL-DL-ConfigDedicated Option A2: On all slots/OFDM symbols flexible A-SRS time-domain resource allocation. The allocation granularity may be:

Option B1: Based on slots

Option B2: Based on slots and is mini-slots

Option B3: Based on slots and OFDM symbols flexible reference time for SRS triggering offset, Option C1: The reference time is based on the current DCI's slot/mini-slot. When the granularity is slot, the current DCI slot may be considered as the reference time (slot 0) for A-SRS time-domain resources and triggering offset. When the granularity is mini-slot, then the mini-slot immediately after the current DCI mini-slot may be considered as the reference time (mini-slot 0) for A-SRS triggering offset reference point.

Option C2: If the reference point is based on symbol, then the symbol immediately after the last symbol of the current DCI may be considered as the reference point.

If the A-SRS is for CSI acquisition for a specific UL/DL data transmission, the A-SRS time maybe relative to (e.g., before) the association data transmission (for URLLC, etc.). If the A-SRS is jointly with data, then the slot before the data with UL symbols available for the SRS may be the reference time. These may require a negative A-SRS triggering offset to be needed in some case.

Option C3: The reference point is based on the next UL/flexible slot/symbol.

When combining the different options, generally some consistency should be adopted. For example, if Option A2 based on symbols is considered, then Option B3 based on symbols should be used, and Option C3 based on symbols should be used. Similarly, they may be all based on mini-slots, slots, etc.

With the above clarified, we can move on to A-SRS triggering offset indication design. We provide following embodiment proposals for indicating an A-SRS triggering offset. The following embodiments are described with time resource granularity based on slot. Other granularities may be readily applicable for those of ordinary skills in the art.

Proposal 1: Delay an SRS transmission to an available slot later than the triggering offset defined in the current specification according to the parameter slotoffset (see TS 38.214 v16.5.0, 2021-04, TS 38.331 v16.4.1, 2021-04), including possible re-definition of the triggering offset.

There are at least several cases that delaying the SRS transmission to a next transmission opportunity (e.g., the next available time-domain resource for SRS transmissions) would be useful. In the existing design, when using the group-common (GC) DCI format 2_3 to trigger SRS for a group of UEs on one or more of their serving cells, all the SRS transmissions are to occur after their pre-configured offsets with respect to the same DCI triggering slot. This may impose significant restriction on network's decision on which slot to send the GC DCI. For another example, SRS triggering by a DL DCI is likely to collide with the A/N associated with the DL DCI, and SRS triggering by a UL DCI is likely to collide with the PUSCH associated with the UL DCI, especially in TDD when the UL slots occur less often. In LTE Rel-14 SRS carrier-based switching, autonomous A-SRS retransmission is introduced so that a dropped A-SRS triggered by a DL DCI (i.e., colliding with A/N) would be autonomously retransmitted in the next configured SRS transmission occasion, and design along this line can provide more opportunities for the dropped A-SRS to be transmitted later. With the A-SRS time-domain resources and granularity clarified, the A-SRS in collision with another transmission may be autonomously delayed to the nth transmission opportunity, e.g., the nth slot/mini-slot/symbol within the A-SRS time-domain resources with n>0, and if the resources on the nth transmission opportunity are not occupied by other transmission with equal or higher priority, the A-SRS may be transmitted there, but if the resources are occupied by other transmission with higher priority, the A-SRS shall not be transmitted there (which may be further delayed or dropped). Some rules may be specified to drop the A-SRS, such as a maximum time duration in terms of milliseconds or slots, a maximum number of delaying operations (i.e., trials), having to be before a certain slot (e.g., before the next slot, which is an intra-slot delay for low latency purpose), etc.

Closely related to this issue is the priority of flexible A-SRS. At least for some cases, the A-SRS may be treated with higher priority and should not be dropped in the first place. The higher priority may be explicitly assigned by the network with a priority flag, or implicitly assigned if the A-SRS is associated with a URLLC transmission or a specific data transmission (e.g., the A-SRS is for interference probing of a specific data transmission, as opposed to generic CSI acquisition purpose).

Regarding the re-definition of the triggering offset, a few options may be considered, which may also depend on how the A-SRS time-domain resources are specified. The triggering offset may be indicated as a slot offset and symbol position(s), similar to the k0 and SLIV design for PDSCH or the k2 and SLIV design for PUSCH. To further reduce overhead, k0, k2, and SLIV may not refer to the absolute slot/symbol offsets but slot/symbol offsets within the A-SRS time-domain resources. If the indicated A-SRS symbol length is longer than the RRC-configured A-SRS symbol length, the A-SRS may repeat, hop, or split in time domain to fill up the indicated symbols. Further details of splitting will be provided below. The indicated A-SRS symbols may also cross the slot boundary and go into the next slot if the indicated symbol length spans into the next slot, similar to existing PUSCH design. If the numerology is changed across the slot boundary, the A-SRS on the next slot may be cancelled. Generally, the UL/DL TDRA field design can be reused/enhanced for A-SRS triggering offset indication.

Proposal 2: Indicate Triggering Offset in DCI Explicitly or Implicitly

To explicitly indicate a triggering offset, the A-SRS triggering DCI can be added with a triggering offset field, or more general, a UL/DL TDRA field may be reused or enhanced for A-SRS.

An implicit triggering offset maybe the next SRS trans- mission opportunity, e.g., an available time resource, such as a slot, in which a SRS may be transmitted, within the A-SRS time-domain resources. That is, the UE can autonomously look for the next chunk of A-SRS time-domain resources that is available to transmit all the configured or indicated A-SRS symbols. This design may be seen as autonomous delaying and combined with the explicit triggering offset approach. For example, if a SRS TDRA field is absent, or the SRS TDRA indicated symbols are occupied, the UE will autonomously find the next available opportunity to transmit SRS. This mode of operation may be enabled/disabled by a flag in RRC (similar to LTE Rel-14 design of soundingRS-FlexibleTiming configuration) or in DCI. The UE may start to search from the DCI-carrying slot, but if a slotoffset value is configured in RRC and/or indicated by DCI, the UE may search from the slot with the configured/indicated offset. In an embodiment, if the reference slot (based on the DCI-carrying slot, and optionally also the RRC configured slot-offset; see below for further embodiments) is slot n, and the DCI indicates a slotoffset t, then the UE starts to search from slot n+t. If slot n+t is an available slot (see below for further embodiments) for the indicated A-SRS, then the UE transmit the A-SRS on that slot. But if slot n+t is not an available slot for the A-SRS, the UE will search for the next available slot from slot n+t and transmit on the next available slot if the autonomous delaying is configured/activated in case of a collision causing the A-SRS not able to be sent in slot n+t. The search may extend to at most k slots, i.e., by slot n+t+k, if the UE cannot find an available slot, the A-SRS is dropped. Note that a collision occurs if the symbols in the slot that the SRS is supposed to occupy are occupied by other transmissions/receptions with higher priorities, and hence the SRS cannot be sent.

An embodiment is provided for assigning higher priority for an A-SRS with newly introduced flexibility. The A-SRS with at least one parameter newly introduced in this appli- cation in a SRS request field to support BiT and other enhancements may be assigned with higher priority, so that when it collides with other SRS/UL transmissions, the other transmissions are dropped.

In some embodiments, reference slot designs and avail- able slot designs are provided. A reference slot is the slot that the UE/gNB starts to count for the slotoffset value. A given aperiodic SRS resource set is transmitted in the (t+1)st available slot counting from a reference slot, where t is indicated from DCI, or RRC, and the candidate values of t at least include 0.

There could be two options for the reference slot:

Opt. 1: Reference slot is the slot with the triggering DCI.
Opt. 2: Reference slot is the slot indicated by the legacy triggering offset.

Opt. 1 and Opt. 2 have their respective pros and cons. Since the A-SRS resource set is transmitted only after the reference slot, if the configured legacy RRC slotoffset value is, e.g., 4, then Opt. 2 can only trigger A-SRS after 4 slots. So in case that the network wishes to trigger A-SRS after 2 slots (e.g., an UL slot occurs after 2 slots), only Opt. 1 can meet the requirement. In this sense, Opt. 1 is more flexible than Opt. 2. On the other hand, with a non-zero RRC-configured slotoffset value, Opt. 2 can allow more time for the UE to prepare the A-SRS transmission, and can allow the network to trigger A-SRS later into the future than Opt. 1 with the same DCI overhead. Comparing the pros and cons, Opt. 1 is more suitable as the enhancements intended in Rel-17 for SRS is to improve the triggering flexibility.

The existing minimal trigger offset and the UE capability for minimum offset have to be accounted for. According to the existing standards, the minimal time interval between the last symbol of the PDCCH triggering the aperiodic SRS transmission and the first symbol of SRS resource is N2 (or N2+14) symbols and an additional time duration $T_{switch}$, where N2 in symbols is determined according to the UE processing capability, and $T_{switch}$ is for the uplink switching gap if any. These requirements defined in the existing standards can be accounted for in specifying the enhance- ment or by the gNB via gNB implementation.

Regarding "in the (t+1)st available slot" described above, this may be interpreted as to count "the first available slot", "the second available slot", until the "(t+1)st available slot". In other words, only the slot resources potentially available for SRS may be counted, including UL slots and flexible slots. Alternatively, the interpretation may be to count "the first slot", "the second slot", until the "(t+1)st slot", and if the "(t+1)st slot" is available, then the A-SRS resource set is transmitted. Therefore, a given aperiodic SRS resource set is transmitted in the (t+1)st slot, if it is an available slot, counting from a reference slot.

For the "available slot" definition, it maybe useful to also consider consecutive slots with consecutive symbols that can be used for the SRS transmission, rather than restricting the symbols within one slot. If this is supported, then it is more likely to accommodate a SRS transmission without collision. Thus, in one embodiment, the following definition of "available slot" maybe adopted:

Based on only RRC configuration, "available slot" is the slot satisfying: there are available consecutive UL and/or flexible symbol(s) for the configured/indicated time-domain location(s) in a slot or consecutive slots for all the SRS resources in the resource set and it satisfies the minimum timing requirement between triggering PDCCH and all the SRS resources in the resource set.

RRC configuration configures different numbers of slot-offset values. For positioning-related SRS, a resource set is configured with multiple slotoffset values by RRC, that is, the slot level offset is defined by the higher layer parameter slotOffset for each SRS resource within the resource set. But for all other SRS, a resource set is configured with only one slotoffset value by RRC. The above description of available slots can be further extended to: A given aperiodic SRS resource within a given aperiodic SRS resource set is transmitted in the (t+1)st available slot counting from a reference slot, where t is indicated from DCI, or RRC, and the candidate values of t at least include 0, and based on only RRC configuration, "available slot" is the slot satisfying: there are available consecutive UL and/or flexible symbol(s) for the configured/indicated time-domain location(s) in a slot or consecutive slots for all the SRS resources in the resource set and it satisfies the minimum timing requirement between triggering PDCCH and all the SRS resources in the resource set. A few further embodiments are provided here. Multiple available slots may be utilized for a SRS resource set if the set is associated with different slotoffsets for different resources. In one embodiment, the relative timing relations among the resources as configured via slotoffsets are maintained in the available slots, e.g., if the slotoffsets are such that resource 2 is 3 slots later than resource 1, then the available slots for a set of n resources should satisfy that there are available consecutive UL and/or flexible symbol(s) for the configured/indicated time-domain location(s) in n sets of single or consecutive slots for all the SRS resources in the resource set, and the minimum timing requirement between triggering PDCCH and all the SRS resources in the resource set is satisfied, and the n resources are on slots (only counting the first slot within each set) with relative slot offsets the same as the configured slotoffsets. This embodiment can be quite complicated, and if one resource cannot fit, then the entire set has to be either dropped or delayed. In another embodiment, each resource within the set is treated independently to be sent on an available slot, and there is no restriction on their relative timing. If one resource cannot fit on the slot n+t associated for the resource, it may be dropped or delayed based on the configuration, but other resources are not affected.

Figure 5:
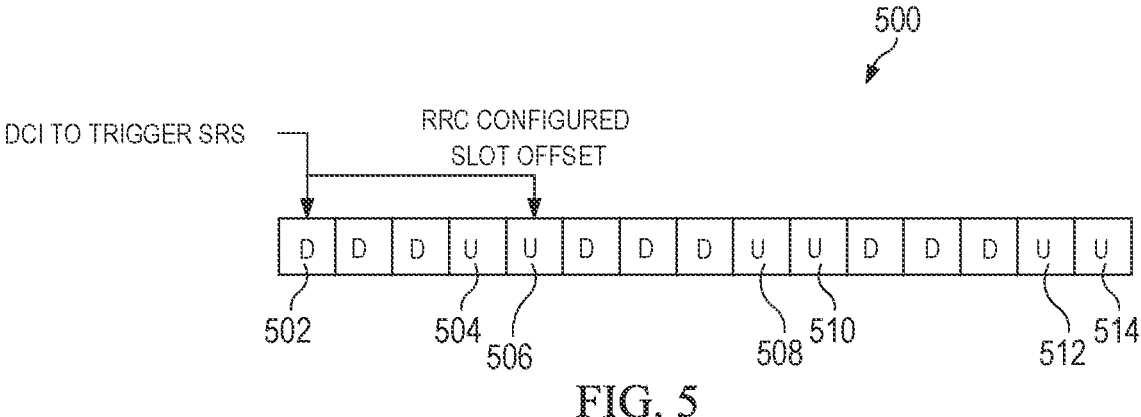
FIG. 5 is a diagram of slots, highlighting SRS triggering and transmission according to example embodiments presented herein.

FIG. 5 is a diagram of slots 500, highlighting SRS triggering and transmission according to an embodiment of the present disclosure. A gNB may send a DCI in slot 502 to trigger transmission of an A-SRS resource set by a UE. If no A-SRS triggering offset is configured for the UE, a reference slot (slot 0) for determining available time-domains resources for the SRS transmissions may be the slot 502 in which the DCI is transmitted. If a minimum timing requirement between the triggering DCI in slot 502 and all the SRS resources is 0~2 slots (i.e., the SRS cannot be sent 0~2 slots after the DCI), then the available time-domains resources (i.e., available slots in this example) for the SRS transmissions after the 0~2 slots may include slots 504, 506, 508 and 510. Each of these slots may be used by the UE to transmit a SRS. The slots 504, 506, 508 and 510 may be labeled/indexed as available slots 1-4. The DCI may indicate which of the available slots 1-4 may be used by the UE for SRS transmission. For example, the DCI may indicate an index/number of a slot in the available slots to be used by the UE to send the SRS, e.g., number 2. The UE, upon triggered by the DCI, may determine the position of the indicated slot (i.e., slot 506) based on the index/number and the available slots, and send the SRS in the determined slot 506. In an embodiment, if the slot 506 is occupied by another transmission/reception, the UE may look for the next time-domain resource in the available time-domain resources, i.e., slot 508 (the slot number 3), and send the SRS in slot 508. If transmission of the SRS has a higher priority than that of another transmission/reception, the UE may transmit the SRS in slot 506, disregarding another transmission/reception.

In a case if A-SRS triggering offset is configured for the UE, e.g., 4, the UE may determine the reference slot based on the A-SRS triggering offset and the slot in which the DCI is sent, in which case, the reference slot will be slot 506, and the available time-domains resources for SRS transmissions may include slots 508, 510, 512 and 514. Similarly, these four slots may be numbered as slots 1-4. The DCI may indicate an index/number of a slot in available slots to be used by the UE to send the SRS, e.g., number 2. The UE, upon triggered by the DCI, may determine the position of the indicated slot (i.e., slot 510) based on the indicated index/number and the available slots, and send the SRS in the determined slot 510. Note that the offset numbering of 1~4 may be mapped to 0~3 alternatively. This example shows only D slots and U slots; in general, some slots may be configured with downlink OFDM symbol(s) at the beginning parts of the slots and uplink OFDM/SC-FDM symbol(s), and each of those slots can still be an available time-domain resource for the A-SRS if the A-SRS may be potentially transmitted on the slot.

In an embodiment, after reception of the uplink SRS, access nodes preschedules UEs and indicates to the pre-scheduled UEs through signaling which portion of the SRS transmission bandwidth, which SRS resources or ports from the different SRS resources or ports arrangements, transmission comb, cyclic shift, and which of the downlink CSI-RS ports (and/or DMRS) are assigned to it. In addition to the listed parameters the indication signaled to the prescheduled UEs may include the association (e.g., mappings, relationships) between the uplink ports, the downlink ports, or bandwidth. The downlink ports may consist of the DMRS and/or CSI-RS ports. In an embodiment, the network uses a group DCI message to dynamically configure the SRS parameters. In another embodiment, a unicast DCI message is used to dynamically configure the SRS parameters. The SRSs transmitted by the prescheduled UEs may be referred to as triggered SRS to differentiate them from the uplink SRSs transmitted by the UEs to facilitate uplink channel estimation, such as in block 305 of FIG. 3. The uplink reference signals (e.g., the SRSs) are used to convey interference situation in the neighboring cells, as well as the serving access node's accounting of the interference suppression receiver capability of the UE. Subsequently, the access node determines the downlink precoder (in accordance with the received precoded SRSs (i.e., the triggered SRSs), for example) and transmits downlink data utilizing the downlink precoder.

The following will provide more details on the indication of the SRS transmission parameters.

As related to signaling the SRS Resources or Ports, the network indicates to the UEs which of the SRS resources or ports are assigned to the UEs. In other words, the UE needs to know which resource of the SRS resource pool or subset of the SRS configured resources to transmit on in the uplink.

In an embodiment, the network configures the UE with different arrangements of resources or ports. The different arrangements of the resources or ports may differ by the cyclic shift, transmission comb, number of symbols (e.g., orthogonal frequency division multiplexed (OFDM) symbols), etc., for example. The different arrangements represent different mechanisms the network may pack the UEs SRS resources or ports. In an embodiment, the different resources or ports arrangements are predefined. Signaling a predefined arrangement of resources or ports may require less overhead than signaling the different values for the cyclic shift, transmission comb, number of symbols (e.g., OFDM symbols), etc. As an example, if there are 8 predefined arrangements, signaling any one of the 8 may be accomplished by signaling a 3-bit index, while signaling the different values may require significantly more than 3 bits. The predefined arrangements may be defined in the 3GPP standard and/or higher layer configured, the network may downsize (further select and signal) a particular configuration after prescheduling (or scheduling) and may signal the downsized arrangement to the UE using DCI.

As an illustrative example of SRS resource or port signaling, consider a communication system with 8 type 1 demodulation reference signal (DMRS) ports. In an embodiment 12 DMRS ports maybe used as an illustrative example. With 8 uplink SRS resources (e.g., ports) for all UEs operating within a single cell and that 8 UEs are prescheduled.

There is a need for the UEs to know which of the 8 uplink SRS resources to transmit on. Therefore, there is a need to signal, to the UEs, in an attempt to inform the UE which uplink SRS resource (or resources) to use, in an efficient way to minimize impact on overall communication system performance. Informing the UEs which uplink SRS resources to use may involve indicating which comb, symbol, cyclic shift, number of OFDM symbols, etc., to use. As discussed previously, in one embodiment the UEs may be configured with different arrangements of these SRS resources or ports. These arrangements maybe specified in a technical standard, by an operator of the communication system, or determined through collaboration between communicating devices, for example. Example arrangements include:

1 physical resource with 8 ports for 8 UEs having cyclic shift 8 (for orthogonality between ports) and comb 2;

1 physical resources with 8 ports for 8 UEs having cyclic shift 8 and comb 4;

8 physical resources with 1 port for each of the 8 UE;

2 physical resources with 4 ports per resources using cyclic shift 4

In a first example embodiment, there is 1 physical resource with 8 ports for the 8 UEs served within the cell, with a cyclic shift of 8 (ensuring orthogonality of SRS transmission), a comb of 2, and repetition over a specified number of symbols (the specified number of symbols maybe specified in a technical standard, by an operator of the communication system, or determined through collaboration between communicating devices, for example). In order to indicate to the UEs which one of the 8 resources to use, a 3-bit indication is sufficient.

In a second example embodiment, there is 1 physical resource with 8 ports for the 8 UEs operating within the cell, with a cyclic shift of 8, and a comb of 4. In order to indicate to the UEs which one of the 8 resources to use, a 3-bit indication is sufficient.

In a third example embodiment, there are 8 physical resources with 1 port per physical resource for each UE operating within the cell, with OFDM symbol multiplexing. In order to indicate to the UEs which one of the 8 resources to use, a 3-bit indication is sufficient.

In a fourth example embodiment, there are 2 physical resources with 4 ports per physical resource for each UE operating within the cell, with a cyclic shift of 4. In order to indicate to the UEs which one of the 8 resources to use, a 4-bit indication is sufficient if some UEs are allocated more than one port, e.g., a UE maybe allocated 2 ports.

These different resources or ports arrangements may be predefined and the network may configure the UE with the different arrangement. The network may signal one or more of these arrangements using DCI for the subset of (prescheduled, scheduled, active) UEs.

The examples presented above are only examples of resource configuration and the actual configuration may not be limited to the aforementioned. In this case the network may use a certain number of bits (for example 3 to 4 bits) in DCI to indicate to the UE which of the arrangements of resources or ports (implicitly indicating the transmission layers, comb and cyclic shift) is assigned to it.

In one embodiment, the network may define a full set of SRS resources/ports and use an indication to indicate for subset. Such a design is similar to the DMRS port indication in 5G NR. In another embodiment, the network may define the subset of SRS resources/ports and use indication to indicate the subset from the configured subsets. In any of these embodiments, a table may be used to summarize all the possible resources set/subsets with the ports (ranks) which may be tied to the cyclic shift, comb, OFDM symbols, offset.

The network may define DCI bit indication that may have a one to one mapping to port indication of the SRS which maybe tied to the cyclic shift, comb, offset, OFDM symbols. The value indicated in the DCI would map to the ports that may be used for SRS transmission. In one embodiment, one port maybe used such as port 0. In another embodiment, multiple ports maybe used and such as for example two ports maybe used for SRS transmission. The field may be referred to as antenna ports and number of layers for SRS and a fixed number of bits maybe used in the DCI to indicate it.

In another embodiment, the access node may transmit configuration information of a plurality of SRS resources to a user equipment (UE). The configuration information includes a plurality of SRS resource sets to the UE, each SRS resource set comprising one or more SRS resources. The access node then transmits to the UE, an indication of one of the plurality of SRS resource set.

The antenna ports to be used for SRS transmission shall be determined according to the ordering of the SRS ports given by the predefined configuration which may be represented by tables. The number of bits which are indicated in the DCI as defined by the groups indicates the ports of transmission which are tied to physical resources such as cyclic shift, comb, and OFDM symbols.

In the situation where a group DCI is used to convey the SRS configuration, the indication of the layers or ports for a UE within the pre-defined SRS port resources is possible. As an example for each cell (e.g., sector, transmission point, etc.), a predefined number of SRS port resources is assigned, such as, 8 or 12 ports, for example. In the group DCI, the network indicates the layers or ports for a UE within the predefined SRS port resources. For example the network has configured a SRS resource for all active UEs in the cell and the SRS resource has the same 8 ports. The group DCI indicates which of the 8 ports are allocated for the UE. The pre-defined SRS port resources maybe specified in a technical standard specification, or signaled from the network to the UE via a RRC configuration signaling, a MAC signaling, and in some embodiments, a DCI. For example, the RRC signaling configures SRS port resources with indexes 0~7 for UE1 as UE1's SRS ports 0~7, SRS port resources with indexes 0~7 for UE2 as UE2's SRS ports 0~7, SRS port resources with indexes 8~15 for UE3 as UE3's SRS ports 0~7, SRS port resources with indexes 8~15 for UE4 as UE4's SRS ports 0~7, etc. This design can also be adopted for UE-specific DCI (such as DCI format 1-1, an enhancement of 1-1 (which is discussed in detail below), etc.) for A-SRS triggering. The DCI may have an antenna port indication field for the A-SRS, which may also be used for antenna port indication for PDSCH in some embodiments, and the UE maps the ports indicated in the field to the pre-defined SRS port resources assigned to the UE. For example, UE1 may receive an enhanced DCI of 1-1 with the antenna port indication field for both PDSCH and SRS indicating value 25 (as in Table 7.3.1.2.2-2 of TS 38.212, v16.2.0, 2020-06 (which is herein incorporated by reference), reproduced here below; for dmrs-Type=1, maxLength=2, which are also signaled to the UE for PDSCH) which corresponds to PDSCH DMRS ports 2 and 6 as well as SRS ports 2 and 6, which is further mapped to SRS port resources 2 and 6. For another example, UE3 may receive an enhanced DCI of 1-1 with the antenna port indication field for both PDSCH and SRS indicating value 25 which corresponds to PDSCH DMRS ports 2 and 6 as well as SRS ports 2 and 6, which is further mapped to SRS port resources 10 and 14.

Table 7.3.1.2.2-2 from TS 38.212 v16.2.0: Antenna port(s) (1000 + DMRS port), dmrs-Type = 1, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

In an example, consider a communication system with 4 UEs, the network may assign the first port for a first UE, two subsequent ports for the second UE, etc. In another embodiment, the network may reuse DMRS port mapping or CSI-RS port mapping.

In one embodiment, the SRS resource is configured for all resource block groups (RBGs) but the scheduling or group DCI allows different UEs be scheduled on different RBGs.

As related to UE identifiers, the UE identifiers are used to reduce DCI signaling overhead. In an embodiment, to further reduce DCI size, unique but short UE identifiers are assigned to the prescheduled UEs. Instead of using long UE identifiers, such as a radio network temporary identifier (RNTI), which may be 10 or more bits long, short UE identifiers that are unique within the prescheduled UEs are assigned to each prescheduled UE. As an example, if there is a maximum of 16 prescheduled UEs, then the short UE identifier may be as short as 4 bits, while if there is a maximum of 8 prescheduled UEs, then the short UE identifier maybe as short as 3 bits. In an embodiment, the short UE identifier may be allocated by the access node and signaled to the prescheduled UEs using RRC messaging, MAC CE messaging, higher layer messaging, and so on.

As related to indicating UE identifiers, the access node may send a DCI trigger to the prescheduled UEs. The indication of the prescheduled UEs maybe included in a dedicated field of the DCI. Additionally, the UE identifiers and the UE identifier field in the DCI may be configured using higher layer signaling.

With the use of UE identifiers, prescheduled UEs are able to decode the DCI that is identified the UE ID. Those prescheduled UEs that are able to decode the DCI identified with their UE IDs are considered to be the triggered UEs. UEs which are configured but not triggered may also attempt to decode the DCI, but they would fail because the DCI is not addressed to them, and hence they are not triggered.

As new UEs are prescheduled or additional set of active UEs are present, the UE identifiers may be renewed and reconfigured, possibly through higher layer configuration, for example.

As discussed previously, there may be an association between the SRS and the DL Reference Signals. In order for a UE to receive precoded (or unprecoded) CSI-RS, the UE needs to know which CSI-RS ports have been allocated, therefore, a CSI-RS port indication needs to be sent to the UE. After the UE receives the CSI-RS port indication, the UE may be able to infer (from the CSI-RS port indication, for example) the preconfigured CSI-RS ports to use to measure the downlink channel and the SRS ports to transmit the SRS because the SRS resource and CSI-RS resource are already preconfigured and there is an association between the SRS and the CSI-RS resources.

Similarly, a UE needs to know which of DMRS ports have been allocated for it. A DMRS port indication needs to be sent to the UE. After the UE receives the DMRS port indication, the UE may be able to infer (from the DMRS port indication, for example) the preconfigured DMRS ports to use to measure the downlink channel and the SRS ports to transmit the SRS because the SRS resource and DMRS resource are already preconfigured and there is an association between the SRS and DMRS resources.

In one embodiment, the SRS indication field which is used to signal the specific arrangement of SRS resources or ports are also used to indicate to the UE a mapping between the uplink and downlink ports (such as DMRS or CSI-RS ports). Because the SRS ports of each UE are identified, the UE may infer the associated ports in the downlink from the configuration (the mapping). In such a case, the associated relationship between the uplink and downlink ports may be configured through higher layer configuration. A fixed mapping may be defined that can identify the association, for example, a one to one mapping between the uplink and downlink ports may be configured. In another embodiment, a permutation between the uplink and downlink ports may be applied as a mapping. The permutation may be specified in a technical standard, by an operator of the communication system, or through collaboration between the network and the UE. Hence, the permutation is known by both the network and the UE. As the UE determines the SRS ports or layers indicated to the UE, the UE may measure the corresponding CSI-RS and/or DMRS for channel estimation and use the measurement to determine the precoder for precoding of the uplink SRS.

In one embodiment, the indication may be implicit. In this case, signaling the SRS resources or ports may be sufficient to signal the association due to the fixed mapping between the resources. In another embodiment, the indication maybe explicit. In this case, a dedicated field that explicitly identifies the downlink CSI-RS, or DMRS for the scheduled UEs may be used.

DCI may have dedicated field to indicate the DMRS-SRS association. It may also have field to indicate the CSI-RS-DMRS association. A table may be defined in the specification that has a one to one mapping of the Uplink port with the downlink ports.

The number of bits used to indicate the association between the downlink port(s) and SRS port(s) may be used for indication of the transmission of one of more downlink ports and the SRS ports which may be indicated by the SRS resources/ports indication fields.

In an embodiment the association is used to indicate not only the port association but also the bandwidth association (active bandwidth part).

In addition to the above mentioned parameters (e.g., UE identifier, an association, and the SRS resources indication), the Group DCI may include some or all of the following:

A resource allocation field which indicates the time and frequency resources (resource block groups for UEs, for example);

An explicit indication of CSI-RS or DMRS ports using dedicated fields in the DCI that may signal the downlink ports. This may also be used by the UE to determine the rank of the transmission. In an embodiment, the UE may infer the rank of transmission in the uplink based on the downlink reception;

A transmit power command used for SRS transmission power control.

Figure 6:
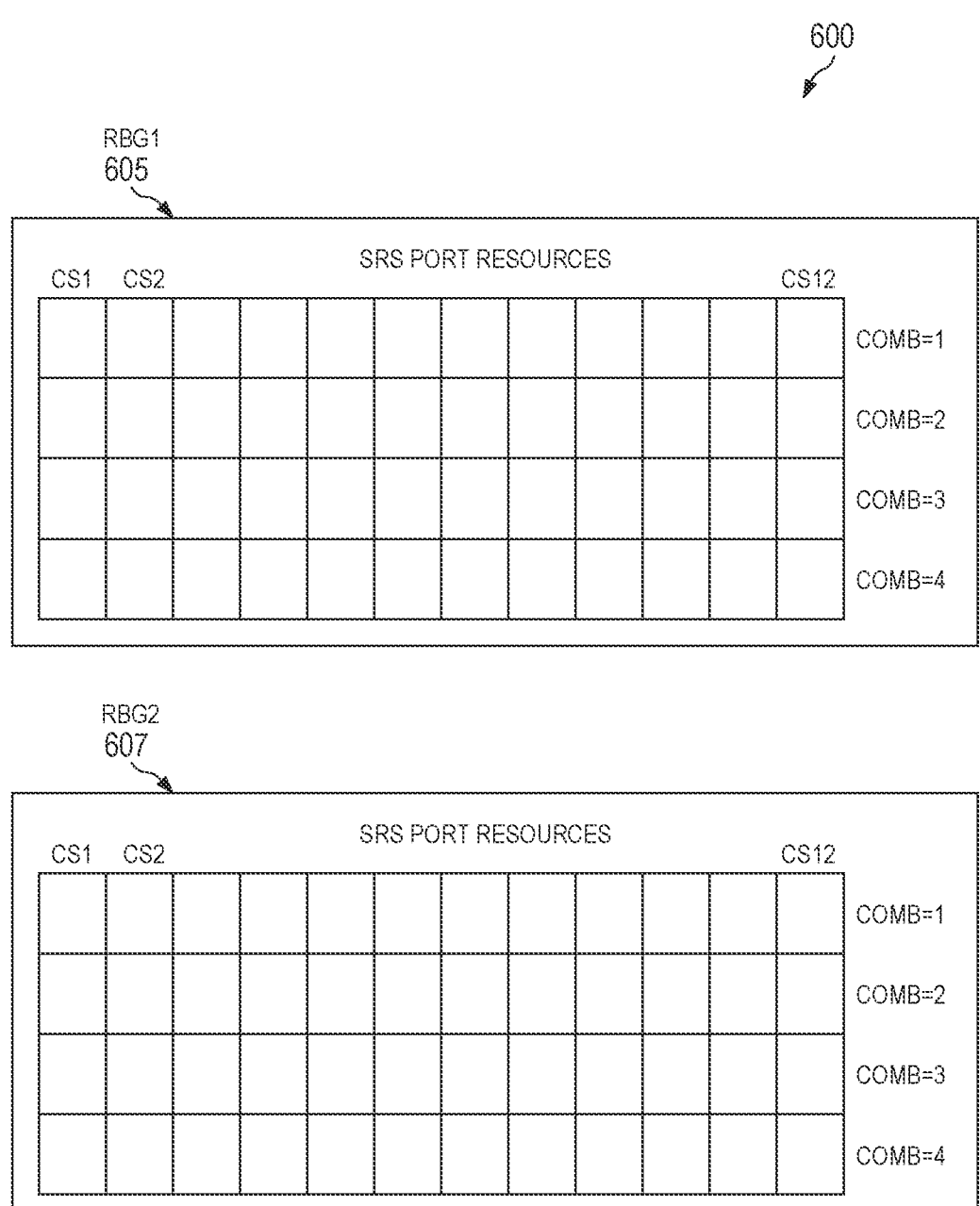
FIGS. 6 and 7 illustrate resource block groups (RBGs) and example mapping of SRS resources and ports according to example embodiments presented herein.
Figure 7:
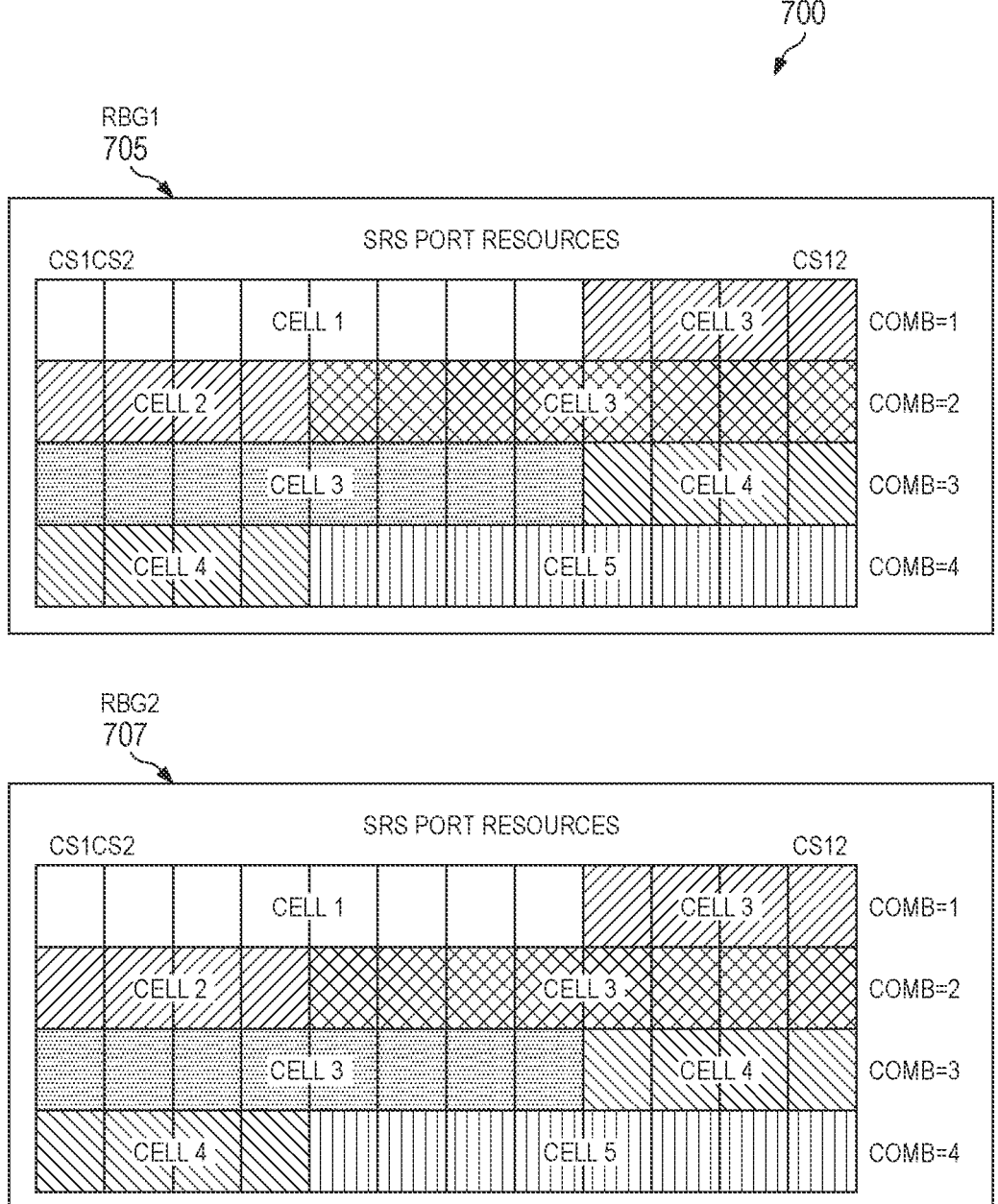

FIGS. 6 and 7 illustrate diagrams 600 and 700 of RGBs 605, 607, 705, and 707, and example mapping of SRS resources and ports. Diagram 600 illustrates RGBs 605 and 607 in a communication system with the following configuration: assume DMRS type 1 (8 ports per RGB per cell for all paired UEs); in another embodiment 12 port DMRS may be considered, and the 8 ports are associated with 8 SRS port resources, selected from n available port resources (e.g., for comb 4, n=48, and for comb 2, n=16). The SRS port resources maybe arranged in a manner similar to those illustrated for RBG1 605 and RBG2 607, and each port resource may be assigned with a global index such as (2, 9) for (COMB shift=2, cyclic shift=9), i.e., the global indexing maybe the same for different RBGs, or (1, 2, 9) for (RBG=1, COMB shift=2, cyclic shift=9), i.e., RBG specific indexing. In some embodiments, instead of RBGs, other time/frequency resource groups can be used, such as (RBG, OFDM symbol), PRB, every 4 RBGs, etc. The SRS from neighboring cells should be multiplexed on the n SRS port resources. In order to indicate, to a UE, which 1, 2, or 4 SRS port resources out of the available n SRS port resources would require more bits than available in a DCI message.

Diagram 700 illustrates RGBs 705 and 707, with the same configuration as discussed in FIG. 6. In an embodiment, UE-group CSI-RS or DMRS design is applied to the SRS. For each cell, there are only 8 predefined SRS port resources (shown in FIG. 7 as different shaded and pattern blocks in the SRS port resources region of the RGBs). Then, in a DCI message (such as a group DCI message or a UE-specific DCI message), the layer or port assignments for a UE are made within the 8 predefined SRS port resources and indicated accordingly. As an example configure a SRS resource for all active UEs in cell 1 (shown as unshaded blocks in the SRS port resources region of the RGBs), and the SRS resource has the same 8 ports. That is, SRS port(s) indicated to a UE configured with the SRS port resources will be mapped to the SRS port resource(s) in a one-to-one fashion. The group DCI message indicates which of the 8 ports are allocated to a particular UE. As an example, rank [1, 2, 4, 1] are signaled for UEs 1, 2, 3, and 4, without needing to indicate the layer index. As another example, the DMRS port mapping of the resources are used. The SRS resource is configured for all RGBs, but the scheduling or group DCI allows different UEs to be scheduled on different RGBs. In an embodiment, a UE (or a cell) is assigned with SRS port resources not consecutive as shown in the figure, that is, a UE in CELL1 may not be assigned with COMB shift=1 and cyclic shifts from 1 to 12. Instead, the ports resources for the UE is distributed (spread out) in the figure, such as (COMB shift=1, cyclic shift=1), (COMB shift=1, cyclic shift=7), (COMB shift=2, cyclic shift=1), (COMB shift=2, cyclic shift=7), (COMB shift=3, cyclic shift=1), (COMB shift=3, cyclic shift=7), (COMB shift=4, cyclic shift=1), and (COMB shift=4, cyclic shift=7). An advantage is that the ports for one UE or one cell are more spread out over the potential SRS port resources, reducing the potential interference/overlap between cyclic shifts close to each other.

Alternative designs to the Group DCI for signaling control information of the SRS are possible. In one embodiment, the UEs identified in a Group DCI share a resource allocation field (Type 0 or Type 1 indication). Such a case may occur in a multi-user multiple input multiple output (MU-MIMO) setting, where UEs may share resource blocks or RBGs. In this situation, preconfigured UEs which are not prescheduled have fields in the Group DCI with trigger set to zero.

In another embodiment, the UEs identified in a Group DCI have separate fields for the indication of the resource allocation fields for each of the UEs. In this case, precon-figured UEs which are not prescheduled have fields with trigger set to zero.

In any of the preceding embodiment, a UE identifier may be used to identify prescheduled UEs. In this way, only prescheduled UE are able to decode the DCI. However, a UE will attempt to decode the DCI to check if it is triggered (prescheduled) or not. For example, all UEs detecting the DCI can attempt to decode the DCI.

In any of the preceding embodiments, the DCI includes a combination of fields listed or subset of the fields aforementioned.

In another embodiment, a modified DCI format, such as DCI format 0_1 (UL Grant) or DCI format 1_1, may be used to dynamically configure triggered (prescheduled UEs) with the SRS parameters aforementioned and the associated downlink PDSCH and/or CSI-RS parameters.

Any of the 5G NR DCI designs may be used to signal the necessary aforementioned such as the necessary fields are added/modified to the DCI.

Figure 8:
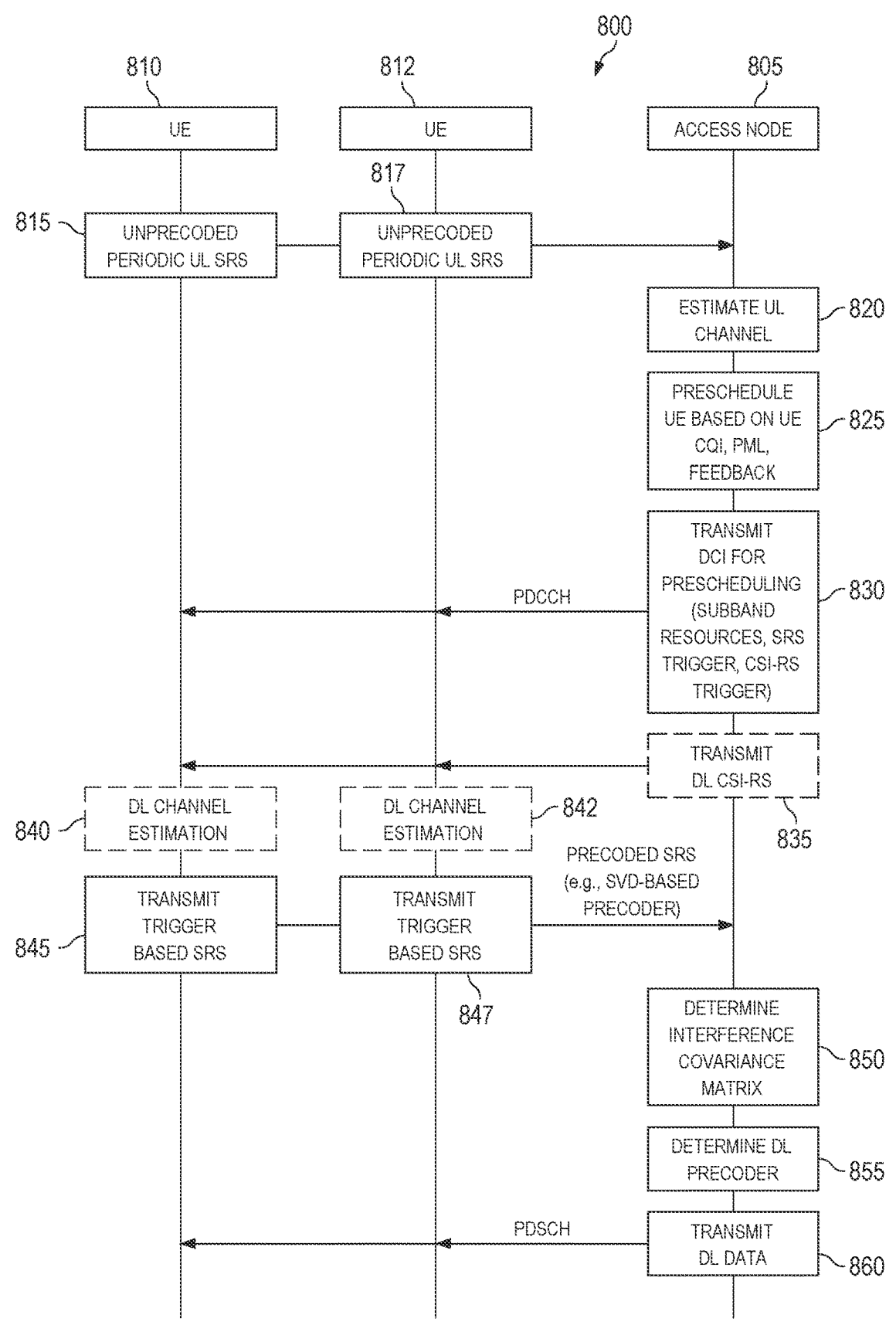
FIG. 8 illustrates a diagram of messages exchanged by communicating devices performing interference probing according to example embodiments presented herein.

FIG. 8 illustrates a diagram 800 of messages exchanged by communicating devices performing interference probing. Diagram 800 displays messages exchanged by an access node 805 and UEs 810 and 812 as the communicating devices perform interference probing (may also be referred to as training or BIT).

UEs 810 and 812 transmit uplink SRSs (blocks 815 and 817). The uplink SRSs may be unprecoded and periodic. The uplink SRSs are transmitted to access node 805. Access node 805 estimates the uplink channels (block 820). The estimation of the uplink channels is made in accordance with the uplink SRSs transmitted by the UEs. Access node preschedules UEs (block 825). The prescheduling of the UEs may be in accordance with the signal quality measures, CQI, PMI, or feedback, as discussed previously. In the example shown in FIG. 8, UEs 810 and 812 are also the prescheduled UEs.

Access node 805 transmits control information configuring uplink SRSs for the prescheduled UEs (block 830). The control information may be transmitted in group DCI or unicast DCI, for example. The group DCI may contain the UE identifiers of the prescheduled UEs in one embodiment. The control information may include (a subset thereof is also possible) configuration information, for UEs, such as, transmission bandwidth of the uplink SRS, or a portion of the transmission bandwidth, an indication of the transmission ports of the uplink SRS, an indication of the SRS resources or ports of the uplink SRS, an implicit or explicit indication of the cyclic shift and comb, the subbands of the uplink SRS, SRS trigger, CSI-RS trigger, DMRS trigger, a mapping between the CSI-RS and SRS, an indication of the mapping between the DMRS and SRS, etc.

If access node 805 is to transmit CSI-RS, access node 805 transmits the CSI-RS (block 835). UEs 810 and 812 may perform downlink channel estimation (blocks 840 and 842). The downlink channel estimation may be performed in accordance with the CSI-RS transmitted by access node 805.

UEs 810 and 812 transmit uplink SRS (blocks 845 and 847). The uplink SRS are transmitted in accordance with the configuration information transmitted by access node 805.

The uplink SRS maybe precoded, e.g., single value decomposition (SVD) based precoder. Access node 805 determines interference covariance matrices (block 850). The interference covariance matrices are determined based on the uplink SRS transmitted by UEs 810 and 812 (i.e., the prescheduled UEs). Access node 805 determines downlink precoders (block 855). The downlink precoders are determined in accordance with the interference covariance matrices. Access node 805 transmits downlink data to UEs 810 and 812 (block 860). Access node 805 precodes the downlink data for each prescheduled UE using the downlink precoder associated with the prescheduled UE, for example. The precoded downlink data is transmitted over a physical downlink shared channel (PDSCH).

In the Third Generation Partnership Project (3GPP) Fifth Generation (5G) New Radio (NR) standards related to existing DCI formats, the DCI size is minimized in order to reduce communications overhead. As an example, in the DCI format 2_3, used for transmitting group transmit power control (TPC) commands for SRS transmissions by one or more UEs, the DCI size is less than or equal to the DCI size of DCI format 1_o. Therefore, the number of bits available to transmit the uplink SRS configurations is limited. However, existing DCI formats do not support dynamic signaling of SRS configuration. Additionally, control information has to be provided for all configured UEs, even those that are not triggered (i.e., not prescheduled) to transmit the uplink SRS, therefore, the number of UEs configured using the existing DCI formats is limited due to the limitation of the number of bits.

According to an example embodiment, a DCI format for conveying SRS configuration information is provided. In an embodiment, the DCI includes SRS configuration information only for the prescheduled UEs. Existing DCI formats includes control information for all configured UEs, even those that are not prescheduled. Having the DCI only including SRS configuration information for the prescheduled UEs reduces the size of the DCI, thereby permitting a reduction in the DCI size or an inclusion of more SRS configuration information.

Figures 9, 10:
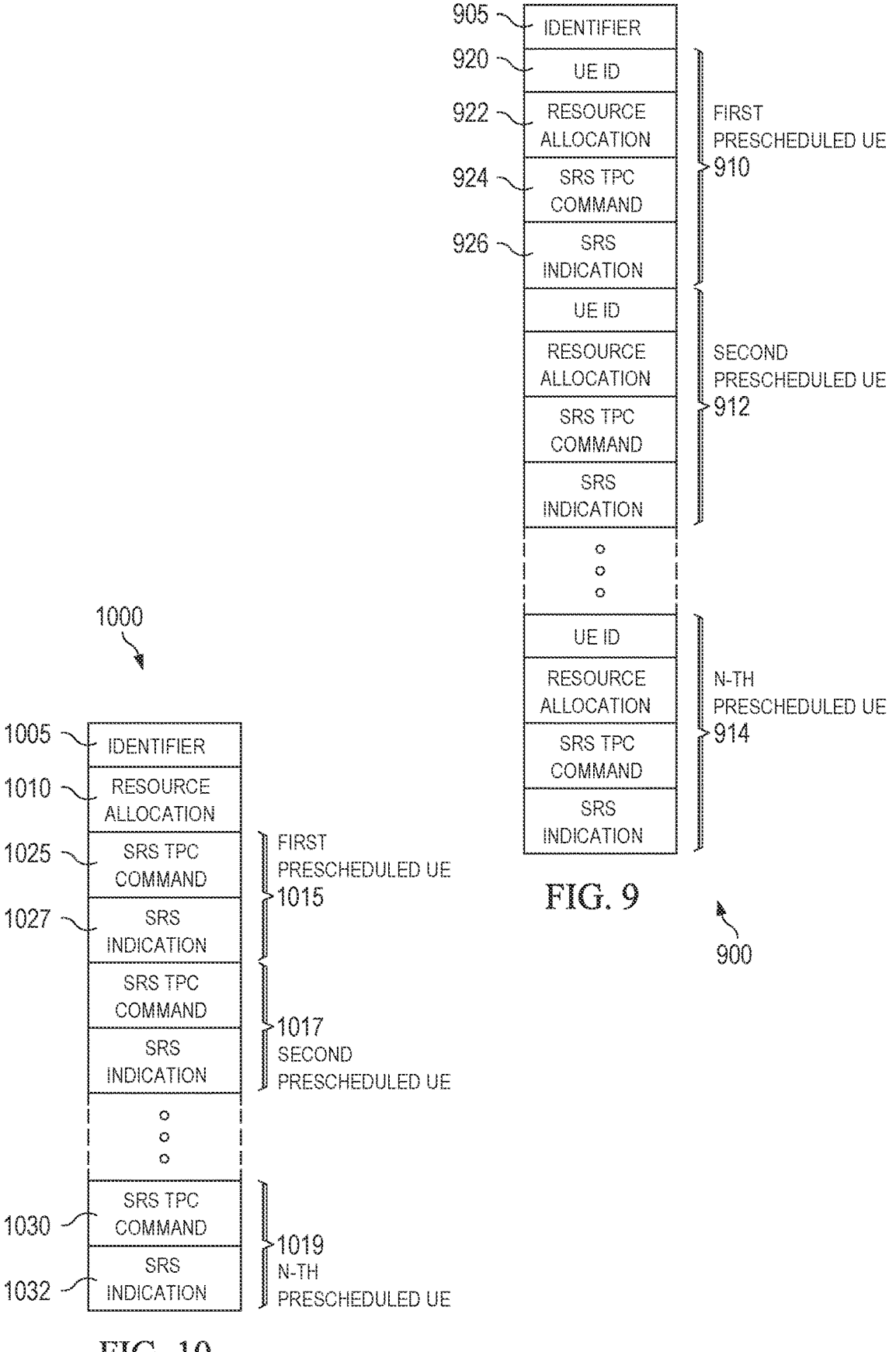
FIG. 9 illustrates a first example DCI according to example embodiments presented herein.
FIG. 10 illustrates a second example DCI according to example embodiments presented herein.

FIG. 9 illustrates a first example DCI 900. DCI 900, as shown in FIG. 9, is an example of a DCI where the DCI includes SRS configuration information for only prescheduled UEs and a short UE identifier is used to identify the UEs. DCI 900 includes an identifier field 905, which identifies the DCI being a DCI for conveying SRS configuration information to prescheduled UEs. DCI 900 also includes SRS configuration information for each of the prescheduled UEs, such as first prescheduled UE 910, second prescheduled UE 912, and N-th prescheduled UE 914.

As an example of the savings achievable by using the short UE identifiers and conveying information only for the prescheduled UEs, consider a situation where an access node is serving 20 UEs, with only 5 prescheduled UEs. If 10 bit long RNTIs are used, the DCI format would need to convey at least 20*10=200 bits of identifying information alone, while using the short UE identifiers and prescheduled UEs, DCI format 700 would need to convey only 5*4=20 bits of identifying information.

For each prescheduled UE, such as first prescheduled UE 910, DCI 900 includes a UE ID field 920, a resource allocation field 922, a SRS TPC command field 924, and a SRS indication field 926. UE ID field 920 comprising the short UE identifier of the prescheduled UE, and may be 4 bits in size, for example. Resource allocation field 922 comprising time and frequency resource blocks or groups for the prescheduled UE. The size of resource allocation field 922 may depend upon the type of the resource allocation, as well as the bandwidth part (BWP) size, with the size also being dependent on the Resource allocation type, for example. SRS TPC command field 924 comprising a power control command for the SRS, and maybe 2 bits in size, for example. SRS indication field 926 comprising SRS resources, SRS ports, SRS transmission bandwidth, etc. The value in SRS indication field 926 may be preconfigured with a set of different possible arrangements of SRS resources or ports, SRS transmission bandwidth, etc., values and only an index to a particular set of possible SRS resources, SRS ports, SRS transmission bandwidth, etc., is held in SRS indication field 926 to reduce size. SRS indication field 926 may also be used to indicate the mapping with the DL ports (layers, reference signals, etc.). An example SRS indication field 926 size is 4 bits. SRS indication field 926 supports SRS port indication in the uplink to transmit the SRS. Also implicitly indicated is the SRS cyclic shift, SRS subband, SRS comb, etc. Also implicitly indicated is the precoded CSI-RS port(s) assigned to the prescheduled UE in the downlink (e.g., the same ports). The example sizes of the various fields of DCI 900 are for discussion purposes only. The example embodiments presented herein are operable with other field sizes.

As related to resource allocation fields, such as resource allocation field 922, Resource Type 1 may be used for frequency allocation. Alternatively, Resource Type 2 may be used for frequency allocation. Resource block groups may be used for UEs. Additionally, the frequency allocation may include the allocation for the SRS transmission.

As related to downlink antenna ports, an indication for the UE may be used for downlink ports or downlink layers. As an example, the indication may be a bitmap. As another example, the indication maybe a value. A UE maybe able to determine CSI-RS or DMRS ports to use in accordance with the SRS ports allocated to the UE. As an example, the indication may use the SRS indication field. In another embodiment, the indication of the SRS ports may use a bitmap.

Information associated with configured UEs that are not prescheduled are not included in DCI format 900. A prescheduled UE may process the DCI to determine if the access node has triggered the prescheduled UE for SRS transmission.

In an embodiment, to further reduce DCI size, the SRS configuration information for each prescheduled UE is arranged in order (e.g., increasing or decreasing order) so that it is not necessary to include the short UE identifier in the DCI. Therefore, additional reduction in the DCI size is achieved.

In an embodiment, time and frequency resource blocks or groups are configured for the prescheduled UEs. In FIG. 9, each prescheduled UE maybe configured with a different allocation of time and frequency resource blocks or groups. In this embodiment, a single allocation of time and frequency resource blocks or groups is configured for the prescheduled UEs indicated in the DCI. In an embodiment, a single DCI is used to convey SRS configuration information for the prescheduled UEs of the access node. In such a situation, the DCI includes SRS TPC command and SRS indication for each prescheduled UE. The SRS TPC command and SRS indication for each prescheduled UE maybe arranged in accordance with the short UE identifier assigned to each prescheduled UE. The SRS TPC command and SRS indication for each prescheduled UE maybe arranged in increasing short UE identifier or decreasing short UE identifier, for example.

In an embodiment, a single DCI is used to convey SRS configuration information for a subset of the prescheduled UEs of the access node. In such a situation, the DCI includes SRS TPC command and SRS indication for each prescheduled UE in the subset. As an example, a first DCI includes SRS TPC commands and SRS indications for a first subset of the prescheduled UEs, a second DCI includes SRS TPC commands and SRS indications for a second subset of the prescheduled UEs, and so on. The SRS TPC command and SRS indication for each prescheduled UE in a subset may be arranged in accordance with the short UE identifier assigned to each prescheduled UE in the subset. The SRS TPC command and SRS indication for each prescheduled UE in the subset may be arranged in increasing short UE identifier or decreasing short UE identifier, for example.

FIG. 10 illustrates a second example DCI 1000. DCI 1000, as shown in FIG. 10, is an example of a DCI where there is a single allocation of time and frequency resource blocks or groups is configured for the prescheduled UEs. DCI 1000 includes an identifier field 1005, which identifies the DCI being a DCI for conveying SRS configuration information to prescheduled UEs, and a resource allocation field 1010. Resource allocation field 1010 comprising time and frequency resource blocks or groups for the prescheduled UEs indicated in DCI 1000. DCI 1000 also includes SRS TPC commands and SRS indications for each of the prescheduled UEs, such as first prescheduled UE 1015, second prescheduled UE 1017, and N-th prescheduled UE 1019.

For each prescheduled UE, such as first prescheduled UE 1015, DCI 1000 includes a SRS TPC command field 1025, and a SRS indication field 1027. SRS TPC command field 1025 includes a power control command for the SRS, and may be 2 bits in size, for example. SRS indication field 1027 includes SRS resources, SRS ports, SRS transmission bandwidth, etc. The value in SRS indication field 1027 may be preconfigured with values of a set of possible SRS resources, SRS ports, SRS transmission bandwidth, etc., and only an index to a particular set of possible SRS resources, SRS ports, SRS transmission bandwidth, etc., is held in SRS indication field 1027 to reduce size. An example SRS indication field 1027 size is 4 bits. SRS indication field 1027 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc.

In an embodiment, to further reduce DCI size, allocations of time and frequency resource blocks or groups are configured for the prescheduled UEs. The allocation of time and frequency resource blocks or groups may be configured for the prescheduled UEs that are scheduled for SRS transmission. Hence, in such a situation, allocations of time and frequency resource blocks or groups are included for each prescheduled UE that is scheduled for SRS transmission and omitted for each prescheduled UE that is not scheduled for SRS transmission.

Figures 11, 12:
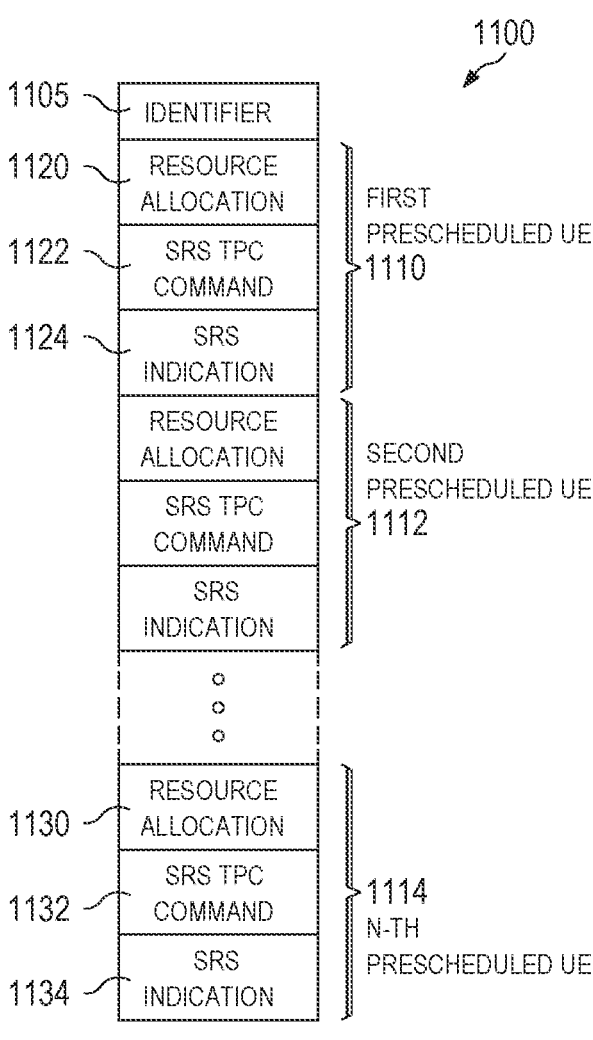
FIG. 11 illustrates a third example DCI according to example embodiments presented herein.
FIG. 12 illustrates a fourth example DCI according to example embodiments presented herein.

FIG. 11 illustrates a third example DCI 1100. DCI 1100, as shown in FIG. 11, is an example of a DCI where there are allocations of time and frequency resource blocks or groups for each prescheduled UE that is scheduled for SRS transmission. DCI 1100 includes an identifier field 1105, which identifies the DCI being a DCI for conveying SRS configuration information to prescheduled UEs. DCI 1100 also includes information for each prescheduled UE, such as first prescheduled UE 1110, second prescheduled UE 1112, and N-th prescheduled UE 1114. The information may differ depending on the prescheduled UE, e.g., prescheduled UEs that are scheduled for SRS transmission versus prescheduled UEs that are not scheduled for SRS transmission.

For each prescheduled UE that is scheduled for SRS transmission, such as first prescheduled UE 1110, DCI 1100 includes a resource allocation field 1120, a SRS TPC command field 1122, and a SRS indication field 1124. Resource allocation field 1120 comprising time and frequency resource blocks or groups for the prescheduled UE. The size of resource allocation field 1120 may depend upon the type of the resource allocation, as well as the BWP size, and may be 10 bits in size, for example. SRS TPC command field 1122 comprising a power control command for the SRS, and may be 2 bits in size, for example. SRS indication field 1124 comprising SRS resources, SRS ports, SRS transmission bandwidth, etc. The value in SRS indication field 1124 maybe preconfigured with a set of possible SRS resources, SRS ports, SRS transmission bandwidth, etc., values and only an index to a particular set of possible SRS resources, SRS ports, SRS transmission bandwidth, etc., is held in SRS indication field 1124 to reduce size. An example SRS indication field 1124 size is 4 bits. SRS indication field 1124 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc. The example sizes of the various fields of DCI 1100 are for discussion purposes only. The example embodiments presented herein are operable with other field sizes.

For each prescheduled UE that is not scheduled for SRS transmission, such as N-th prescheduled UE 1114, resource allocation field 1130, SRS TPC command field 1132, and SRS indication field 1134 are set to zero or some other specified value. Although FIG. 11 illustrates an example where N-th prescheduled UE 1114 is a prescheduled UE that is not scheduled for SRS transmission, any of the N prescheduled UE in DCI 1100 may be a prescheduled UE that is not scheduled for SRS transmission.

The example embodiments illustrated in FIGS. 9-11 are for group DCI. However, the example embodiments presented herein are also operable for unicast DCI. In unicast DCI, the DCI is specifically addressed to a single UE. The addressing of the DCI to a particular UE may be accomplished by encoding the DCI with an identifier of the UE. When the DCI is encoded using the identifier of the UE, only the UE will be able to decode the DCI, while other UEs will detect the encoded DCI as noise. Because the DCI is specifically addressed to the UE using its identifier, the DCI does not need to include a unique identifier of the UE. Thereby, the size of the DCI is reduced.

FIG. 12 illustrates a fourth example DCI 1200. DCI 1200, as shown in FIG. 12, is an example of a DCI used in unicast DCI. DCI 1200 includes an identifier field 1205, a resource allocation field 1210, a SRS TPC command field 1215, and a SRS indication field 1220. Identifier field 1205 identifies the DCI being a DCI for conveying SRS configuration information to prescheduled UEs. Resource allocation field 1210 comprising time and frequency resource blocks or groups for the prescheduled UE. The size of resource allocation field 1210 may depend upon the type of the resource allocation, as well as the BWP size, and may be 10 bits in size, for example. SRS TPC command field 1215 comprising a power control command for the SRS, and maybe 2 bits in size, for example. SRS indication field 1220 comprising SRS resources, SRS ports, SRS transmission bandwidth, etc. The value in SRS indication field 1220 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 1220 to reduce size. An example SRS indication field 1220 size is 4 bits. SRS indication field 1220 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc. The example sizes of the various fields of DCI 1200 are for discussion purposes only. The example embodiments presented herein are operable with other field sizes.

In another embodiment, dynamic signaling using a field (or fields) in the DCI may be used to signal an identifier of a reference downlink resource (or resources). A dedicated field to signal the mapping from a configured fixed mapping may be configured using higher layer signaling.

Figures 13, 14:
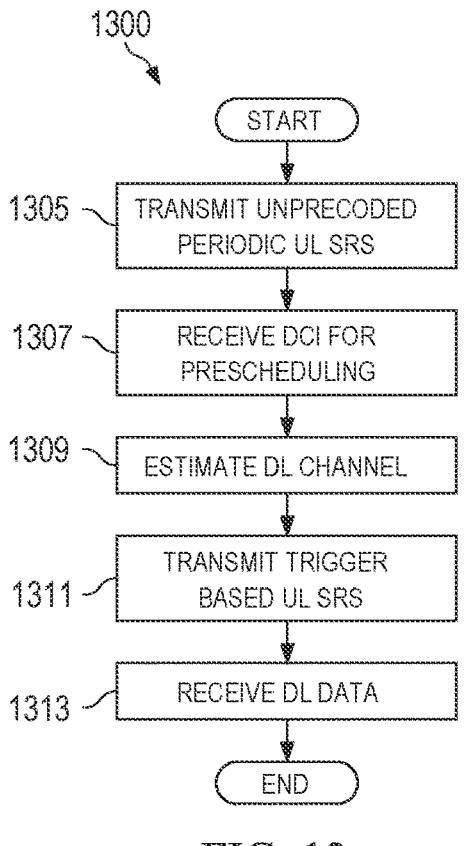
FIG. 13 illustrates a flow diagram of example operations occurring in a UE according to example embodiments presented herein.
FIG. 14 illustrates a flow diagram of example operations occurring in an access node according to example embodiments presented herein.

FIG. 13 illustrates a flow diagram of example operations 1300 occurring in a UE. Operations 1300 maybe indicative of operations occurring in a UE as the UE participates in interference probing and receives downlink data. The UE maybe a prescheduled UE.

Operations 1300 begin with the UE transmitting an uplink SRS (block 1305). The uplink SRS may be unprecoded. The uplink SRS may be periodic in nature. The UE receives DCI from an access node (block 1307). The DCI may include SRS configuration information for the UE. The SRS configuration information configures the UE to make a SRS transmission. The DCI may also include CSI-RS configuration. The DCI may be part of a group DCI message. The DCI maybe a unicast DCI message. The UE estimates the downlink channel (block 1309). The UE estimates the downlink channel using a CSI-RS transmitted by the access node. The UE transmits a precoded SRS (block 1311). The precoded SRS is transmitted in accordance with the SRS configuration information received in the DCI. The UE receives downlink data (block 1313). The downlink data is received from the access node. The downlink data is precoded using a precoder determined in accordance with the precoded SRS transmitted by the UE.

FIG. 14 illustrates a flow diagram of example operations 1400 occurring in an access node. Operations 1400 maybe indicative of operations occurring in an access node as the access node participates in interference probing and transmits downlink data.

Operations 1400 begin with the access node estimating an uplink channel (block 1405). The access node estimates the uplink channel using a SRS transmitted by a UE, for example. The SRS may be precoded or unprecoded. The access node preschedules UEs (block 1407). The access node preschedules UEs in accordance with the SRSs transmitted by UEs. As an example, the access node preschedules UEs associated with SRSs with signal quality exceeding a specified threshold. The access node transmits DCI to the prescheduled UEs to trigger SRS transmission (block 1409). The DCI transmitted by the access node may also cause the UE to measure downlink CSI-RS or DMRS. The access node configures SRSs for the prescheduled UEs and sends SRS configuration information to the prescheduled UEs in the DCI. The SRS configuration information may also include CSI-RS information. The DCI maybe a group DCI or unicast DCIs.

The access node may transmit a CSI-RS (block 1411). The CSI-RS may be used for downlink channel estimation. The access node receives a precoded SRS (block 1413). The precoded SRS may be received in accordance with the SRS configuration information. The access node determines an interference covariance matrix (block 1415). The interference covariance matrix is determined in accordance with the precoded SRS. The access node determines a downlink precoder (block 1417). The downlink precoder is determined in accordance with the interference covariance matrix. The access node transmits downlink data (block 1419). The downlink data is precoded in accordance with the downlink precoder.

FIG. 15 illustrates a flow diagram of example operations 1500 occurring in an access node configuring uplink SRSs. Operations 1500 maybe indicative of operations occurring in an access node as the access node configures uplink SRSs and receives an uplink SRS transmission.

Operations 1500 begin with the access node transmitting a SRS configuration (block 1505). The SRS configuration may be transmitted in downlink control information, e.g., in a group DCI or a unicast DCI. In the situation when the group DCI is used, the group DCI may be addressed to UEs (e.g., prescheduled UEs) using UE identifiers, which are unique within the group of UEs, but are shorter than typical UE identifiers, so save signaling overhead. In an embodiment, the SRS configuration includes information regarding arrangements of SRS port resources (e.g., combs, offsets, cyclic shifts, symbols, etc.). The SRS port resources may also be grouped into plurality of resource groups. In an embodiment, the SRS configuration includes sets of SRS ports of SRS resources. In an embodiment, the SRS configuration includes information regarding associations between SRS port resources and downlink port resources (such as CSI-RS ports, DMRS ports, etc.). Also included may be information about mappings between the ports.

The access node transmits an indication of SRS resources (block 1507). In an embodiment, the indication of the SRS resources indicates a SRS resource group to use for uplink SRS transmission. In an embodiment, the indication of the SRS resources indicates a subset of the SRS ports of the SRS resource to use for uplink SRS transmission. In an embodiment, the indication of the SRS resources indicates an association to use to determine the SRS ports to use for uplink SRS transmission. The indication of the SRS resources maybe transmitted in downlink control information, e.g., in a group DCI or a unicast DCI. When the group DCI is used, the UE identifiers (as described above) are used. The indication of the SRS resources may be included in a message transmitted after the transmission of the SRS configuration. The message including the indication of the SRS resources may be the first message transmitted after the transmission of the SRS configuration. The access node receives uplink SRS (block 1509). The uplink SRS is received in accordance with the SRS resources as indicated.

FIG. 16 illustrates a flow diagram of example operations 1600 occurring in a UE transmitting uplink SRSs. Operations 1600 maybe indicative of operations occurring in a UE as the UE receives an uplink SRS configuration and transmits an uplink SRS.

Operations 1600 begin with the UE receiving a SRS configuration (block 1605). The SRS configuration may be received in downlink control information, e.g., in a group DCI or a unicast DCI. In the situation when the group DCI is used, the group DCI may be addressed to UEs (e.g., prescheduled UEs) using UE identifiers, which are unique within the group of UEs, but are shorter than typical UE identifiers, so save signaling overhead. In an embodiment, the SRS configuration includes information regarding arrangements of SRS port resources (e.g., combs, offsets, cyclic shifts, symbols, etc.) The SRS port resources may also be grouped into plurality of resource groups. In an embodiment, the SRS configuration includes sets of SRS ports of SRS resources. In an embodiment, the SRS configuration includes information regarding associations between SRS port resources and downlink port resources (such as CSI-RS ports, DMRS ports, etc.). Also included may be information about mappings between the ports. Even if the UE is not an intended recipient of the SRS configuration, the UE receives the downlink control information and attempts to decode the downlink control information.

The UE receives an indication of SRS resources (block 1607). In an embodiment, the indication of the SRS resources indicates a SRS resource group to use for uplink SRS transmission. In an embodiment, the indication of the SRS resources indicates a subset of the SRS ports of the SRS resource to use for uplink SRS transmission. In an embodiment, the indication of the SRS resources indicates an association to use to determine the SRS ports to use for uplink SRS transmission. The indication of the SRS resources may be received in downlink control information, e.g., in a group DCI or a unicast DCI. When the group DCI is used, the UE identifiers (as described above) are used. The indication of the SRS resources maybe included in a message received after the reception of the SRS configuration. The message including the indication of the SRS resources may be the first message received after the transmission of the SRS configuration. The UE transmits the uplink SRS (block 1609). The uplink SRS is transmitted in accordance with the SRS resources as indicated.

Some embodiments described above for flexible A-SRS triggering for BiT may lead to higher DCI overhead as it contains more bits in the SRS request field. In addition, the A-SRS triggering may occur more frequently, such as each timing a MU scheduling occurs. To reduce DCI overhead, a few embodiments are provided. First, a more flexible framework to split SRS transmission parameter information among RRC configuration signaling, MAC CE, and DCI would be useful. Minimum standard impact is to keep as much SRS transmission parameter information in RRC and MAC, and DCI contains only the minimum parameter information necessary for dynamic signaling. Furthermore, existing DCIs can be enhanced to include new fields and be associated with new UE behavior.

Embodiments are provided for group-common DCI based overhead reduction.

BiT sounding is to support PDSCH with MU-MIMO, in which multiple UEs are paired together in PDSCH and its DMRS. Therefore, BiT sounding should "mirror" PDSCH DMRS. For example, we know that for PDSCH DMRS Type 1, at most 8 DMRS ports/RBG/cell can be supported. Correspondingly, 8 SRS port resources can be split and indicated to a number of UEs, where the SRS port resources are in terms of cyclic shift, comb and shift, and also possibly OFDM symbols of a RBG of a cell. Then a mapping (i.e., an association) of DL DMRS ports to the SRS port resources can be designed and the port information can be signaled to the UEs via SRS trigger. This may be done in an overhead-efficient way via GC DCI sent to the set of UEs possibly paired for MU transmissions in a slot. The GC DCI can trigger SRS to be sent from UEs at the same time, i.e., a common triggering offset can be used. In addition, other fields, such as CMR/IMR indication, may be included, and the design may be similar to a CSI request field as in DCI format 0_1. An embodiment is a GC DCI for flexible A-SRS triggering with reduced overhead, and the GC DCI is sent to a set of UEs possibly paired for MU transmission in a slot, with a common triggering offset, and each UE is assigned with UE-specific frequency domain resource assignment (FDRA), port allocation (w.r.t. its serving cell's available SRS port resources, e.g., cyclic shift, comb and shift), and CMR/IMR indication. In an embodiment, a new field of A-SRS triggering offset with slot offset k0 and symbol position is included in the GC DCI. In an embodiment, a new field of A-SRS beamforming with dynamically indicated DL CMR and/or IMR similar to the CSI request field in DCI format 0_1 is included in the GC DCI. In an embodiment, a higher priority for the A-SRS in the GC DCI is assumed by the UE if the A-SRS is assigned with a FDRA and/or port allocation. In an embodiment, the UE-specific port allocation field is replaced by a group-common (joint) port allocation field for all UEs paired on the RBG (or associated frequency domain unit), by indicating only the ranks (number of layers for a data or number of ports for SRS/DMRS) of the paired UEs (the ordering of the UEs maybe indicated elsewhere, or UE ID is also included to accompany the rank allocation). With this embodiment, the ports of a UE have to follow a certain pattern such as consecutive or evenly spaced, but as long as the ranks are indicated, each UE can determine its SRS port resources.

Enhancements to DCI 1-1 for SRS probing are provided in Table 1 below.

Limitations in enhanced DCI 1-1 include:
Some fields as "Existing for PDSCH. Now may also apply to SRS".
However, it is not clear under what condition those PDSCH fields are also applied to SRS.
The DCI does not have a CSI request. However, for BiT with DL probing to improve the link adaptation, a CSI request is desired.
Furthermore, enhancing UL DCI 0_1 for SRS probing is not described in much detail.

Embodiments are provided for UE-specific DCI based overhead reduction. To reduce DCI overhead, an embodiment uses DL DCI formats 1_0/1_1 for both A-SRS triggering and PDSCH scheduling, and the SRS and PDSCH have the same PRB/port allocation. In DCI formats 1_0 or 1_1, it already has fields for: 1) A-SRS trigger, 2) dynamically indicated PDSCH PRB allocation via a DL FDRA field, 3) dynamically indicated PDSCH ports, and 4) possi-

TABLE 1

| Field (Item) | Bits | Reference | Notes |
|---|---|---|---|
| Frequency domain resource assignment (FDRA) | Variable | Variable with Resource Allocation Type | Existing for PDSCH. Now apply to PDSCH and SRS |
| Time domain resource assignment (TDRA) | 4 | Carries the row index of the items in pdsch_allocationListin RRC | Existing for PDSCH. No change |
| VRB-to-PRB mapping | 0, 1 | 0 bit if only resource allocation type 0 is configured or if interleaved VRB-to-PRB mapping is not configured by high layers; 1 bit according to Table 7.3.1.1.2-33 otherwise, only applicable to resource allocation type 1 | Existing for PDSCH. Now may also apply to SRS |
| PRB bundling size indicator | 0, 1 | 0 bit if the higher layer parameter prb-BundlingType is not configured or is set to 'static' 1 bit if the higher layer parameter prb-BundlingType is set to 'dynamic' | Existing for PDSCH. Now may also apply to SRS |
| Antenna port(s) and number of layers | 4, 5, 6 | Determined by dmrs Configuration Type and max Length See e.g., Table 7.3.1.2.2-2 of TS 38.212 v16.2.0. | Existing for PDSCH. Now apply to PDSCH and SRS |
| SRS request | 2 or more | | Existing. Now may add more bits for SRS resource selection |
| SRS Time domain resource assignment | 0, 4 | Carries the row index of the items in pdsch_allocationListorpusch_allo-cationListorsrs_allocationListin RRC. Optional. Default is per RRC configuration | New. Apply to SRS. Optional. Shall be earlier than PDSCH |
| SRS TPC command | 0, 2 | Optional for SRS power control | New. Optional. May present if SRS has separate power control than PUSCH |
| SRS beamforming indicator | 0~6 | Optional, indicate SRS beamforming/precoding based on a CMR and optionally an IMR. If not present then a default CMR is used for SRS beamforming determination | New. Optional. Can reuse 0_1 CSI Request field design |
| . . . | | | Other fields: same as before | bly a field of PRB bundling size indicator (as in DCI format 1_1), etc. These fields can be (re)used by the UE for SRS triggering. New fields for BiT purposes are also added, e.g., SRS resource indication, SRS triggering offset (similar to PDSCH SLIV), a field of CMR/IMR indication which maybe similar to a CSI request field as in DCI format 0_1. The UE assumes that the FDRA and ports are also applied for the triggered SRS, which can considerably reduce DCI overhead. For the port indication, a mapping (an association) of DCI DL port indication to SRS ports (in terms of cyclic shift, comb and shift) is needed, which can be defined in Rel-17. An embodiment is to reuse UE-specific DCI (e.g., format 1_1) and introduce new fields for flexible A-SRS triggering with reduced overhead, and UE first performs A-SRS transmission according to existing fields of FDRA, port indication, and PRB bundling size indicator, as well as the new fields of SRS resource indicator, SRS triggering offset, and CMR/IMR indication. UE then performs PDSCH reception according to at least the same FDRA and port indication in the same DCI. In an embodiment, a new field of A-SRS triggering offset with slot offset k0 and symbol position is included in the UE-specific DCI. In an embodiment, a new field of A-SRS beamforming with dynamically indicated DL CMR and/or IMR similar to the CSI request field in DCI format 0_1 is included in the UE-specific DCI. In an embodiment, a higher priority for the A-SRS in the UE-specific DCI is assumed by the UE if the A-SRS is assigned with a FDRA and/or port allocation. In an embodiment, the UE supports more receive antenna ports (e.g., for PDSCH and its DMRS) than transmit antenna ports (e.g., for SRS). For example, the UE can only sound on one port. In this case, the UE shall ignore the PDSCH port indication but just sound on the one port. For another example, the UE can only sound on two port but receive on up to four ports. In this case, the UE can still utilize the PDSCH port indication information, i.e., sound on one port if the PDSCH is only one layer, but sound on the two ports if the PDSCH is two or more layers. In an embodiment, the port indication for SRS is not supported but a rank (number of ports or number of layers) indication is supported. That is, the UE uses the rank indicator for the SRS (or PDSCH) for its SRS transmission. The ports associated with the rank are pre-determined based on the standard or RRC configuration.

Embodiments are provided for supporting both UE-specific DCI based overhead reduction and GC DCI based overhead reduction, for flexible A-SRS triggering for interference probing. In an embodiment, GC DCI is an enhanced GC DCI format 2_3 with UE FDRA and port indication. In an embodiment, UE-specific DCI is an enhanced DL DCI formats 1_0/1_1 to reinterpret existing FDRA/port indication fields for SRS transmission. In an embodiment, both above embodiments are supported. In an embodiment, the enhanced GC DCI and/or UE-specific DCI are supported and become new DL DCI formats. In any embodiment, a new field of A-SRS triggering offset with slot offset k0 and symbol position can be included. In any embodiment, a new field of A-SRS beamforming with dynamically indicated DL CMR and/or IMR similar to the CSI request field in DCI format 0_1 can be included. In any embodiment, a higher priority for the A-SRS is assumed by the UE if the A-SRS is assigned with a FDRA and/or port allocation.

In an embodiment, the GC DCI and/or UE-specific DCI are for TDD with UL operating in OFDM (rather than SC-FDMA). In order to properly utilize BiT or SRS probing for DL, the UL and DL should be as symmetric as possible. Because DL is only OFDM, it is more suitable that the UL is also OFDM. This may also be more suitable if the PDSCH/SRS transmissions are not consecutive in the frequency domain, such as with PRB skipping, FDRA type 0 with non-consecutive RBGs, interleaved VRB to PRB mapping, etc.

In an embodiment, the GC DCI and/or UE-specific DCI reuse the PDSCH TDRA design for its SRS triggering offset design. In an embodiment, the GC DCI and/or UE-specific DCI reuse the PUSCH TDRA for its SRS triggering offset design. In an embodiment, the GC DCI and/or UE-specific DCI reuse the PUSCH/PDSCH TDRA for its SRS triggering offset design, but modify the L value configuration and range so that it fits into SRS transmissions. For example, the network may configure SRS to be only on 8-14 OFDM symbols, and hence the current range of L for PUSCH of 4-14 or 1-14 may be modified to 8-14, so that L value can take fewer bits to indicate.

In an embodiment for the GC DCI and/or UE-specific DCI include a new field of A-SRS beamforming with dynamically indicated DL CMR and/or IMR. The field may be similar to the CSI request field in DCI format 0_1, or may reuse the same indication/configuration as the CSI request field. In an embodiment the A-SRS beamforming field is identical to the CSI request field with 0, 1, 2, 3, 4, 5, or 6 bits determined by higher layer parameter reportTriggerSize. When all the bits of the field in DCI are set to zero, SRS is not beamformed. A non-zero codepoint of the field in the DCI is mapped to the CMR/IMR associated with a CSI triggering state according to the order of the associated positions of the up to $2^{N_{TS}}-1$ trigger states in CSI-AperiodicTriggerStateList with codepoint '1' mapped to the triggering state in the first position. After the UE determines the CMR from the field, the CMR's ports are also selected by the UE according to the antenna port indication field, and the selected CMR ports and the indicated/associated IMR are used by the UE to generate the SRS beamforming for each SRS port.

In some embodiments, one flag/switch is introduced to specify if the A-SRS triggered by a DCI reuses some fields from another scheduled/triggered transmission or not. The main purpose of the flag is to make the DCI useful for both BiT purposes and non-BiT purposes with minimum redesign. For example, when the flag is set, the UE shall assume the triggered A-SRS in the DCI reuses a field (e.g., FDRA) of a PDSCH scheduled by this DCI or another DCI, but when the flag is not set, the UE shall not assume the A-SRS reuses a field of another transmission. In other words, the flag serves as an indication to the UE about assuming an association of A-SRS parameters to another transmission or not.

In an embodiment, the flag/switch is a field in a DCI, that is, the association can be indicated dynamically for full flexibility. In an embodiment, the flag is turned on/off via MAC CE. In an embodiment, the flag is turned on/off via RRC configuration for a DCI format.

In an embodiment, the flag is for a DCI that may be used to schedule a PUSCH transmission. An example of this may be DCI format 0_1 or the like, which schedules PUSCH and includes fields for PUSCH transmission such as PUSCH FDRA, antenna port(s), with or without frequency hopping, on UL (uplink carrier) or SUL (supplementary uplink carrier), on which BWP, etc. In an embodiment, the flag is for an association of A-SRS to PUSCH. When the flag is set and an A-SRS is triggered and a PUSCH is scheduled, the UE uses the parameters obtained from some PUSCH fields for the SRS transmission, and the fields may include at least one or more of PUSCH FDRA, PUSCH antenna port(s) indication, PUSCH frequency hopping, UL/SUL indication, BWP indication, closed-loop TPC command, etc. The PUSCH and A-SRS have different timings so that they would not collide, that is, the A-SRS may have its own TDRA, or have an offset relative to the PUSCH such as n slots earlier than the PUSCH. However, when the flag is not set and an A-SRS is triggered, the UE does not use those PUSCH field for the A-SRS transmission. In an embodiment, the flag is a field associated with the SRS request field in the DCI format. In an embodiment, the flag field contains multiple bits to indicate the UE which PUSCH fields should be used for an associated A-SRS, such as a bit for A-SRS reusing PUSCH FDRA/BWP or not, and a bit for A-SRS reusing PUSCH TPC command or not, etc. In an embodiment, the flag is for an association of A-SRS to PDSCH. When the flag is set and an A-SRS is triggered, the UE uses the parameters obtained from some PDSCH fields for the SRS transmission, and the fields may include at least one or more of PDSCH FDRA, PDSCH antenna port(s) indication, PDSCH frequency hopping, BWP indication, PRB-to-VRB interleaving, etc. However, when the flag is not set and an A-SRS is triggered, the UE does not use those PDSCH field for the A-SRS transmission. The associated PDSCH is not scheduled with this DCI but the association is specified to the UE so that the UE can link to the correct PDSCH, which may be done via a common ID used for the SRS and PDSCH (e.g., a field with a ID, or the DCI RNTI, etc.) or via their timing relation (e.g., triggered at the same time, triggered within 2 slots, PDSCH scheduled n slot after the A-SRS, n being 1, 2, etc.).

In an embodiment, the flag is for a DCI that maybe used to schedule a PDSCH transmission. An example of this may be DCI format 1_1 or the like, which schedules PDSCH and includes fields for PDSCH transmission such as PDSCH FDRA, antenna port(s), PRB bundling size, etc. In an embodiment, the flag is for an association of A-SRS to the PDSCH of the same DCI. When the flag is set and an A-SRS is triggered and a PDSCH is scheduled, the UE uses the parameters obtained from some PDSCH fields for the SRS transmission, and the fields may include at least one or more of PDSCH FDRA, PDSCH antenna port(s) indication, PDSCH PRB bundling size, etc. However, when the flag is not set and an A-SRS is triggered, the UE does not use those PDSCH field for the A-SRS transmission. In an embodiment, the flag is a field associated with the SRS request field in the DCI format. In an embodiment, the flag field contains multiple bits to indicate the UE which PDSCH fields should be used for an associated A-SRS, such as a bit for A-SRS reusing PDSCH FDRA/BWP or not, and a bit for A-SRS reusing PDSCH antenna ports or not, etc.

In an embodiment, the DCI that may schedule the PUSCH or PDSCH or trigger A-SRS may also have a CSI request field. The flag or a bit of the flag indicates to the UE whether the A-SRS is also associated with the CSI request field. When the flag is set, the UE may use the CMR and optionally IMR associated with the CSI request for the A-SRS beamforming. The DCI maybe an extension of format 0_1 or 1_1. In the embodiment of DCI with PDSCH scheduling, SRS triggering, and CSI request, the A-SRS may be tied to the scheduled PDSCH (reusing PDSCH FDRA, for example) and/or the CSI request (reusing the CMR/IMR for beamforming). The CSI request may be associated with an aperiodic CSI-RS transmission. This can be especially useful for BiT as one DCI indicates the DL RS for the A-SRS beamforming, the A-SRS parameters shared with the PDSCH, and the PDSCH. The DL RS can also be used for DL probing for MCS adjustment, i.e., the UE reports a CQI but not a PMI to the gNB so that the gNB can perform link adaptation for the PDSCH.

In an embodiment, an uplink DCI (e.g., 0_1) that may schedule a PUSCH indicates no PUSCH is scheduled via the UL-SCH indicator, i.e., UL-SCH bit is zero. The fields that are designed for PUSCH can be redefined for A-SRS triggering parameters. For example, a few bits may be used for A-SRS triggering offset or TDRA. A few bits may be used for A-SRS port indication. A few bits may be used for A-SRS FDRA. And so on.

In an embodiment, a downlink DCI (e.g., 1_1) that may schedule a PDSCH indicates no PDSCH is scheduled. The no-PDSCH maybe indicated via a DL-SCH indicator, i.e., DL-SCH bit is zero, or may be indicated via setting a few bits in the original PDSCH fields to be zero, such as the Downlink assignment index bits, FDRA/TDRA bits, etc. The fields that are designed for PUSCH can be redefined for A-SRS triggering parameters. For example, a few bits may be used for A-SRS triggering offset or TDRA. A few bits may be used for A-SRS port indication. A few bits may be used for A-SRS FDRA. And so on.

In summary, UL DCI may be used for SRS trigger with or without PUSCH, with or without CSI request, with the SRS tied to PUSCH (e.g., FDRA, etc.) or not tied to PUSCH, with the SRS tied to PDSCH or not tied to PDSCH, with the SRS tied to the CSI request field or not tied to the CSI request field. DL DCI may be used for SRS trigger with or without PDSCH, with or without CSI request, with the SRS tied to PDSCH (e.g., FDRA, etc.) or not tied to PDSCH, with the SRS tied to the CSI request field or not tied to the CSI request field.

Embodiments are provided for GC DCI to trigger SRS. An embodiment is to enhance the current GC DCI format 2_3. The enhanced DCI format 2_3 does not have a FDRA field to reduce overhead. The DCI may include multiple SRS blocks, each may be used to trigger one or more SRS transmissions. Each block includes a SRS request field (optional), one or more SRS TPC command fields if the block can trigger multiple SRS transmissions. The blocks may be for the same UE or multiple UEs. Each of the UEs that receive a SRS trigger in a block in the DCI assumes reception of another DCI with FDRA, and use that FDRA for the triggered SRS. The other DCI maybe a UL DCI, e.g., 0_1 or enhanced 0_1 or 0_1 or so on, in which case the FDRA and possibly other fields such as BWP indication, UL/SUL indication, frequency hopping indication, antenna port indication, etc., are also used by the UE for the A-SRS transmission. The other DCI may be a DL DCI, e.g., 1_1 or enhanced 1_1 or 1_0 or so on, in which case the FDRA and possibly other fields such as antenna port indication, PRB bundling size indication, etc., are also used by the UE for the A-SRS transmission. In an embodiment, each UE's block in the GC DCI is associated with a flag/switch, and when the flag is set, the UE uses a linked DCI's field for the A-SRS, and when the flag is not set, the UE does not look for a linked DCI's field for the A-SRS. The flag may be a field in the GC DCI, may be activated/deactivated via MAC CE, or may be configured via RRC signaling. The linked DCI is specified to the UE so that the UE can link to the correct DCI, which may be done via a common ID used for the SRS and PDSCH (e.g., a field with a ID, or the DCI RNTI, etc.) or via their timing relation (e.g., triggered at the same time, triggered within 2 slots, PDSCH scheduled n slot after the A-SRS, n being 1, 2, etc.). In an embodiment, the GC DCI does not have to be for paired UEs only. Each UE's block and the fields within the block are pre-configured via RRC signaling, and when a UE's SRS request field has all the bits being 0, no SRS is triggered for that UE, and when a UE's SRS request field is not all 0, A-SRS is triggered.

In an embodiment, in a GC DCI, a same TDRA field is used for all the triggered SRS in GC DCI. That is, each UE does not have a UE-specific TDRA field, which saves overhead. In an embodiment, in a GC DCI, a few choices of TDRAs are provided for all the UEs using the DCI, and each TDRA is associated with an ID. Then in each UE's block, a field is used to indicate to the UE which one of the TDRAs that the UE shall apply based on the ID. In an embodiment, individual TDRA fields are configured for each SRS block, that is, each SRS triggered may be associated with a different TDRA. In an embodiment, the SRSs triggered by the DCI are transmitted at the same slot but possibly in different OFDM symbols. Then the DCI includes a group-common TDRA field (e.g., k0 for slot offset) that applies to all the triggered SRS from this DCI, and an individual TDRA field (e.g., OFDM symbol location, SLIV, etc.) for each SRS block.

In some embodiments, if additional time domain related parameters need to be indicated, 1 or 2 more bits may be added for a new field to indicate the time-domain sounding behavior over the allocated multiple OFDM symbols (if applicable), e.g., repetition, hopping, or splitting. An A-SRS time-domain resource allocation field can indicate not only the triggering offset, but also the duration of the SRS transmission in terms of the number of OFDM symbols, and other time domain behavior related parameters such as repetition, whether to allow non-consecutive symbols, etc. For example, if the indicated A-SRS symbol length is longer than the RRC-configured A-SRS symbol length, the A-SRS may be indicated to repeat, hop, or split in time domain to fill up the indicated symbols. One of the motivations for splitting a SRS into multiple symbols is for pre-scheduling data transmission or probing for data transmission with reduced SRS PAPR as described later. Another motivation may be to reduce the SRS bandwidth for each transmission, as a UE is usually power limited and hence bandwidth is limited for SRS transmissions. A UE may not be aware of a probing intention or other intentions determined by the network. So an essential standard impact may be to specify how a UE transmit a SRS in multiple symbols.

If n separate soundings on n A-SRS resource sets are to be triggered using the same DCI, n such TDRA fields maybe included. However, to avoid significant redesigns of the existing DCI, an upper bound of n should be imposed for at least UE-specific DCIs. For example, only n=1, 2, 3 may be allowed for UE-specific DCI. If larger n is desirable, a GC DCI is more suitable than using a UE-specific DCI. The n separate sounding may be on one or more slots, on one or more carriers, etc.

The following DCI enhancements may be considered according to some embodiments.

Add a field for A-SRS time-domain resource allocation

See above for the detailed discussions. This may apply to UE-specific DCI and/or GC DCI.

Allow dynamically indicated frequency-domain allocation, port allocation, and beamforming, reusing existing DCI field designs as much as possible, and reusing existing DCI fields as much as possible Dynamically indicated A-SRS frequency-domain resource allocation can be beneficial to a number of cases. For example, this can significantly improve PDSCH spectrum efficiency for interference probing in TDD massive MIMO which. For another example, the A-SRS may be used for CSI acquisition for a PUSCH transmission, and hence the A-SRS may be transmitted only on a set of PRBs that may be scheduled for the PUSCH, rather than on the wideband which consumes excessive resources and energy or on a pre-configured bandwidth on which the gNB cannot acquire relevant CSI for the PUSCH transmission. In addition, dynamically indicated A-SRS frequency-domain resource allocation can also be useful for SRS coverage/capacity enhancements related to partial frequency sounding. Similarly, dynamically indicated A-SRS port allocation and beamforming are also useful and should be supported.

To support flexible A-SRS triggering with dynamically indicated frequency-domain allocation, we note that existing DCI formats already provide well-designed PUSCH/PDSCH FDRA fields and thus may be reused or enhanced for A-SRS. In addition, if the A-SRS is used for CSI acquisition for the co-scheduled PUSCH/PDSCH transmission (as opposed to generic purposes and not tied to a specific transmission), the A-SRS may be transmitted on the same PRBs as the PUSCH/PDSCH. In this case, the gNB may indicate to a UE to reuse the PUSCH/PDSCH FDRA field for the A-SRS, which helps avoid high DCI overhead.

Likewise, to support flexible A-SRS triggering with dynamically indicated port allocation, we may reuse/enhance existing PUSCH/PDSCH port indication field design, and we may reuse the PUSCH/PDSCH port indication field if the A-SRS is used for CSI acquisition for the co-scheduled PUSCH/PDSCH transmission. To support flexible A-SRS triggering with dynamically indicated beamforming, for non-codebook based SRS beamforming, we can reuse/enhance existing design of CMR/IMR indication in the CSI request field in DCI format 0_1, and for codebook based SRS beamforming, we can reuse/enhance existing TPMI field design, and reuse the TPMI field if the SRS is used for CSI acquisition for the co-scheduled PUSCH transmission.

If n separate soundings on n A-SRS resource sets are to be triggered using the same DCI, n such FDRA fields, n such port indication fields, etc., are to be included. However, to avoid significant redesigns of the existing DCI, an upper bound of n should be imposed for at least UE-specific DCIs. For example, only n=1, 2, [3] maybe allowed for UE-specific DCI.

Enhance UE-Specific UL DCI and DL DCI for A-SRS

UE-specific UL DCI (e.g., DCI format 0-1, 0-2) can be enhanced for A-SRS. For example, we can extend the DCI for A-SRS triggering without a co-scheduled PUSCH, by adding fields indicating SRS TDRA, FDRA, port(s), and beamforming in the vacant PUSCH fields. Furthermore, we can extend the DCI for A-SRS triggering with co-scheduled PUSCH, by reusing the PUSCH fields indicating FDRA, port(s), and beamforming for the SRS, if the SRS is used for CSI acquisition, UL power control information acquisition, UL beam acquisition, etc., for the co-scheduled PUSCH transmission. In this case, UE first performs A-SRS transmission according to existing fields of FDRA and port indication, as well as the new fields of SRS resource indicator, SRS triggering offset, and CMR/IMR indication. UE then performs PUSCH transmission according to at least the same FDRA and port indication in the same DCI, and possibly following a TPC command sent in a GC DCI for this UE based on the gNB-received power from the A-SRS.

On the other hand, UE-specific DL DCI (e.g., DCI format 1-1) can be enhanced for A-SRS. We can extend the DL DCI for A-SRS triggering with co-scheduled PDSCH, by reusing the PDSCH fields indicating FDRA, port(s), and beamforming for the SRS, if the SRS is used for CSI acquisition for the co-scheduled PDSCH transmission. In this case, UE first performs A-SRS transmission according to existing fields of FDRA, PRB bundling size indicator, and port indication, as well as the new fields of SRS resource indicator, SRS triggering offset, and CMR/IMR indication. UE then performs PDSCH reception according to at least the same FDRA and port indication in the same DCI.

Enhance GC DCI for A-SRS

GC DCI (such as DCI format 2-3 with multiple blocks, each block maybe used to trigger one A-SRS transmission) can be enhanced for A-SRS.

A basic design principle for the GC DCI for A-SRS may be that the A-SRS transmissions scheduled by the GC DCI are likely to be about the same time, such as in the same slot or a couple of neighboring slots. Based on this principle, we can consider adding a group-common field in the GC DCI to indicate a slot/symbol position that applies to all the A-SRS transmissions triggered by the DCI, together with UE-specific fields for UE-specific symbol offsets (can cross slot) for the UEs, or block-specific fields for block-specific symbol offsets for the SRS blocks.

Moreover, as the A-SRS transmissions maybe on the same slot(s), pre-configured SRS transmission resources (e.g., symbol locations, PRBs, combs/shifts, cyclic shifts) may not fit well and there is likely to be resource conflicts, causing some SRS transmissions to be dropped. To resolve this, the GC DCI may indicate SRS multiplexing via UE-specific SRS port resources (symbols, comb/comb shift, and cyclic shifts).

An example of this is illustrated in FIG. 17. FIG. 17 is an example of SRS resource configuration 1700 for A-SRS transmissions. A SRS region 1702 may be indicated by a SRS GC DCI. Indication of the SRS region may include a starting symbol in a slot (e.g., slot n) and optionally a length (in terms of a number of symbols, such as a TDRA field; and the SRS region may go across slot boundary, e.g., the boundary of slot n and slot n+1 as shown) and frequency domain allocation. The SRS region starting symbol may be indicated as a field common to all SRS blocks. Each SRS block may further be assigned with a subset of port resources within the SRS region 1702. All SRSs indicated in the GC DCI multiplex all the SRS port resources within the SRS region. The GC DCI common timing field may indicate only a reference symbol and a reference PRB/RBG. Then all the block-specific resource allocations are relative to the reference symbol and reference PRB/RBG. The port resources in time domain may include a symbol location, comb and shift for a comb, cyclic shift. Each SRS block within the GC DCI is assigned with a subset of the port resources that are orthogonal to other SRS blocks' assigned port resources.

In some embodiments, the following may be considered for time offset and TDRA indication:

UL/DL TDRA

Non-slot based (2, 4, 7 symbols for SRS, in UL slot or even DL slot for TDD). SRS triggering time offset and time-domain resources may utilize non-slot based structure Even preemption (for eMBB/other UEs) can be used to allow very flexible SRS, to insert a SRS and optionally UL/DL URLLC data A PDCCH schedules a URLLC data (UL/DL) as well as a CSI-acquisition RS (SRS/CSI-RS), possibly all in the same slot, on different symbols In some embodiments, the following aspects may be supported in DCI:

1. Support at least the following flexible A-SRS triggering enhancements in UE-specific DCI:

Add a field for A-SRS time-domain resource allocation.

Allow dynamically indicated frequency-domain allocation, port allocation, and beamforming, reusing existing DCI field designs as much as possible, and reusing existing DCI fields as much as possible.

Enhance UE-specific UL DCI and DL DCI for A-SRS.

48

2. Support at least the following flexible A-SRS triggering enhancements in group common DCI:

Design principle: the A-SRS transmissions scheduled by a GC DCI are in the same or neighboring slots.

Add a group-common field for the slot/symbol position common to all the SRS transmissions Indicate SRS multiplexing via UE-specific SRS port resources (symbols, comb/comb shift, and cyclic shifts)

3. For UL DCI 0_1 and 0_2 to trigger aperiodic SRS without data and without CSI, re-purpose the unused fields for SRS parameter indication, including adding new fields for A-SRS and reusing the design of some unused fields for A-SRS:

Re-purpose the unused PUSCH TDRA field for A-SRS time-domain resource allocation on one or more OFDM symbols, with the PUSCH TDRA field design reused as much as possible.

Also add a new field to indicate the sounding behavior over the allocated multiple OFDM symbols: repetition, hopping, or splitting Re-purpose the unused PUSCH FDRA field, port allocation field, beamforming field, TPC command field, etc., for A-SRS, with the same field design reused as much as possible.

Re-design the SRS request field to include more bits for indicating SRS resource(s)/resource set(s).

4. For UL DCI 0_1 and 0_2 with data and DL DCI 1_1 and 1_2 with data to trigger aperiodic SRS:

Add one A-SRS TDRA field for A-SRS time-domain resource allocation on one or more OFDM symbols, with the PUSCH/PDSCH TDRA field design reused as much as possible (up to 4 bits).

Also add a new field to indicate the sounding behavior over the allocated multiple OFDM symbols: repetition, hopping, or splitting Add one flag bit to indicate whether or not the A-SRS also use PUSCH/PDSCH fields for its parameter indication, including FDRA field, port allocation field, beamforming field, etc.

5. Enhance GC DCI 2_3 to optionally include at least a TDRA field to a SRS triggering block, for flexible triggering offset, and increase the bits for indicating SRS resource(s)/resource set(s).

SRS coverage may be limited by the transmission power of the UE if the DL coverage for the UE is not an issue. To overcome the power limitation, the following embodiments are provided.

An embodiment is to focus the power on the narrower bandwidth or fewer subcarriers to increase the UL receive SNR. Current sounding already supports non-wideband transmissions (4 RBs at the minimum), but in a coverage-limited scenario, the narrowband sounding may be further split into multiple partial sounding to cover the bandwidth of one narrowband sounding. This is also useful to take advantage of frequency selectivity and to reduce interference between SRS from different UEs. In addition, this also improves the frequency-selective precoding by SRS.

To support partial bandwidth sounding, the standards may allow 1-2 PRB sounding, PRB skipping, larger comb (i.e., RE skipping), etc.

However, an issue that may arise from partial bandwidth sounding is that the gNB may not be able to combine multiple partial bandwidth sounding transmissions to obtain wideband CSI, since each sounding transmission is generally associated with an unknown random phase. This needs to be addressed.

An embodiment is to repeat in time domain, including multiple symbols in the same slot and across multiple slots. Simple repetition can be supported. Repetition with a different comb/comb shift or (staggered in REs/PRBs or with different densities) may also be allowed.

An embodiment is to allow TD-OCC in SRS. In CSI-RS, TD-OCC is supported so that multiple OFDM symbols can be utilized to strengthen CSI-RS transmission. This can also be adopted in SRS.

To increase SRS capacity, embodiments should allow more UEs to sound at the same time, and allow more sounding opportunities/resources as well as SRS transmissions multiplexed with other signals.

An embodiment is to use less time/frequency resources for each SRS transmission. If each SRS transmission occupies fewer subcarriers and/or OFDM symbols, then more UEs can sound and SRS capacity is increased. For example, SRS comb may be increased to 8 or 12. For another example, PRB skipping or narrower bandwidth for SRS may be considered, which can also improve SRS coverage described above.

An embodiment is to allow non-orthogonal low-correlation sequences. The number of orthogonal sequences for SRS is limited. To allow more SRS transmissions be multiplexed on overlapping time/frequency resources, non-orthogonal low-correlation sequences maybe adopted. The network can configure/trigger the transmission of non-orthogonal sequences when needed, such as when SRS capacity becomes a limiting factor for operations, but can still use only orthogonal sequences at other times.

An embodiment is to allow more time/frequency resources to be used by SRS. For example, all 14 symbols in a UL slot may be used for SRS, which is already supported in NR-U. To provide this flexibility, flexible configuration and triggering of SRS need to be standardized. This also motivates flexible A-SRS triggering to dynamically/opportunistically utilize unused UL symbols/PRBs or even DL symbols/PRBs in TDD. To support the latter, a SRS switching gap (due to RF retuning) similar to SRS carrier-based switching may be used for harvest some unused DL symbols, i.e., the UE switches from DL reception to SRS transmission on one or several OFDM symbols according to network configuration/indication after a SRS switching gap, and switches back to DL reception after the SRS transmission and another SRS switching gap. Additionally, concurrent SRS+PUCCH or even SRS+PUSCH may be considered to allow more SRS opportunities.

Regarding Class 1 enhancements of time bundling, this can possibly improve SRS coverage. A concern that may exist is the potential phase discontinuity issue. Further analysis shows that, though in general this can be a problem, there exist at least some scenarios in which the phase changes between the SRS transmissions are sufficiently small, e.g., when the SRS transmissions are close enough in time, when the doppler is small, or when the UE's transmit chain can well maintain the phase between transmissions. In any event, the gNB can decide if the phase discontinuity is severe or not, and if not, it can configure the UE to sound in time bundles and then the gNB performs joint processing. This can be up to gNB implementation. As long as the standards provide sufficient support for configuration and/or indication of SRS transmissions in time bundles, the rest can be standard transparent. The current SRS configuration seems generally sufficient, and SRS indication via DCI can be enhanced to trigger time-bundled transmissions.

In some embodiments, the following may be considered for SRS coverage/capacity enhancements related to time bundling:

At least for some scenarios, the potential phase discontinuity is sufficiently small, and time bundling can be supported.

Provide standard support for time bundling via more flexible configuration/indication of SRS transmissions, and leave time bundling transparent to UE.

Regarding Class 2 enhancements of increased repetition, this is arguably the most straightforward way to improve SRS coverage and should be supported. The current standards already allow repetition factor values of n1, n2, n4 and nrofSymbols values of n1, n2, n4, n8, n12 to be configured. To enhance, repetition factor values of n3, n6, n8, etc., may be added, and nrofSymbols values of n3 (which complements n4 in a half slot), n5 (which complements n2 in a half slot), n6 (which complements n1 in a half slot and n8 in a slot), n10 (which complements n2 in a slot), and n14 may be added. One SRS occasion may also extend to the next slot, for example, for nrofSymbols of n6, the SRS may use the 2 last symbols in a slot and 4 symbols in the next slot, and the 4 symbols in the next slot may be at the beginning of that slot if the symbols are available SRS time-domain resources, or may be at a different time-domain location based on the available SRS time-domain resources. RRC configuration and DCI indication of SRS transmission repetitions/symbols can be enhanced.

The increased repetition may cause that fewer signals/ UEs can be multiplexed at the same time. This negative effect may be partially compensated via partial frequency sounding, which will be discussed below. However, this means that the standards may need to consider joint design of time-domain repetition and partial frequency sounding, such as when the time-domain repetition increases, the frequency-domain resources may become sparser or less.

In some embodiments, the following may be considered for SRS coverage/capacity enhancements Class 2 (Increase repetition):

Allow more repetition factor values and more nrofSymbols values to be configured/indicated;

Allow cross-slot resource mapping;

Allow joint design of partial frequency sounding with increased repetition to compensate the negative impact on SRS capacity.

The following provides embodiment candidate schemes for partial frequency sounding:

Scheme 3-1: RB-level partial frequency sounding

Scheme 3-2: Subcarrier-level partial frequency sounding

Scheme 3-3: Subband-level partial frequency sounding

Scheme 3-4: Partial-frequency sounding schemes assisted with CSI-RS, where SRS is transmitted in a subset of RBs of the original SRS frequency resource Scheme 3-5: Dynamic change of SRS bandwidth with RB-level subband size scaling Class 3 enhancements of partial frequency sounding mainly include more flexibility on SRS frequency resources to allow SRS transmission on partial frequency resources within the legacy SRS frequency resources. Regarding Class 3 enhancements of partial frequency sounding, this is useful to focus the power on the narrower bandwidth or fewer subcarriers to increase the UL receive SNR. Current sounding already supports non-wideband transmissions (4 PRBs at the minimum), but in a coverage-limited scenario, the narrowband sounding maybe further split into multiple partial sounding to cover the bandwidth of one narrowband sounding. This is also useful to take advantage of frequency selectivity and to reduce interference between SRS from different UEs. In addition, this also improves the frequency-selective precoding by SRS. The partial bandwidth granularity may be changed to 1-2 PRBs. However, to reduce signaling overhead, some restrictions may be considered. If the A-SRS is associated with a specific PDSCH/PUSCH transmission, the SRS may have the same granularity as PDSCH/PUSCH frequency-domain resource allocation granularity. For example, for resource allocation Type 0, which is resource block group (RBG) based, SRS may also follow the same RBG based granularity (a RBG is 2/4/8/16 PRBs). As an example, when the PDSCH/PUSCH is transmitted in multiple non-contiguous RBGs, SRSs may also be transmitted in the multiple non-consecutive RBGs. For resource allocation Type 1 (contiguous allocation in frequency domains, i.e., the frequency resources allocated for a transmission occupies contiguous PRBs), which is PRB based, SRS bandwidth may also be as small as one PRB. As an example, when the PDSCH/PUSCH is transmitted in contiguous PRBs, SRSs may also be transmitted in the contiguous PRBs.

Figure 18:
FIG. 18 is a diagram illustrating an example BIT based on A-SRS triggering with dynamically indicated partial frequency sounding according to example embodiments presented herein.

FIG. 18 is a diagram 1800 of an example BiT based on A-SRS triggering with dynamically indicated partial frequency sounding. In FIG. 18, each block represents a PRB. In this example, a gNB may pre-schedule a subset of PRBs (e.g., PRBs 1802 and 1804) for data transmission in TTI m. To probe the interference on the subset of PRBs pre-scheduled for data, the UE may only need to sound on the subset of PRBs, e.g., on PRBs 1802 and 1804 in TTI m+n. Data transmission with precoder adjusted from the SRS-based interference probing may then be done, e.g., in TTI m+n+k. Since the SRS transmission is tied to a specific data transmission, flexible A-SRS triggering can be used.

Partial frequency sounding can also be achieved by spreading transmission for one SRS resource (or resource set) into multi-hopping transmissions. For example, a SRS resource on 8 PRBs (PRBs 1—8) may be done in 2-hopping transmissions, the first hop on PRBs 1—4 and the second on 5—8. A hop may be configured/indicated based on frequency-domain granularity, such as a PRB (i.e., each hop has n PRBs) or a RBG (i.e., each hop has n RBGs). The different hops may also have different combs and/or different comb shifts. For example, a SRS resource of comb 4 and shift 0 may be split into 2 hops, the first with comb 8 and shift 0, and the second with comb 8 and shift 4.

The above described candidate schemes other than Scheme 3-2 are all in this category with possibly different granularities of N consecutive PRBs. For example, for Scheme 3-1, N=1; Scheme 3-3, N=4 or N can be the same as PDSCH/PUSCH frequency-domain resource allocation granularity as described above (i.e., N=2, 4, 8, 16); Scheme 3-4, N=1, 2, 4, 8, etc.; and Scheme 3-5, N=2 or 4. Although the schemes may be motivated in different ways, their standard impact may be similar and one unified design may be used to support all of them.

To summarize, Schemes 3-1, 3-3, 3-4, and 3-5 belong to Category A: Partial frequency sounding with granularity of N PRBs, where N=1, 2, 4, 8, 16, etc., and may be supported by one unified design.

Partial frequency sounding can also be achieved if each SRS transmission occupies fewer subcarriers, then more UEs can sound and SRS capacity is increased, which can also improve SRS coverage when the power is more focused. For example, SRS comb may be increased to 6, 8, or 12. Scheme 3-2 falls into this category, referred to as Category B: Partial frequency sounding with larger combs.

Note that Category A and Category B may be combined in some cases.

For conventional sounding, a SRS occupies one contiguous segment of the bandwidth, which prevents peak to average power ratio (PAPR) from becoming too high. Depending on the specific proposal/design/implementation, several candidate schemes (e.g., Schemes 3-1, 3-2, and 3-3) consider transmitting SRS on non-contiguous segments in the frequency domain, which generally leads to some small increase of PAPR. Based on our evaluations, about 0.5 dB to 3 dB increase of PAPR may be seen if two of more non-contiguous SRS segments are transmitted on the same OFDM symbol. Further analysis on non-contiguous sounding PAPR will be described later in the disclosure.

There may be a few solutions to address the PAPR issue as described in the following:

First, as the PAPR increase is not significant and can be pre-estimated by both the gNB and the UE, the gNB may decide some non-contiguous SRS transmissions only for some cell-center UEs. This is an implementation-oriented solution and does not require any standard support.

Second, when K non-contiguous SRS segments are to be transmitted, the gNB may indicate to the UE to autonomously split the K segments on K OFDM symbols and hence on each OFDM symbol, SRS transmission is only on a segment of contiguous PRBs. This prevents the PAPR increase and further reduces the SRS transmission bandwidth, which is suitable for cell-center and cell-edge UEs. This requires some standard support, for example, the split may be indicated in the triggering DCI as part of the time-domain behaviour for the SRS on multiple OFDM symbols.

Non-contiguous SRS segments can still be supported without significant increase of PAPR.

FIG. 19 is a diagram 1900 illustrating a frequency resource split for SRS transmission. In FIG. 19, a gNB may pre-schedule a data transmission to a UE on a frequency resource including a first group of contiguous PRBs 1902 and a second group of contiguous PRBs 1904. The two groups are non-contiguous in the frequency domain. The gNB may trigger the UE to perform probing on the same frequency resource, and configure the UE with same frequency resource for SRS transmissions. The UE, upon triggered, may transmit SRSs on the configured frequency resource. In an example, the UE may split the configured frequency resource into two segments (based on the two non-contiguous groups), i.e., segment 1902 and segment 1904, and transmit SRSs over the two segments 1902 and 1904 in two different OFDM/SC-FDM symbols 1906 and 1908. The UE may split the frequency resource into more segments, which may be indicated by the gNB or depend on how many non-contiguous frequency segments the frequency resource includes. In one OFDM/SC-FDM symbol, a SRS may be transmitted on only a portion of the frequency resources configured by RRC or indicated by DCI from the gNB to the UE. In one embodiment, the UE may transmit a SRS according to a frequency hopping pattern in the two OFDM symbols. In another embodiment, the UE may repeatedly transmit a SRS over a segment in different OFDM symbols. For example, the SRS may be transmitted three times in three different symbols over the same segment 1902. The gNB may indicate whether the SRS transmission is to be performed on split frequency resources, is to be hopped in OFDM symbols over frequency segments, and/or repeated in OFDM symbols over one or more frequency segment. Upon receipt of the SRSs, the gNB may adjust precoder for the data transmission on the frequency resource based on the received SRSs.

In some embodiments, standard support may be provided for Category A schemes with possible repetitions/splits.

All schemes in Category A can be supported with a unified design which may also incorporate possible repetitions/splits/hopping over multiple OFDM symbols. A DCI triggering a partial frequency sounding includes a FDRA field with a bitmap, each bit indicating sounding on N consecutive PRBs. Another field in the DCI can be used to indicate if the sounding is to be repeated on the indicated multiple OFDM symbols, hopped on the indicated multiple OFDM symbols, or split on the indicated multiple OFDM symbols.

The following may be considered for SRS coverage/capacity enhancements Class 3 (Partial frequency sounding):

Support SRS partial bandwidth granularity based on PDSCH/PUSCH resource allocation granularity;

Support SRS comb 6, 8, and 12;

Support multi-hopping SRS resource (one SRS resource done by multiple hopping in terms of PRB/RBGs and/or comb shifts).

In 3GPP Release 17, further enhanced MIMO (FeMIMO) sounding reference signal enhancements include:

Identify and specify enhancements on aperiodic SRS triggering to facilitate more flexible triggering and/or DCI overhead/usage reduction;

Specify SRS switching for up to 8 antennas (e.g., xTyR, x={1, 2, 4} and y={6, 8});

Evaluate and, if needed, specify the following mechanism(s) to enhance SRS capacity and/or coverage: SRS time bundling, increased SRS repetition, partial sounding across frequency.

Motivations regarding flexible triggering include:

Limited triggering info in DCI (1, 2, or 3 bits only);

Inflexible triggering delay;

Vital roles of SRS in DL full MIMO CSI acquisition, BM, UL frequency diversity and MIMO support, etc.;

NEW: Vital roles of an aperiodic SRS (A-SRS) in TDD cooperative MIMO via DL interference probing and mitigation include:

UE to Tx SRS according to DL (pre-)scheduling results, so that gNB can estimate DL interference and then mitigate DL interference via precoder adjustment, Some similarity with DL NZP CSI-RS based interference probing for better MCS. This is also after scheduling and before PDSCH, but with UL SRS for better precoding (hence bi-directional training, BiT).

Also closely related to SRS coverage/capacity enhancements.

Figure 20A:
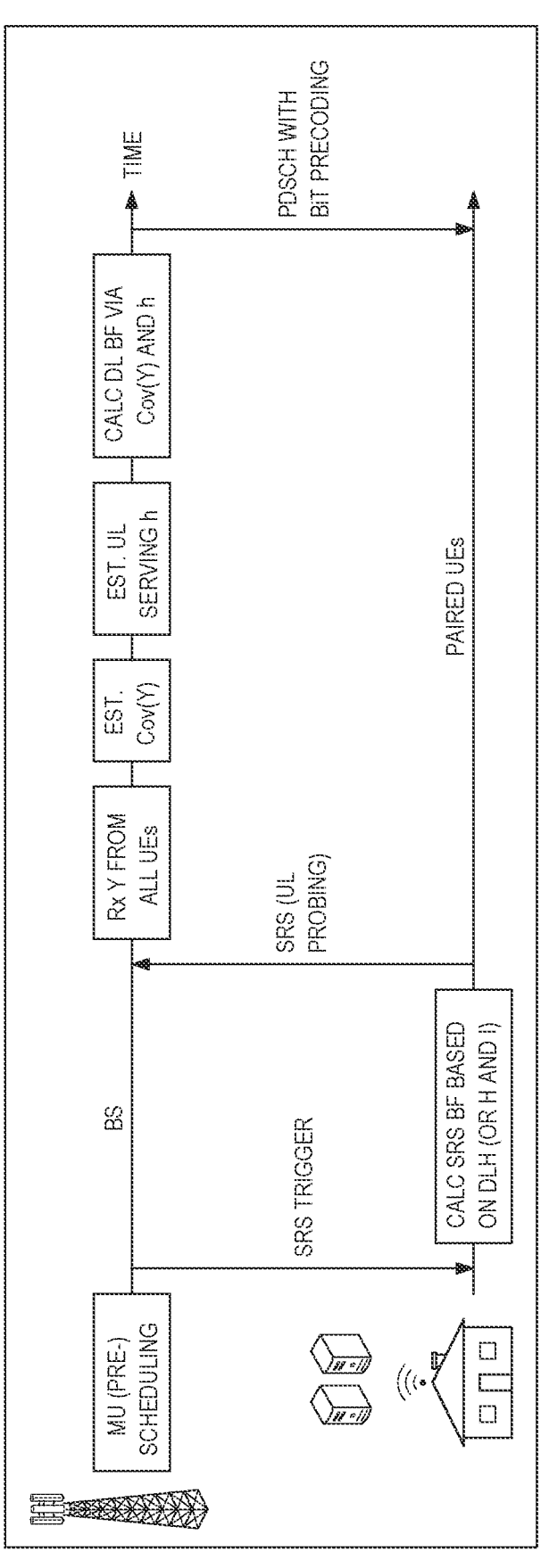
FIG. 20A illustrates an example one-shot BIT operation flow according to example embodiments presented herein.

FIG. 20A illustrates an example one-shot BIT operation flow 2000. In BIT, a precoded SRS is based on PDSCH scheduling and then the PDSCH itself. The precoded sounding is based on MU pre-scheduling for the gNB to cooperatively probe the DL interference conditions in the UL.

As shown in FIG. 20A, Cov(Y) captures inter/intra cell interference in UL and the $(Cov(Y))^{-1}$ h enables UL interference avoidance. Then, by reciprocity, DL Tx with this precoding enables cooperative DL interference avoidance. Theoretical guidance is derived from global optimization.

Figure 20B:
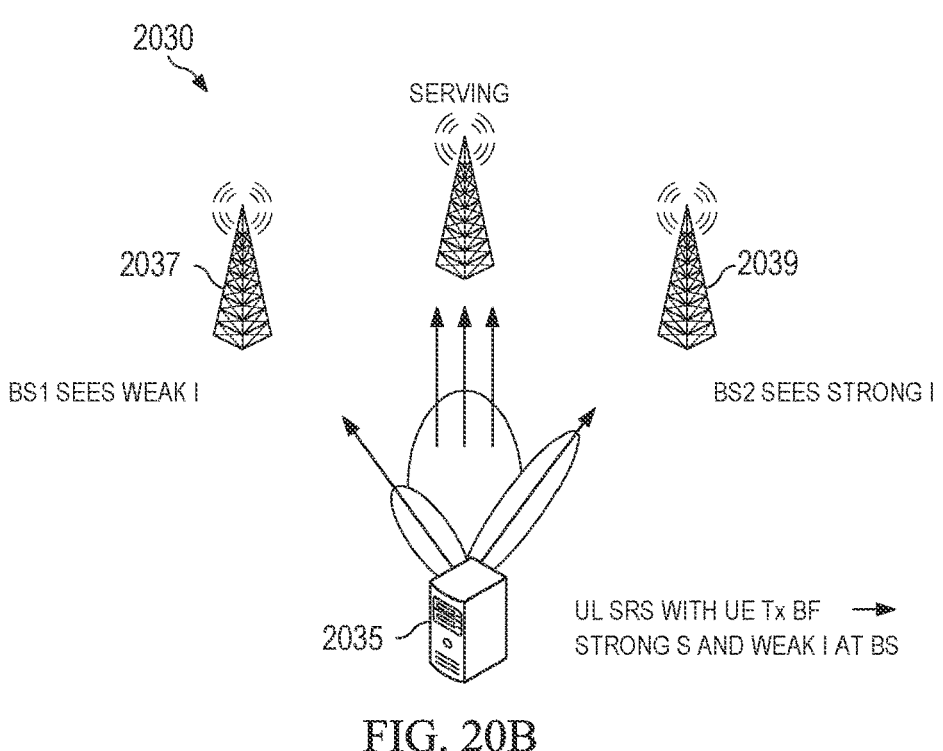
FIGS. 20B and 20C illustrate communication systems highlighting example interference conditions according to example embodiments presented herein.
Figure 20C:
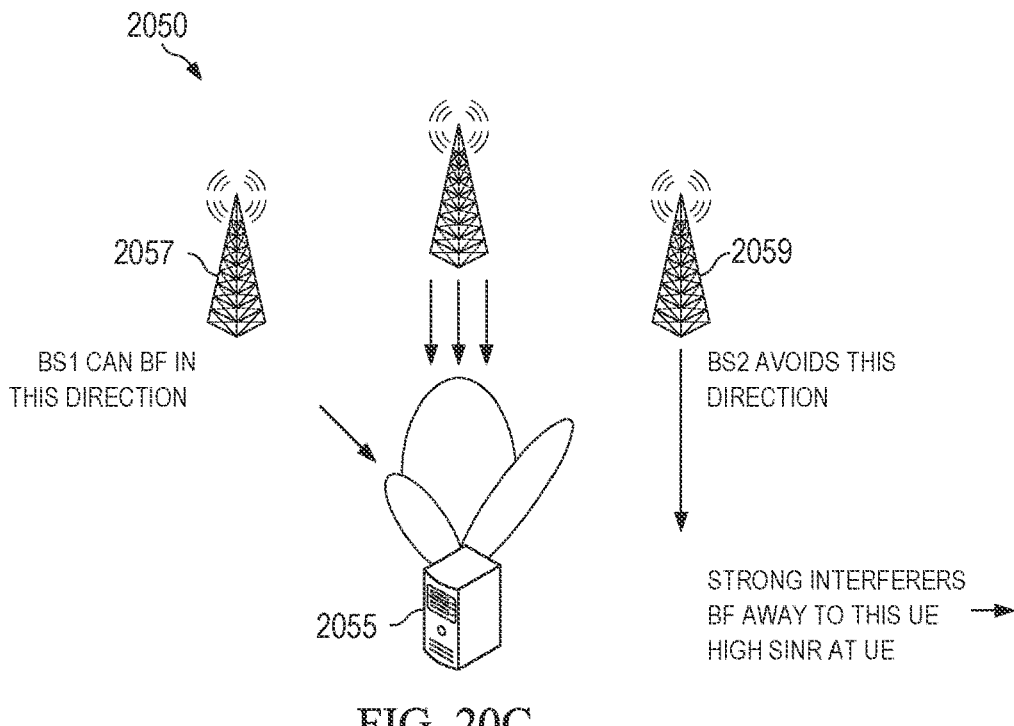

FIGS. 20B and 20C illustrate communication systems highlighting example interference conditions. Communication system 2030 of FIG. 20B illustrates a situation where UL SRS transmissions made by UE 2005, using transmit beamforming results in weak interference at a first BS 2007, while a second BS 2009 sees strong interference. Communication system 2050 of FIG. 20C illustrates a situation where beamforming may be used to reduce interference to UEs. A first BS 2057 can use beamforming in the direction of UE 2055, but a second BS 2059 avoids beamforming in the direction of UE 2055 because such transmissions may cause high interference at UE 2055.

Figure 21A:
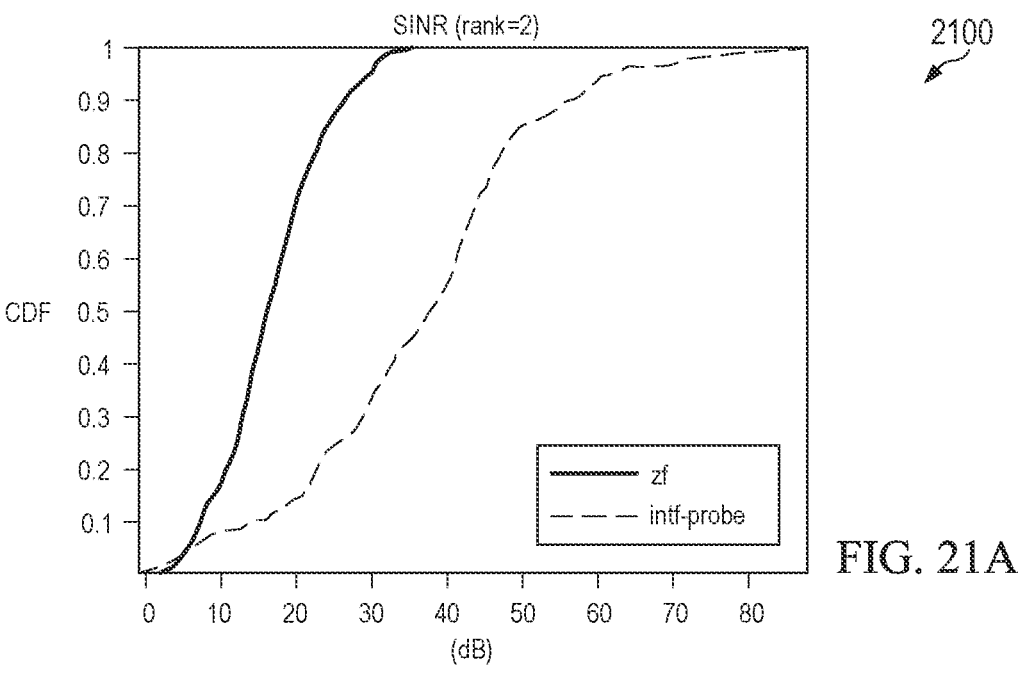
FIGS. 21A and 21B illustrate data plots of example BIT performance according to example embodiments presented herein.
Figure 21B:
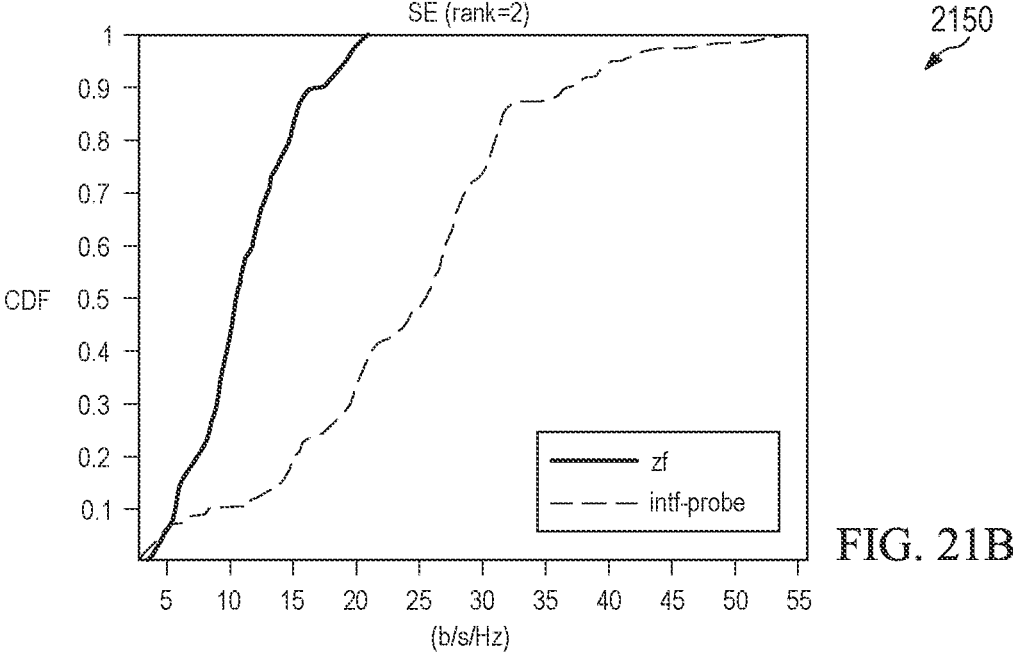

FIGS. 21A and 21B illustrate data plots 2100 and 2150 of example BIT performance.

With regard to flexible A-SRS triggering for BIT, SRS may include enhancements with dynamically indicated parameters associated with corresponding DL transmissions. The enhancements may include:

A-SRS triggering with dynamically indicated PRB allocation (e.g., FDRA) and port allocation;

A-SRS triggering with dynamically indicated DL channel measurement resources (CMR) and/or interference measurement resources (IMR);

A-SRS triggering with flexible triggering delay.

As related to reducing DCI overhead for flexible triggering, motivations include:

All the flexible triggering may lead to higher DCI overhead;

BiT may also require more A-SRS triggers.

Example solutions may include:

UE-specific DCI for A-SRS with FDRA and port indication (same as PDSCH). However, FDRA may require 5-19 bits in general, and port indication may require 4-6 bits;

Group common DCI to a set of UEs possibly paired for MU transmission in a slot, with FDRA and port indication. However, SRS triggering offsets may not be equal for the set of UEs.

According to an example embodiment, methods and apparatus on how to trigger the SRS transmissions with all the needed SRS parameters in DCI but with reduced DCI overhead, as well as the associated UE assumptions/behavior/configurations to support this are provided. Table 2 below shows the current DCI 1-1 format used for scheduling of PDSCH in one cell. Table 3 below shows Antenna ports.

TABLE 2

| Field (Item) | Bits | Reference |
|---|---|---|
| Carrier indicator | 0, 3 | |
| Identifier for DCI formats | 1 | Set to 1, indicating a DL DCI format |
| Bandwidth part indicator | 0, 1, 2 | |
| Frequency domain resource assignment | Variable | Variable with Resource Allocation Type |

TABLE 2-continued

| Field (Item) | Bits | Reference |
|---|---|---|
| Time domain resource assignment | 4 | Carries the row index of the items in pdsch_allocationList in RRC |
| VRB-to-PRB mapping | 0, 1 | 0 bit if only resource allocation type 0 is configured or if interleaved VRB-to-PRB mapping is not configured by high layers; 1 bit according to Table 7.3.1.1.2-33 otherwise, only applicable to resource allocation type 1 |
| PRB bundling size indicator | 0, 1 | 0 bit if the higher layer parameter prb-BundlingType is not configured or is set to 'static' 1 bit if the higher layer parameter prb-BundlingType is set to 'dynamic' |
| Rate matching indicator | 0, 1, 2 | Bit size is determined by higher layer parameters rateMatchPatternGroup1 and rateMatchPatternGroup2. |
| ZP CSI-RS Trigger | 0, 1, 2 | |
| Modulation and coding scheme [TB1] | 5 | |
| New data indicator [TB1] | 1 | |
| Redundancy version [TB1] | 2 | |
| Modulation and coding scheme [TB2] | 5 | |
| New data indicator [TB2] | 1 | |
| Redundancy version [TB2] | 2 | |
| HARQ process number | 4 | |
| Downlink assignment index | 0, 2, 4 | 4 bits if more than one serving cell are configured in the DL and the higher layer parameter pdsch-HARQACK-Codebook = dynamic, where the 2 MSB bits are the counter DAI and the 2 LSB bits are the total DAI; 2 bits if only one serving cell is configured in the DL and the higher layer parameter pdsch-HARQ-ACKCodebook = dynamic, where the 2 bits are the counter DAI; 0 bits otherwise. |
| TPC command for scheduled PUCCH | 2 | |
| PUCCH resource indicator | 2 | |
| PDSCH-to-HARQ_feedback timing indicator | 0, 1, 2, 3 | Row number(index) of K1 Number of bit is determined by log2(I). 'I' is the number of elements in the IE PUCCH-Config.dl-DataToUL-ACK |
| Antenna port(s) and number of layers | 4, 5, 6 | Determined by dmrs Configuration Type and max Length. See the table to the right. |
| Transmission configuration indication | 0, 3 | 0 bit if higher layer parameter tci-PresentInDCI is not enabled; 3 bits otherwise (See QCL page) |
| SRS request | 2 | |
| CBG transmission information(CBGTI) | 0, 2, 4, 6, 8 | |
| CBG flushing out information(CBGFI) | 0, 1 | |
| DMRS sequence initialization | 1 | |

TABLE 3

| dmrs-Type | maxLength | Bit Field Length | Table in 38.212 |
|---|---|---|---|
| 1 | 1 | 4 | Table 7.3.1.2.2-1 |
| 1 | 2 | 5 | Table 7.3.1.2.2-2 |
| 2 | 1 | 5 | Table |

TABLE 3-continued

| dmrs-Type | maxLength | Bit Field Length | Table in 38.212 |
|---|---|---|---|
| | | | 7.3.1.2.2-3 |
| 2 | 1 | 6 | Table 7.3.1.2.2-4 |

According to an example embodiment, an enhanced DCI 1-1 format is provided. The enhanced DCI 1-1 format supports the scheduling of PDSCH in one cell, as well as associated SRS probing. Table 4 below provides details regarding the enhanced DCI 1-1 format.

TABLE 4

| Field (Item) | Bits | Reference | Notes |
|---|---|---|---|
| Frequency domain resource assignment (FDRA) | Variable | Variable with Resource Allocation Type | Existing for PDSCH. Now apply to PDSCH and SRS |
| Time domain resource assignment (TDRA) | 4 | Carries the row index of the items in pdsch__allocationListin RRC | Existing for PDSCH. No change |
| VRB-to-PRB mapping | 0, 1 | 0 bit if only resource allocation type 0 is configured or if interleaved VRB-to-PRB mapping is not configured by high layers; 1 bit according to Table 7.3.1.1.2-33 otherwise, only applicable to resource allocation type 1 | Existing for PDSCH. Now may also apply to SRS |
| PRB bundling size indicator | 0, 1 | 0 bit if the higher layer parameter prb-BundlingType is not configured or is set to 'static' 1 bit if the higher layer parameter prb-BundlingType is set to 'dynamic' | Existing for PDSCH. Now may also apply to SRS |
| Antenna port(s) and number of layers | 4, 5, 6 | Determined by dmrs Configuration Type and max Length See e.g., Table 7.3.1.2.2-2 of TS 38.212 v16.2.0. | Existing for PDSCH. Now apply to PDSCH and SRS |
| SRS request | 2 or more | | Existing. Now may add more bits for SRS resource selection |
| SRS Time domain resource assignment | 0~4 | Carries the row index of the items in pdsch__allocationListorpusch__allocationListorsrs__allocation Listin RRC. Optional. Default is per RRC configuration | New. Apply to SRS. Optional. Shall be earlier than PDSCH |
| SRS TPC command | 0, 2 | Optional for SRS power control | New. Optional. May present if SRS has separate power control than PUSCH |
| SRS beamforming indicator | 0~6 | Optional, indicate SRS beamforming/precoding based on a CMR and optionally an IMR. If not present then a default CMR is used for SRS beamforming determination | New. Optional. Can reuse 0_1 CSI Request field design |
| SRS association with PDSCH | 0, 1 | Optional. If set, then A-SRS uses PDSCH fields such as FDRA. | New |
| CSI request | 0~6 | Optional. Triggers an aperiodic CSI report. May also trigger an aperiodic CSI-RS/CSI-IM transmission. | New |
| SRS association with the CSI request | 0, 1 | Optional. If set, then A-SRS uses CSI-RS/CSI-IM associated with the CSI request fields for beamforming. | New |
| . . . | | | Other fields: same as before |

The enhanced DCI 1-1 format includes the following beneficial features:

The fields FDRA and antenna port indications are needed for SRS probing, but the overhead is high. The enhanced DCI 1-1 design reuses existing fields of FDRA and antenna port indications in the associated PDSCH-scheduling DCI, and adds a new SRS triggering offset, so that one DCI can be used for two operations (SRS transmissions and PDSCH reception, for example).

The GC DCI may also add a new SRS triggering offset field, so that all SRSs are transmitted on overlapping resources for BiT purposes.

Not all the new fields or optional fields need to be present in Enhanced DCI 1-1 format.

Table 5 below shows further example enhancements to DCI 1-1.

TABLE 5

| Field (Item) | Bits | Reference | Notes |
|---|---|---|---|
| SRS association with PDSCH | 0, 1 | Optional. If set, then SRS uses PDSCH fields such as FDRA. | New |
| CSI request | 0~6 | Optional. Triggers an aperiodic CSI report. May also trigger an aperiodic CSI-RS/CSI-IM transmission. | New |
| SRS association with the CSI request | 0, 1 | Optional. If set, then SRS uses CSI-RS/CSI-IM associated with the CSI request fields for beamforming | New |

Further enhancements to DCI 2-3 and 0-1 may include: The SRS triggered by the DCI may be linked to another DL DCI, and the SRS reuses fields (e.g., FDRA, antenna ports) from the linked DCI.

Figure 22:
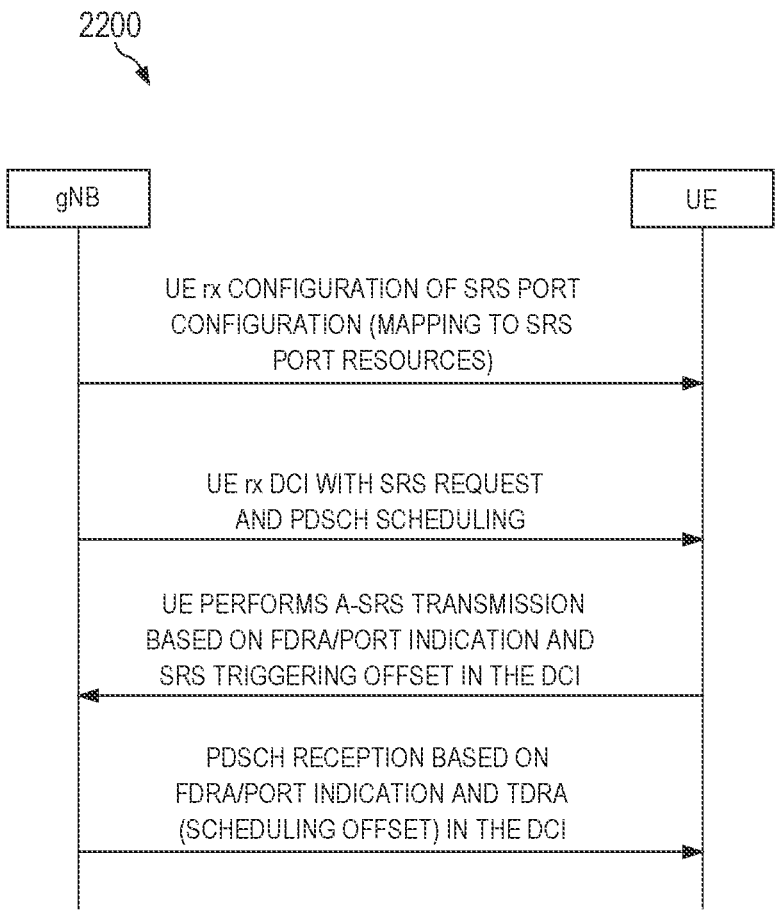
FIG. 22 illustrates a diagram of information exchanged between a gNB and a UE as the gNB configures UL SRS sounding and then makes a DL transmission based on the UL SRS sounding results according to example embodiments presented herein.

FIG. 22 illustrates a diagram 2200 of information exchanged between a gNB and a UE as the gNB configures UL SRS sounding and then makes a DL transmission based on the UL SRS sounding results.

According to an example embodiment, an enhanced DCI 0-1 format is provided. The enhanced DCI 0-1 format supports the scheduling of PUSCH in one cell, as well as associated SRS probing. Table 6 below provides details regarding the enhanced DCI 0-1 format. Table 7 below shows example fields in DCI format 0_1 repurposed for A-SRS triggering.

TABLE 6

| Field | Bits | Reference | Note |
|---|---|---|---|
| Identifier for DCI formats | 1 | | Existing for PUSCH |
| Carrier indicator | 0 or 3 | | Existing for PUSCH. Now may apply to SRS as well |
| UL/SUL Indicator | 0, 1 | 0 - bit for UE not configured with SUL in the cell<br>1 - bit for UEs configured with SUL in the cell | Existing for PUSCH. Now may apply to SRS as well |
| Bandwidth part indicator | 0, 1, 2 | Determined by BandwidthPart-Config in higher layer message and 38.212 - Table 7.3.1.1.2-1 | Existing for PUSCH. Now may apply to SRS as well |
| Frequency domain resource assignment | Variable | Variable with Resource Allocation Type | Existing for PUSCH. Now may apply to SRS as well |
| Time domain resource assignment | 4 | Carries the row index of the items in pusch_allocationList in RRC<br>Number of Bit Length is determined by log(I, 2), where I is the number of elements in pusch_allocationList in RRC | Existing for PUSCH. Now may apply to SRS as well but with certain offset |
| Frequency Hopping Flag | 0, 1 | | Existing for PUSCH. Now may apply to SRS as well |
| Modulation and coding scheme | 5 | 38.214 - 6.1.4 (See this table) | Existing for PUSCH. |
| New data indicator | 1 | | Existing for PUSCH. |
| Redundancy version | 2 | 0, 1, 2, 3 | Existing for PUSCH. |
| HARQ process number | 4 | | Existing for PUSCH. |
| TPC command for scheduled PUSCH | 2 | | Existing for PUSCH. Now may apply to SRS as well |
| SRS resource indicator | Variable | Determined by RRC Parameter SRS-SetUse | Existing for PUSCH. Now may apply to SRS as well |

TABLE 6-continued

| Field | Bits | Reference | Note |
|---|---|---|---|
| Precoding information and number of layers (TPMI) | 0, 2, 3, 4, 5, 6 | Determined by ulTxConfig, Number of Antenna ports, PUSCH-tp, ULmaxRank | Existing for PUSCH. Now may apply to SRS as well |
| Antenna ports | 2, 3, 4, 5 | Determined by PUSCH-tp, DL-DMRS-config-type, DL-DMRS-config-max-len, Rank | Existing for PUSCH. Now may apply to SRS as well |
| SRS request | 2 | Table 7.3.1.1.2-24 | Existing for PUSCH. Now may include more bits and more information |
| CSI request | 0, 1, 2, 3, 4, 5, 6 | Determined by ReportTriggerSize in RRC message. See Configure Aperiodic Trigger section for the details. | Existing for PUSCH. Now may apply to SRS as well for beamforming |
| SRS Time domain resource assignment | 0~4 | Carries the row index of the items in pdsch_allocationListorpusch_allo-cationListorsrs_allocationListin RRC. Optional. Default is per RRC configuration | New. Apply to SRS. Optional. Shall be earlier than PDSCH |
| SRS TPC command | 0, 2 | Optional for SRS power control | New. Optional. May present if SRS has separate power control than PUSCH |
| SRS association with PDSCH/PUSCH | 0, 1, or more | Optional. If set, then A-SRS uses PDSCH fields such as FDRA, or an associated PDSCH's fields such as FDRA | New |
| SRS association with the CSI request | 0, 1 | Optional. If set, then A-SRS uses CSI-RS/CSI-IM associated with the CSI request fields for beamforming. | New |
| UL-SCH Indicator | 1 | 0 - UL-SCH shall not be transmitted on the PUSCH 1 - UL-SCH shall be transmitted on the PUSCH | |

Not all the new fields or optional fields need to be present in Enhanced DCI 0-1 format.

TABLE 7

| Field in 0_1 | Bits | Current Usage | New Usage with data/CSI and SRS not linked to data | New Usage with data/CSI and SRS linked to data | New Usage for SRS without data and without CSI |
|---|---|---|---|---|---|
| Identifier for DCI formats | 1 | Identify 0_1 | Identify 0_1 | Identify 0_1 | Identify 0_1 |
| Carrier indicator | 0 or 3 | PUSCH carrier | PUSCH carrier | SRS carrier same as PUSCH | SRS carrier or carrier set |
| UL/SUL Indicator | 0, 1 | UL/SUL for PUSCH | UL/SUL for PUSCH | SRS UL/SUL same as PUSCH | UL/SUL for SRS |
| Bandwidth part indicator | 0, 1, 2 | BWP for PUSCH | BWP for PUSCH | SRS BWP same as PUSCH | BWP for SRS |
| Frequency domain resource assignment | Variable | PUSCH FDRA | PUSCH FDRA | SRS FDRA same as PUSCH | SRS FDRA |

TABLE 7-continued

| Field in 0_1 | Bits | Current Usage | New Usage with data/CSI and SRS not linked to data | New Usage with data/CSI and SRS linked to data | New Usage for SRS without data and without CSI |
|---|---|---|---|---|---|
| Time domain resource assignment | 4 | PUSCH TDRA | PUSCH TDRA | PUSCH TDRA | SRS TDRA |
| Frequency Hopping Flag | 0, 1 | PUSCH hopping | PUSCH hopping | SRS hopping same as PUSCH | SRS hopping |
| Modulation and coding scheme | 5 | PUSCH MCS | PUSCH MCS | PUSCH MCS | N/A |
| New data indicator | 1 | PUSCH NDI | PUSCH NDI | PUSCH NDI | N/A |
| Redundancy version | 2 | PUSCH RV | PUSCH RV | PUSCH RV | N/A |
| HARQ process number | 4 | PUSCH HARQ | PUSCH HARQ | PUSCH HARQ | N/A |
| TPC command for scheduled PUSCH | 2 | PUSCH TPC | PUSCH TPC | PUSCH TPC (may also be SRS TPC if not separate PC) | SRS TPC |
| SRS resource indicator | Variable | SRI for PUSCH | SRI for PUSCH | May be the same as SRS request | Maybe combined with SRS request |
| Precoding information and number of layers (TPMI) | 0, 2, 3, 4, 5, 6 | PUSCH TPMI | PUSCH TPMI | SRS codebook-based precoding and # of ports, same as PUSCH | SRS codebook-based precoding and # of ports |
| Antenna ports | 2, 3, 4, 5 | PUSCH ports | PUSCH ports | SRS ports same as PUSCH | SRS ports |
| SRS request | 2 | SRS request | SRS request (may use more bits) | SRS request (may use more bits) | SRS request (may use more bits) |
| CSI request | 0, 1, 2, 3, 4, 5, 6 | For AP CSI | For AP CSI, and may also be for SRS non-codebook based precoding | For AP CSI, and may also be for SRS non-codebook based precoding | For SRS non-codebook based precoding |
| SRS Time domain resource assignment | 0~4 | N/A | SRS TDRA | SRS TDRA | SRS TDRA |
| SRS TPC command | 0, 2 | N/A | SRS TPC if SRS has separate power control than PUSCH | SRS TPC if SRS has separate power control than PUSCH | N/A |
| SRS association with PUSCH | 0, 1 | N/A | =0, SRS does not reuse PUSCH fields | =1, SRS reuses PUSCH fields | N/A |
| SRS association with the CSI request | 0, 1 | N/A | SRS uses CSI resources for precoding or not | SRS uses CSI resources for precoding or not | N/A |
| UL-SCH Indicator | 1 | 0 - UL-SCH shall not be transmitted 1 - UL-SCH shall be transmitted on the PUSCH | 1 | 1 | 0 |

For all other SRS parameters not indicated in the DCI, RRC/MAC signaling maybe used to determine those parameters.

Table 8 below shows example fields in DCI format 1_1 repurposed for A-SRS triggering.

TABLE 8

| Field in 1_1 | Bits | Current Usage | New Usage with data and SRS not linked to data | New Usage with data and SRS linked to data |
|---|---|---|---|---|
| Frequency domain resource assignment (FDRA) | Variable | PDSCH FDRA | PDSCH FDRA | SRS FDRA same as PDSCH |
| Time domain resource assignment (TDRA) | 4 | PDSCH TDRA | PDSCH TDRA | PDSCH TDRA |
| VRB-to-PRB mapping | 0, 1 | PDSCH mapping | PDSCH mapping | SRS mapping same as PDSCH |
| PRB bundling size indicator | 0, 1 | PDSCH bundling | PDSCH bundling | SRS bundling same as PDSCH |
| Antenna port(s) and number of layers | 4, 5, 6 | PDSCH port(s) and # of layers | PDSCH port(s) and # of layers | SRS port(s) and # of layers, same as PDSCH |
| SRS request | 2 or more | For SRS | For SRS, may add more bits for SRS resource selection | For SRS, may add more bits for SRS resource selection |
| SRS Time domain resource assignment | 0~4 | N/A | SRS TDRA | SRS TDRA |
| SRS TPC command | 0, 2 | Optional for SRS power control | SRS TPC command | SRS TPC command |
| SRS beamforming indicator | 0~6 | N/A | SRS precoding based on a CMR and optionally an IMR | SRS precoding based on a CMR and optionally an IMR |
| SRS association with PDSCH | 0, 1 | N/A | =0, A-SRS does not reuse PDSCH fields | =1, A-SRS reuses PDSCH fields |
| . . . | | | Other fields: same as existing | Other fields: same as existing |

As shown in FIG. 22, the A-SRS may also be based on the Carrier indicator field, Bandwidth part indicator field, VRB-PRB mapping field, PRB bundling size field, TPC command for the PUCCH field, or TPC command for the SRS field in the DCI. Furthermore, the SRS triggering offset may be indicated in a TDRA field (reused design from PUSCH or PDSCH, for example). A CMR, and optionally an IMR, may be included for the UE to determine the SRS precoding, which may reuse the design of CSI request field, for example.

Example SRS mapping of resources and ports may be as follows (with reference to FIG. 6):

Assume DMRS Type 1, i.e., 8 ports/RGB/cell for all paired UEs, is used;

The 8 ports are associated with 8 SRS port resources, selected from n available port resources:

For comb 4, n=48,

For comb 2, n=16.

The SRS from neighboring cells should be multiplexed on the n SRS port resources, Then, to indicate to a UE which 1/2/4 SRS port resources out of the available n SRS port resources would require too many bits.

FIG. 23 illustrates diagrams 2300 of RGBs 2305 and 2307 with an example mapping of SRS resources and ports. In an embodiment, apply the UE-group CSI-RS/DMRS design to SRS design. As an example, for each cell, restrict the cell to only a specified number (e.g., 8, but other values are possible) of pre-defined SRS port resources. Then, in the group DCI, indicate the layers/ports for a UE from within the specified number (e.g., 8) pre-defined SRS port resources. For example, configure a SRS resource for all active UEs in cell 1 with all SRS resources having the same 8 ports. The group DCI indicates which of the 8 ports are for a particular UE. For example, rank [1, 2, 4, 1] are signaled for UE 1, 2, 3, 4. There is no need to indicate the layer index. For another example, reuse DMRS port mapping. As another example, the SRS resource may be configured for all RBGs, but the scheduling/group DCI allows different UEs to be scheduled on different RBGs.

In TS 38.331, it specifies the usage for a SRS resource as follows:

usage ENUMERATED {beamManagement, codebook, nonCodebook, antennaSwitching},

In TS 38.214, procedures are specified for SRS resources with different usages. Some of the procedures are the same for 'codebook' and 'antennaSwitching', but some are not, as shown in the following:

The UE receives a downlink DCI, a group common DCI, or an uplink DCI based command where a codepoint of the DCI may trigger one or more SRS resource set(s). For SRS in a resource set with usage set to 'codebook' or 'antennaSwitching', the minimal time interval between the last symbol of the PDCCH triggering the aperiodic SRS transmission and the first symbol of SRS resource is $N_2+T_{switch}$. Otherwise, the minimal time interval between the last symbol of the PDCCH triggering the aperiodic SRS transmission and the first symbol of SRS resource is $N_2+T_{switch}+14$. The minimal time interval in units of OFDM symbols is counted based on the minimum subcarrier spacing between the PDCCH and the aperiodic SRS.

When a UE receives an spatial relation update command, as described in clause 6.1.3.26 of [10, TS 38.321], for an SRS resource, and when the HARQ-ACK corresponding to the PDSCH carrying the update command is transmitted in slot n, the corresponding actions in [10, TS 38.321] and the UE assumptions on updating spatial relation for the SRS resource shall be applied for SRS transmission starting from the first slot that is after slot $$n + 3N_{slot}^{subframe,\mu}.$$

The update command contains spatial relation assumptions provided by a list of references to reference signal IDs, one per element of the updated SRS resource set. Each ID in the list refers to a reference SS/PBCH block, NZP CSI-RS resource configured on serving cell indicated by Resource Serving Cell ID field in the update command if present, same serving cell as the SRS resource set otherwise, or SRS resource configured on serving cell and uplink bandwidth part indicated by Resource Serving Cell ID field and Resource BWP ID field in the update command if present, same serving cell and bandwidth part as the SRS resource set otherwise. When the UE is configured with the higher layer parameter usage in SRS-ResourceSet set to 'antennaSwitching', the UE shall not expect to be configured with different spatial relations for SRS resources in the same SRS resource set.

When the UE is configured with the higher layer parameter usage in SRS-ResourceSet set to 'antennaSwitching', and a guard period of Y symbols is configured according to Clause 6.2.1.2, the UE shall use the same priority rules as defined above during the guard period as if SRS was configured.

Generally, there are some more restrictions on 'antennaSwitching' than on 'codebook'. In a particular operation scenario, if the same procedures apply to the different usages, the network may configure one SRS resource with either usage but the network may utilize it for both usage purposes with no standard impact, or the network may configure two SRS resources almost identical except for "usage" (with no standard impact), or the network may configure one SRS resource with two "usage" values (with changes in TS 38.331 needed). In general operation scenarios, different usages may require different procedures and hence different SRS resources have to be configured. This is up to the network to decide. Overall it seems the use cases for this potential enhancement is limited, and the potential benefits may include some minor RRC overhead reduction and avoiding reaching UE's SRS resource limit of 64. Based on the analysis, we prefer to stick with the implementation approach and not to enhance, unless some other strong justifications are identified.

Therefore, in one embodiment, the system relies on an implementation approach to reuse a SRS resource for more than one usage such as 'antennaSwitching' and 'codebook'.

Regarding whether to support relevant enhancement for indicating a subset of Tx/Rx antennas in SRS antenna switching, we point out that there are some CSI measurement related issues not yet considered in existing discussions. When UE Tx/Rx antenna numbers are changed in a more dynamic fashion, the MIMO channel properties are also changed more dynamically and abruptly. Consequently, the UL/DL CSI would be changed. Existing RI/PMI/CQI etc., need to support fast adaptation, such as CSI measurement based on time-domain restrictions (on one-shot CSI-RS or multi-shot CSI-RS, but cannot be averaged/filtered outside a time window). That is, at the slot that the UE antenna configuration is changed, all the CSI measurements need to reset, and new measurements are performed without averaged/filtered with any measurements before the slot.

If the network intends to perform dynamic switching between two or more UE antenna configurations rather frequently, the network needs to configure multiple sets of CSI measurements/reporting, and no averaging across the CSI measurement resources is allowed. If n different UE antenna configurations are configured, then each of the n antenna configurations is configured with at least one set of CSI measurements and reporting configurations separate/independent from those for another UE antenna configuration.

Further details on non-contiguous sounding PAPR are provided in the following. A number of evaluations have been performed for non-contiguous (frequency) segments of sounding to show how much increase there is on PAPR. The following is considered for the evaluations:

To describe a SRS pattern, we use a bitmap for the PRBs, with a PRB labeled with 1 representing sounding on that PRB and 0 representing no sounding on that PRB. For example, [0011001100110011] is for 16 PRBs in a portion of the bandwidth, and 4 non-contiguous segments are transmitted, in which each segment contains 2 consecutive PRBs for sounding and the other 2 PRBs no sounding. See FIG. 24A for this example.

On each PRB, comb 4 is assumed, i.e., 3 tones per PRB are used.

When sounding on multiple non-contiguous segments, it may be possible to use different sequences on different segments, or the same sequence can be used. Both are evaluated.

We consider the following scenarios in performing the evaluations:

1. Scenario 1: Periodic segments with the pattern of [0011001100110011 . . . ]. FIG. 24A shows an example of this pattern. FIG. 24A is a diagram 2410 showing an example of non-contiguous sounding on 16 PRBs, represented as [0011001100110011]. With this pattern, we consider:
   1) Case 1: 8 PRBs ([00110011]; same sequence);
   2) Case 2: 16 PRBs ([0011001100110011]; same or different sequences; see FIG. 24A);
   3) Case 3: 32 PRBs ([00110011001100110011001100110011], same or different sequences).

2. Scenario 2: Periodic segments with the pattern of [0001000100010001 . . . ]. FIG. 24B shows an example of this pattern. FIG. 24B is a diagram 2430 showing an example of non-contiguous sounding on 16 PRBs, represented as [0001000100010001]. With this pattern, we consider:
   1) Case 1: 8 PRBs ([00010001]; same sequence);
   2) Case 2: 16 PRBs ([0001000100010001]; same or different sequences; see FIG. 24B);
   3) Case 3:32 PRBs ([00010001000100010001000100010001],same or different sequences).

|

3. Scenario 3: Periodic segments with the pattern of [0101010101010101 . . . ]. FIG. 24C shows an example of this pattern. FIG. 24C is a diagram 2450 showing an example of non-contiguous sounding on 16 PRBs, represented as [0101010101010101]. With this pattern, we consider:

1) Case 1: 8 PRBs ([01010101]; same sequence);
  2) Case 2: 16 PRBs ([0101010101010101]; same or different sequences; see FIG. 24C);
  3) Case 3: 32 PRBs ([01010101010101010101010101010101],same or different sequences).

4. Scenario 4: aperiodic 2 segments in the form of [000011111111000000001111 . . . ] with randomized locations for the segments. FIG. 24D shows an example of this pattern. FIG. 24D is a diagram 2470 showing an example of non-contiguous sounding on PRBs, represented as [00001111111100000000111111111111111110000]. For this scenario, we consider cases as shown in Table 9 below.

TABLE 9

| | Case 1 # subbands (of 4 PRBs) | Case 2 # subbands (of 4 PRBs) | Case 3 # subbands (of 4 PRBs) | Case 4 # subbands (of 4 PRBs) |
|---|---|---|---|---|
| Segment 1 | 1 | 2 | 4 | 4 |
| Segment 2 | 2 | 4 | 4 | 10 |

5. Scenario 5: aperiodic 3 segments in the form of [000011110000111100000000 01111 . . . ] with randomized locations for the segments.

For this scenario, we consider cases as shown in Table 10 below.

TABLE 10

| | Case 1 # subbands (of 4 PRBs) | Case 2 # subbands (of 4 PRBs) | Case 3 # subbands (of 4 PRBs) |
|---|---|---|---|
| Segment 1 | 1 | 2 | 4 |
| Segment 2 | 2 | 4 | 4 |
| Segment 3 | 1 | 6 | 4 |

The evaluation results for the scenarios 1-3 are shown below in Table 11.

TABLE 11

| Scenario | Case | sequence(s) | PAPR increase (dB) |
|---|---|---|---|
| Scenario 1 | Case 1 | same-seq | 1.97 |
| Scenario 1 | Case 2 | same-seq | 2.59 |
| Scenario 1 | Case 2 | diff-seq | 3.23 |
| Scenario 1 | Case 3 | same-seq | 0.82 |
| Scenario 1 | Case 3 | diff-seq | 1.94 |
| Scenario 2 | Case 1 | same-seq | 2.05 |
| Scenario 2 | Case 2 | same-seq | 2.71 |
| Scenario 2 | Case 2 | diff-seq | 4.36 |
| Scenario 3 | Case 1 | same-seq | 1.57 |
| Scenario 3 | Case 2 | same-seq | 2.85 |
| Scenario 3 | Case 2 | diff-seq | 4.19 |
| Scenario 3 | Case 3 | same-seq | 1.50 |
| Scenario 3 | Case 3 | diff-seq | 1.92 |

We can see from Table 11 above, for Scenarios 1-3, the PAPR increase is roughly within 0.8 dB to 4.3 dB, and using the same sequence is better than using different sequences.

When focusing on the same sequence tests, the PAPR increase is within 0.8 dB to 2.9 dB.

Figure 25A:
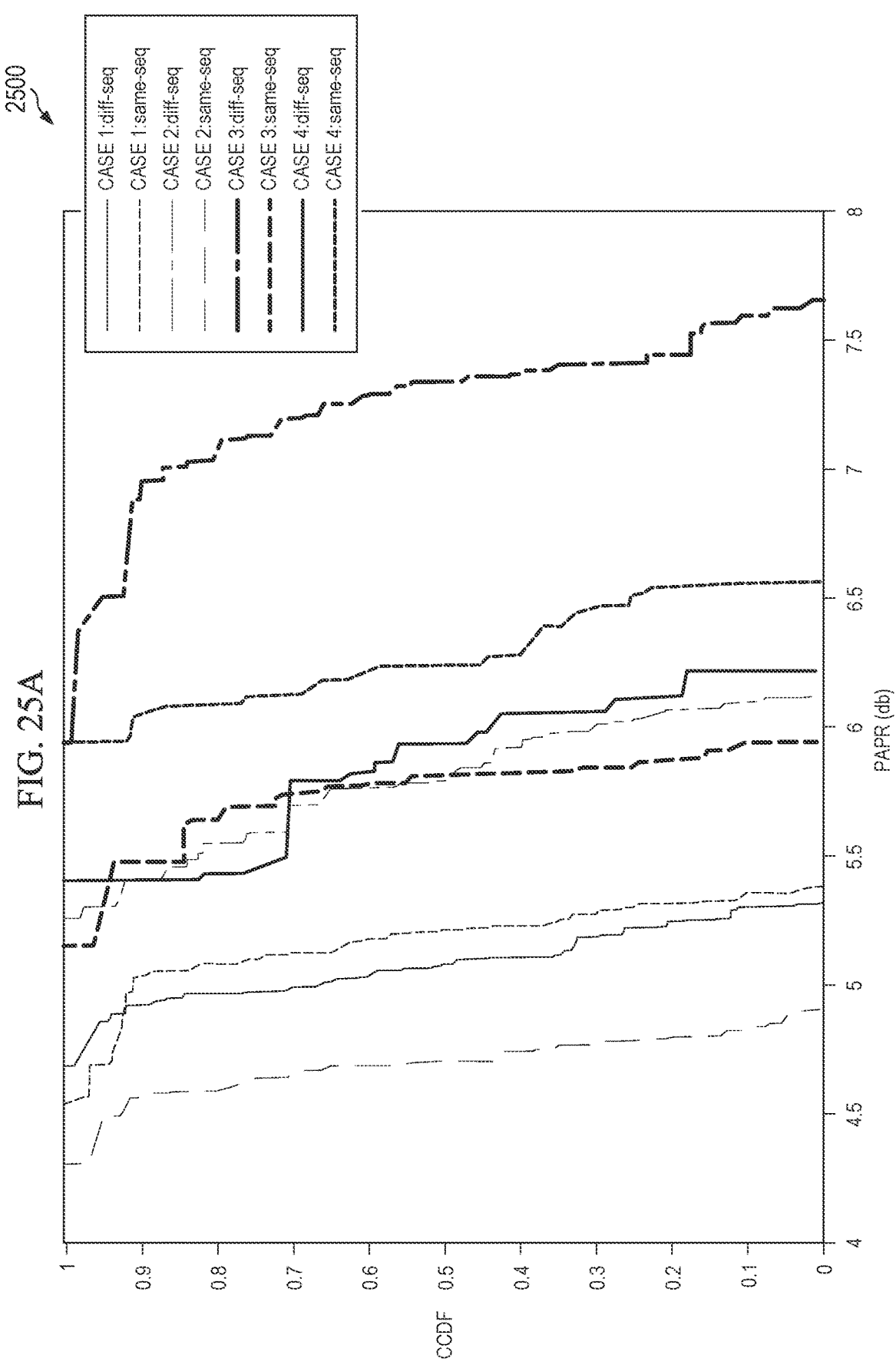
FIG. 25A is a graph showing complementary cumulative distribution functions (CCDF) of PAPRs in Scenario 4 according to example embodiments presented herein.

FIG. 25A is a graph 2500 showing complementary cumulative distribution functions (CCDF) of PAPRs for non-contiguous sounding Cases 1-4 of Scenario 4, with the same or different sequences. It can be seen from FIG. 25A, for Scenario 4, the PAPR increase is roughly within 0.5 dB to 1.5 dB, and using the same sequence may be better or worse than using different sequences.

Figure 25B:
FIG. 25B is a graph showing CCDF of PAPRs in Scenario 5 according to example embodiments presented herein.

FIG. 25B is a graph 2550 showing CCDF of PAPRs for non-contiguous sounding Cases 1-3 of Scenario 5, with the same or different sequences. We can see for Scenario 5, the PAPR increase is also roughly within 0.5 dB to 1.5 dB, and using the same sequence is better than using different sequences for the cases tested.

The evaluations show that in most cases, for non-contiguous sounding, it is desirable that a UE transmits SRSs using the same sequence, even if the sounding PRBs are not consecutive. If a sequence is $[s_1 \, s_2 \, s_3 \, s_4 \, s_5 \, s_6 \, s_7 \, s_8 \, s_9 \, s_{10} \, s_{11} \, s_{12} \ldots]$, for example, it may be transmitted as $[s_1 \, s_2 \, s_3 \, gap \, s_4 \, s_5 \, s_6 \, s_7 \, s_8 \, s_9 \, gap \, s_{10} \, s_{11} \, s_{12} \ldots]$, where the gaps are the PRBs without sounding, i.e., the elements in the sequence are not skipped on the PRBs without sounding, and they are just transmitted in a different PRB. Alternatively, it may be transmitted as $[s_1 \, s_2 \, s_3 \, gap \, s_7 \, s_8 \, s_9 \, gap \, s_{10} \, s_{11} \, s_{12} \ldots]$, where the gaps are the PRBs without sounding. That is, some elements in the sequence are skipped on the PRBs without sounding. The network can configure/indicate to the UE which transmission manner it intends the UE to use. In addition, in a few cases, using different sequences on the non-contiguous segments can result in lower PAPR than using the same sequence. In these cases, the network can configure/indicate to the UE which sequence(s) are to be used via index(es) of the sequence(s). The UE may generate a first pseudo random sequence for the SRS according to configured parameters (e.g., a first total sequence length for the SRS based on the total number PRBs assigned for the SRS) when the SRS were to be contiguous in frequency domain. However, on the first contiguous segment of the frequency resource, the UE may generate a second pseudo random sequence for the SRS, e.g., a second sequence length for the SRS is determined by the number of PRBs for the first contiguous segment, and the second sequence is generated using the second sequence length as a parameter. In some embodiments, in the A-CSI triggering DCI, the DCI indicates a SRS whose resources are on non-contiguous PRBs, and the SRS is to be transmitted on the same OFDM symbol. The gNB may also signal to the UE one or more sequence indexes for the SRS, as well as the length to be used for each sequence. For example, 2 sequences may be indicated, and for the first sequence, 12 elements (e.g., 1 subband according to the SRS configuration) are to be used, and for the second sequence, 24 elements (e.g., 2 subbands according to the SRS configuration) are to be used. Then the UE transmits the SRS accordingly.

FIG. 26 is a flowchart of an embodiment method 2600 for wireless communications. The method 2600 may be indicative of operations performed by a UE. The UE may receive, from an access node (AN), downlink control information (DCI) triggering a transmission of a sounding reference signal (SRS) of a SRS resource set, where the DCI includes information indicating a first time-domain resource in available time-domain resources for transmitting the SRS resource set (step 2602). The UE may determine the available time-domain resources for transmitting the SRS resource set based on a first slot in which the DCI is received (step 2604). The UE may determine a position of the first time-domain resource in the available time-domain resources based on the information of the DCI (step 2606), and transmit, to the AN, the SRS in accordance with the position of the first time-domain resource (step 2608).

FIG. 27 is a flowchart of another embodiment method 2700 for wireless communications. The method 2700 may be indicative of operations performed by a UE. The UE may receive control information for a transmission of one or more sounding reference signals (SRSs), where the control information includes information indicating a frequency resource in a carrier for the transmission of the one or more SRSs (step 2702). The UE may determine, based on the control information, to segment the frequency resource into a plurality of segments, with each segment including one or more contiguous physical resource blocks (PRBs) (step 2704). The UE may transmit, based on the control information, a first SRS of the one or more SRSs in a first orthogonal frequency division multiplexing (OFDM) symbol on a first segment of the plurality of segments and not on a second segment of the plurality of segments (step 2706).

FIG. 28 is a flowchart of another embodiment method 2800 for wireless communications. The method 2800 may be indicative of operations performed by a base station, e.g., an access node (AN). The AN may transmit, to a user equipment (UE), downlink control information (DCI) triggering a transmission of a sounding reference signal (SRS) of a SRS resource set, where the DCI includes information indicating a position of a first time-domain resource in available time-domain resources for transmitting the SRS resource set (step 2802). The available time-domain resources for transmitting the SRS resource set may be based on a first slot in which the DCI is transmitted. The AN may receive, from the UE, the SRS based on the position of the first time-domain resource (step 2804).

FIG. 29 is a flowchart of another embodiment method 2900 for wireless communications. The method 2900 may be indicative of operations performed by a base station, e.g., an access node (AN). The AN may transmit, to a user equipment (UE), control information for a transmission of one or more sounding reference signals (SRSs), where the control information includes information indicating a frequency resource in a carrier for the transmission of the SRSs (step 2902). The AN may then receive, from the UE in response to transmitting the control information, a first SRS of the one or more SRSs in a first orthogonal frequency division multiplexing (OFDM) symbol on a first segment of a plurality of segments segmented from the frequency resource, without receiving the first SRS on a second segment of the plurality of segments (step 2904). Each segment includes a plurality of contiguous physical resource blocks (PRBs).

An advantage of the embodiments is that control information, such as the SRS transmission bandwidth, SRS transmission ports, and SRS resource sets including the SRS transmission comb and cyclic shift, are dynamically signaled for prescheduled (or scheduled) UEs after configuration through higher layer signaling, such as, for example, through radio resource control (RRC) or media access control (MAC) control element (CE) signaling.

Yet another advantage of the embodiments is that dynamic signaling of the control information does not significantly increase the communications overhead, thereby minimizing the impact on the overall performance of the communications system.

In yet another advantage, embodiments of the present disclosure associate SRS configured parameters (SRS transmission bandwidth and/or ports) with the Physical Downlink Shared Control Channel (PDSCH) parameters (bandwidth and/or ports) and/or the CSI-RS parameters (bandwidth and/or ports).

Figure 30:
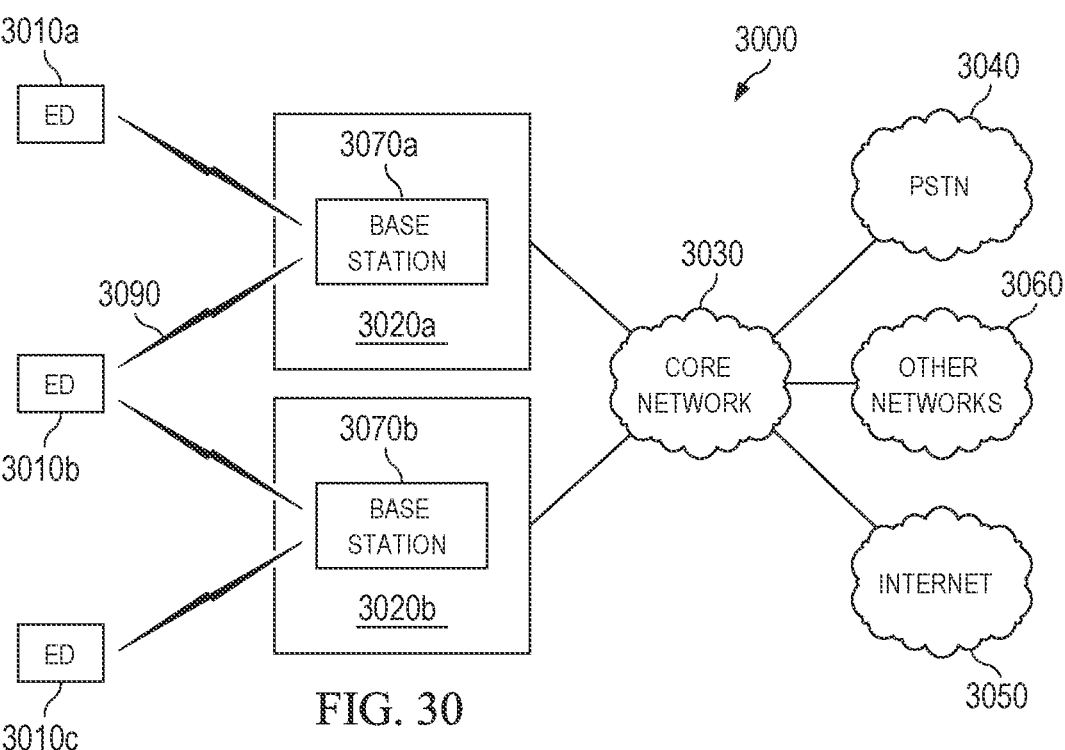
FIG. 30 illustrates an example communication system according to example embodiments presented herein.

FIG. 30 illustrates an example communication system 3000. In general, the system 3000 enables multiple wireless or wired users to transmit and receive data and other content. The system 3000 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 3000 includes electronic devices (ED) 300a-300c, radio access networks (RANs) 3020a-3020b, a core network 3030, a public switched telephone network (PSTN) 3040, the Internet 3050, and other networks 3060. While certain numbers of these components or elements are shown in FIG. 30, any number of these components or elements may be included in the system 3000.

The EDs 3010a-3010c are configured to operate or communicate in the system 3000. For example, the EDs 3010a-3010c are configured to transmit or receive via wireless or wired communication channels. Each ED 3010a-3010c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 3020a-3020b here include base stations 3070a-3070b, respectively. Each base station 3070a-3070b is configured to wirelessly interface with one or more of the EDs 300a-3010c to enable access to the core network 3030, the PSTN 3040, the Internet 3050, or the other networks 3060. For example, the base stations 3070a-3070b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 3010a-3010c are configured to interface and communicate with the Internet 3050 and may access the core network 3030, the PSTN 3040, or the other networks 3060.

In the embodiment shown in FIG. 30, the base station 3070a forms part of the RAN 3020a, which may include other base stations, elements, or devices. Also, the base station 3070b forms part of the RAN 3020b, which may include other base stations, elements, or devices. Each base station 3070a-3070b operates to transmit or receive wireless signals within a particular geographic region or area, sometimes referred to as a "cell." In some embodiments, multiple-input multiple-output (MIMO) technology may be employed having multiple transceivers for each cell.

The base stations 3070a-3070b communicate with one or more of the EDs 3010a-3010c over one or more air interfaces 3090 using wireless communication links. The air interfaces 3090 may utilize any suitable radio access technology.

It is contemplated that the system 3000 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 3020a-3020b are in communication with the core network 3030 to provide the EDs 3010a-3010c with voice, data, application, Voice over Internet Protocol (VoIP), or other services. Understandably, the RANs 3020a-3020b or the core network 3030 may be in direct or indirect communication with one or more other RANs (not shown). The core network 3030 may also serve as a gateway access for other networks (such as the PSTN 3040, the Internet 3050, and the other networks 3060). In addition, some or all of the EDs 3010a-3010c may include functionality for communicating with different wireless networks over different wireless links using different wireless technologies or protocols. Instead of wireless communication (or in addition thereto), the EDs may communicate via wired communication channels to a service provider or switch (not shown), and to the Internet 3050.

Although FIG. 30 illustrates one example of a communication system, various changes maybe made to FIG. 30. For example, the communication system 3000 could include any number of EDs, base stations, networks, or other components in any suitable configuration.

Figure 31A:
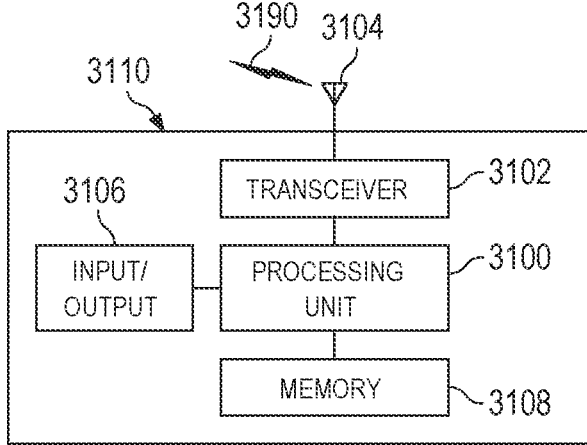
FIGS. 31A and 31B illustrate example devices that may implement the methods and teachings according this disclosure.
Figure 31B:
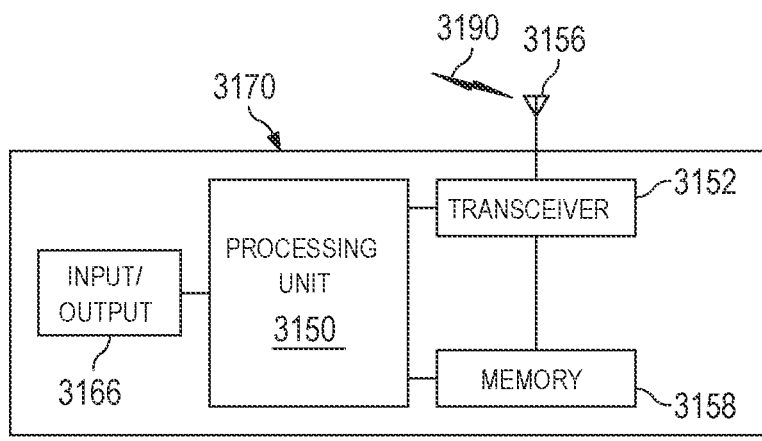

FIGS. 31A and 31B illustrate example devices that may implement the methods and teachings according to this disclosure. In particular, FIG. 31A illustrates an example ED 3110, and FIG. 31B illustrates an example base station 3170. These components could be used in the system 3000 or in any other suitable system.

As shown in FIG. 31A, the ED 3110 includes at least one processing unit 3100. The processing unit 3100 implements various processing operations of the ED 3110. For example, the processing unit 3100 could perform signal coding, data processing, power control, input/output processing, or any other functionality enabling the ED 3110 to operate in the system 3000. The processing unit 3100 also supports the methods and teachings described in more detail above. Each processing unit 3100 includes any suitable processing or computing device configured to perform one or more operations. Each processing unit 3100 could, for example, include a microprocessor, microcontroller, digital signal processor, field programmable gate array, or application specific integrated circuit.

The ED 3110 also includes at least one transceiver 3102. The transceiver 3102 is configured to modulate data or other content for transmission by at least one antenna or NIC (Network Interface Controller) 3104. The transceiver 3102 is also configured to demodulate data or other content received by the at least one antenna 3104. The at least one antenna 3104 is configured to transmit or receive wireless signals 3190. Each transceiver 3102 includes any suitable structure for generating signals for wireless or wired transmission or processing signals received wirelessly or by wire. Each antenna 3104 includes any suitable structure for transmitting or receiving wireless or wired signals. One or multiple transceivers 3102 could be used in the ED 3110, and one or multiple antennas 3104 could be used in the ED 3110. Although shown as a single functional unit, a transceiver 3102 could also be implemented using at least one transmitter and at least one separate receiver.

The ED 3110 further includes one or more input/output devices 3106 or interfaces (such as a wired interface to the Internet 3050). The input/output devices 3106 facilitate interaction with a user or other devices (network communications) in the network. Each input/output device 3106 includes any suitable structure for providing information to or receiving information from a user, such as a speaker, microphone, keypad, keyboard, display, or touch screen, including network interface communications.

In addition, the ED 3110 includes at least one memory 3108. The memory 3108 stores instructions and data used, generated, or collected by the ED 3110. For example, the memory 3108 could store software or firmware instructions executed by the processing unit(s) 3100 and data used to reduce or eliminate interference in incoming signals. Each memory 3108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 31B, the base station 3170 includes at least one processing unit 3150, at least one transceiver 3152, which includes functionality for a transmitter and a receiver, one or more antennas 3156, at least one memory 3158, and one or more input/output devices or interfaces 3166. A scheduler, which would be understood by one skilled in the art, is coupled to the processing unit 3150. The scheduler could be included within or operated separately from the base station 3170. The processing unit 3150 implements various processing operations of the base station 3170, such as signal coding, data processing, power control, input/output processing, or any other functionality. The processing unit 3150 can also support the methods and teachings described in more detail above. Each processing unit 3150 includes any suitable processing or computing device configured to perform one or more operations. Each processing unit 3150 could, for example, include a microprocessor, microcontroller, digital signal processor, field programmable gate array, or application specific integrated circuit.

Each transceiver 3152 includes any suitable structure for generating signals for wireless or wired transmission to one or more EDs or other devices. Each transceiver 3152 further includes any suitable structure for processing signals received wirelessly or by wire from one or more EDs or other devices. Although shown combined as a transceiver 3152, a transmitter and a receiver could be separate components. Each antenna 3156 includes any suitable structure for transmitting or receiving wireless or wired signals 3190. While a common antenna 3156 is shown here as being coupled to the transceiver 3152, one or more antennas 3156 could be coupled to the transceiver(s) 3152, allowing separate antennas 3156 to be coupled to the transmitter and the receiver if equipped as separate components. Each memory 3158 includes any suitable volatile or non-volatile storage and retrieval device(s). Each input/output device 3166 facilitates interaction with a user or other devices (network communications) in the network. Each input/output device 3166 includes any suitable structure for providing information to or receiving/providing information from a user, including network interface communications.

Figure 32:
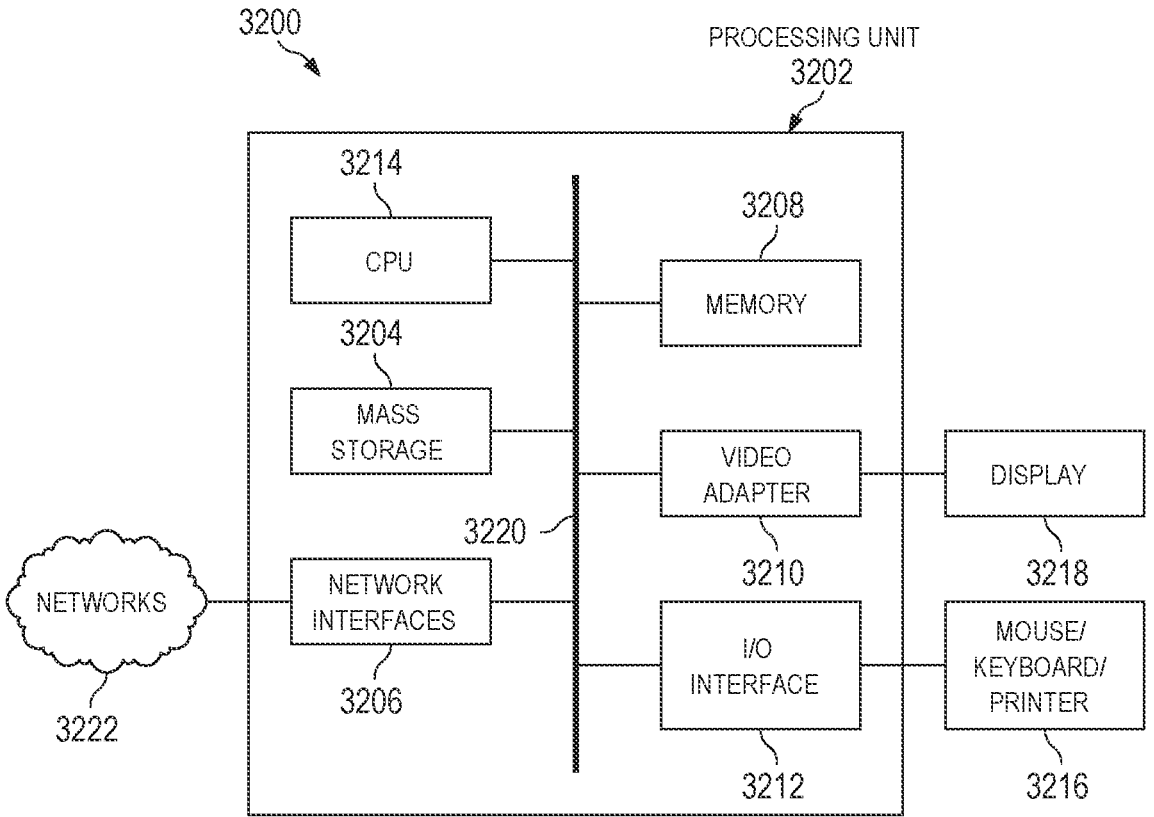
FIG. 32 is a block diagram of a computing system that may be used for implementing the devices and methods disclosed herein.

FIG. 32 is a block diagram of a computing system 3200 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 3200 includes a processing unit 3202. The processing unit includes a central processing unit (CPU)

3214, memory 3208, and may further include a mass storage device 3204, a video adapter 3210, and an I/O interface 3212 connected to a bus 3220.

The bus 3220 may be one or more of any type of several bus architectures including a memory bus or memory controller, a peripheral bus, or a video bus. The CPU 3214 may comprise any type of electronic data processor. The memory 3208 may comprise any type of non-transitory system memory such as static random access memory (SRAM), dynamic random access memory (DRAM), synchronous DRAM (SDRAM), read-only memory (ROM), or a combination thereof. In an embodiment, the memory 3208 may include ROM for use at boot-up, and DRAM for program and data storage for use while executing programs.

The mass storage 3204 may comprise any type of non-transitory storage device configured to store data, programs, and other information and to make the data, programs, and other information accessible via the bus 3220. The mass storage 3204 may comprise, for example, one or more of a solid state drive, hard disk drive, a magnetic disk drive, or an optical disk drive.

The video adapter 3210 and the I/O interface 3212 provide interfaces to couple external input and output devices to the processing unit 3202. As illustrated, examples of input and output devices include a display 3218 coupled to the video adapter 3210 and a mouse, keyboard, or printer 3216 coupled to the I/O interface 3212. Other devices may be coupled to the processing unit 3202, and additional or fewer interface cards may be utilized. For example, a serial interface such as Universal Serial Bus (USB) (not shown) may be used to provide an interface for an external device.

The processing unit 3202 also includes one or more network interfaces 3206, which may comprise wired links, such as an Ethernet cable, or wireless links to access nodes or different networks. The network interfaces 3206 allow the processing unit 3202 to communicate with remote units via the networks. For example, the network interfaces 3206 may provide wireless communication via one or more transmitters/transmit antennas and one or more receivers/receive antennas. In an embodiment, the processing unit 3202 is coupled to a local-area network 3222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit or module, a determining unit or module, a configuring unit or module, a frequency segmenting unit or module, and/or a scheduling unit or module. The respective units or modules maybe hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
receiving, by a user equipment (UE) from an access node (AN), higher layer signaling including a configuration;
receiving, by the UE from the AN, downlink control information (DCI) in a first slot, the DCI triggering a transmission of a sounding reference signal (SRS) of an aperiodic SRS resource set, the DCI comprising first information indicating a first time-domain resource in a pool of available time-domain resources for transmitting the SRS, the pool of available time-domain resources being based on the configuration and the first slot in which the DCI is received;
determining, by the UE, the first time-domain resource in the pool of available time-domain resources based on the first information of the DCI; and
transmitting, by the UE to the AN, the SRS in accordance with the first time-domain resource.

2. The method of claim 1, wherein:
the configuration includes a higher layer parameter slot-offset, and the determining the first time-domain resource comprises:
determining, by the UE, the pool of available time-domain resources according to the first slot of the DCI and the higher layer parameter slotoffset.

3. The method of claim 2, further comprising:
determining, by the UE, a reference slot for the pool of available time-domain resources based on the first slot and the higher layer parameter slotoffset, wherein the reference slot is at a position that is k slots after the first slot, k is configured by the higher layer parameter slotoffset, and k is greater than or equal to zero (0).

4. The method of claim 3, wherein the pool of available time-domain resources comprises time-domain resources that are in or after, in a time domain, the reference slot, and that are configured as uplink (UL) or flexible, and wherein the time-domain resources are in a unit of a slot, a mini-slot, or an orthogonal frequency division multiplexing (OFDM) symbol.

5. The method of claim 1, wherein the pool of available time-domain resources comprises time-domain resources that are in or after, in a time domain, the first slot, and that are configured as uplink (UL) or flexible, and the time-domain resources are in a unit of a slot, a mini-slot, or an orthogonal frequency division multiplexing (OFDM) symbol.

6. The method of claim 1, wherein the DCI comprises a slot index of the first time-domain resource in the pool of available time-domain resources.

7. A method comprising:
transmitting, by an access node (AN) to a user equipment (UE), higher layer signaling including a configuration;
transmitting, by the AN to the UE, downlink control information (DCI) in a first slot, the DCI triggering a transmission of a sounding reference signal (SRS) of an aperiodic SRS resource set, wherein:
the DCI comprises information indicating a first time-domain resource from a pool of available time-domain resources for transmitting the SRS, and
the pool of available time-domain resources corresponds to the configuration and the first slot in which the DCI is transmitted; and
receiving, by the AN from the UE, the SRS based on the first time-domain resource.

8. The method of claim 7, wherein the pool of available time-domain resources corresponds to a position of the first slot of the DCI and a higher layer parameter slotoffset, and the configuration includes the higher layer parameter slot-offset.

9. The method of claim 8, wherein the pool of available time-domain resources corresponds to a reference slot, the reference slot is at a position that is k slots after the first slot, and k is specified by the higher layer parameter slotoffset that is configured for the UE, and k is greater than or equal to zero (0).

10. The method of claim 9, wherein the pool of available time-domain resources comprises time-domain resources that are in or after, in a time domain, the reference slot, and that are configured as uplink (UL) or flexible, and wherein the time-domain resources are in a unit of a slot, a mini-slot, or an OFDM symbol.

11. The method of claim 7, wherein the pool of available time-domain resources comprises time-domain resources that are in or after, in a time domain, the first slot, and that are configured as uplink (UL) or flexible, and the time-domain resources are in a unit of a slot, a mini-slot, or an orthogonal frequency division multiplexing (OFDM) symbol.

12. The method of claim 7, wherein the DCI comprises a slot index of the first time-domain resource in the pool of available time-domain resources.

13. An apparatus comprising:

a non-transitory memory storage comprising instructions; and one or more processors in communication with the non-transitory memory storage, wherein the instructions, when executed by the one or more processors, cause the apparatus to perform:

receiving, from an access node (AN), higher layer signaling including a configuration;

receiving, from the AN, downlink control information (DCI) in a first slot, the DCI triggering a transmission of a sounding reference signal (SRS) of an aperiodic SRS resource set, the DCI comprising first information indicating a first time-domain resource in a pool of available time-domain resources for transmitting the SRS, the pool of available time-domain resources being based on the configuration and the first slot in which the DCI is received;

determining the first time-domain resource in the pool of available time-domain resources based on the first information of the DCI; and transmitting, to the AN, the SRS in accordance with the first time-domain resource.

14. The apparatus of claim 13, wherein the configuration includes a higher layer parameter slotoffset; and the determining the first time-domain resource comprises:

determining the pool of available time-domain resources according to the first slot of the DCI and the higher layer parameter slotoffset.

15. The apparatus of claim 14, wherein the determining the pool of available time-domain resources according to the first slot and the higher layer parameter slotoffset comprises:

determining a reference slot for the pool of available time-domain resources based on the first slot and the higher layer parameter slotoffset, wherein the reference slot is at a position that is k slots after the first slot, k is configured by the higher layer parameter slotoffset, and k is greater than or equal to zero (0).

16. The apparatus of claim 15, wherein the pool of available time-domain resources comprises time-domain resources that are in or after, in a time domain, the reference slot, and that are configured as uplink (UL) or flexible, and wherein the time-domain resources are in a unit of a slot, a mini-slot, or an orthogonal frequency division multiplexing (OFDM) symbol.

17. The apparatus of claim 13, wherein the pool of available time-domain resources comprises time-domain resources that are in or after, in a time domain, the first slot, and that are configured as uplink (UL) or flexible, and the time-domain resources are in a unit of a slot, a mini-slot, or an orthogonal frequency division multiplexing (OFDM) symbol.

18. The apparatus of claim 13, wherein the DCI comprises a slot index of the first time-domain resource in the pool of available time-domain resources.

19. An apparatus comprising:

a non-transitory memory storage comprising instructions; and one or more processors in communication with the non-transitory memory storage, wherein the instructions, when executed by the one or more processors, cause the apparatus to perform:

transmitting, to a user equipment (UE), higher layer signaling including a configuration;

transmitting, to the UE, downlink control information (DCI) in a first slot, the DCI triggering a transmission of a sounding reference signal (SRS) of an aperiodic SRS resource set, wherein:

the DCI comprises information indicating a first time-domain resource from a pool of available time-domain resources for transmitting the SRS resource set, and the pool of available time-domain resources corresponds to the configuration and the first slot in which the DCI is transmitted; and receiving, from the UE, the SRS based on the first time-domain resource.

20. The apparatus of claim 19, wherein the pool of available time-domain resources corresponds to a position of the first slot of the DCI and a higher layer parameter slotoffset, and the configuration includes the higher layer parameter slotoffset.

\* \* \* \* \*